(12) United States Patent
Yamada et al.

(10) Patent No.: US 8,917,369 B2
(45) Date of Patent: Dec. 23, 2014

(54) DISPLAY DEVICE AND MULTILAYER SUBSTRATE

(75) Inventors: Nobuaki Yamada, Osaka (JP); Kazuyoshi Sakuragi, Osaka (JP); Akiyoshi Fujii, Osaka (JP); Tokio Taguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 13/379,988

(22) PCT Filed: May 26, 2010

(86) PCT No.: PCT/JP2010/058903
§ 371 (c)(1),
(2), (4) Date: Jan. 18, 2012

(87) PCT Pub. No.: WO2010/150615
PCT Pub. Date: Dec. 29, 2010

(65) Prior Publication Data
US 2012/0147303 A1    Jun. 14, 2012

(30) Foreign Application Priority Data
Jun. 23, 2009    (JP) ................................ 2009-148942

(51) Int. Cl.
| | |
|---|---|
| *G02F 1/1333* | (2006.01) |
| *G02B 1/11* | (2006.01) |
| *B29D 11/00* | (2006.01) |
| *G02F 1/1335* | (2006.01) |
| *G02B 5/20* | (2006.01) |

(52) U.S. Cl.
CPC *G02B 1/118* (2013.01); *G02B 1/11* (2013.01); *B29D 11/00326* (2013.01); *G02F 1/133502* (2013.01); *G02B 5/201* (2013.01); *G02F 1/133512* (2013.01); *G02F 2201/38* (2013.01); *G02F 2202/36* (2013.01); *G02F 2202/40* (2013.01)
USPC ........................................................... 349/137

(58) Field of Classification Search
USPC ........................................................... 349/137
See application file for complete search history.

(56) References Cited

U.S. PATENT DOCUMENTS

| | | | |
|---|---|---|---|
| 2006/0062969 A1 | 3/2006 | Honda | |
| 2006/0231838 A1* | 10/2006 | Kim ............................. | 257/59 |

(Continued)

FOREIGN PATENT DOCUMENTS

| | | |
|---|---|---|
| CN | 102257426 | 11/2011 |
| JP | 5-196809 A | 8/1993 |
| JP | 6-324326 A | 11/1994 |
| JP | 2004-258364 A | 9/2004 |

(Continued)

OTHER PUBLICATIONS

International Search Report.

*Primary Examiner* — Phu Vu
(74) *Attorney, Agent, or Firm* — Harness, Dickey & Pierce, P.L.C.

(57) ABSTRACT

A display device is provided in which reduction of reflected light is realized. Also a multilayer substrate is provided in which light reflectance is reduced even when the substrate has a plurality of layers that differ in refractive index from each other. In the display device of one embodiment, the reflectance of light reflected by the internal structure, of light incident on the internal structure through a display screen, is less than 1.0%. The multilayer substrate of one embodiment includes a first layer and a second layer disposed adjacently to the first layer. The refractive index of the second layer varies continuously from an interface where the second layer is adjacent to the first layer in a direction from the first layer, with the variation being started at a value of the refractive index at the interface where the first layer is adjacent to the second layer.

16 Claims, 18 Drawing Sheets

(56) References Cited

U.S. PATENT DOCUMENTS

2008/0158682 A1* 7/2008 Egi et al. .................. 359/601
2010/0134733 A1   6/2010 Watanabe et al.
2011/0249339 A1   10/2011 Horie

FOREIGN PATENT DOCUMENTS

| | | |
|---|---|---|
| JP | 2005-007873 A | 1/2005 |
| JP | 2007-264066 A | 10/2007 |
| WO | WO-2009-019839 A1 | 2/2009 |

* cited by examiner

DISPLAY DEVICE AND MULTILAYER SUBSTRATE

TECHNICAL FIELD

The present invention relates to a display device and a multilayer substrate.

BACKGROUND ART

Display devices provided in electronic devices such, as television sets, personal computers, cellular phones, and digital cameras that have been used in very large numbers in recent years are usually fabricated by using a substrate from glass or the like as a base, and a display device is produced by disposing circuit elements, control elements, and color filters on this substrate.

For example, a liquid crystal display device is provided with a transparent substrate such as glass and color filters formed on the transparent substrate. By providing the color filters, it is possible to colorize the display light. Therefore, a liquid crystal display device provided with color filters can display color images. The transparent substrate is disposed on the display surface side and color filters are disposed on the inner surface side of the liquid crystal display device.

A light-blocking film for increasing the contrast of display images is usually disposed between the color filters of different colors. For example, a thin metal film can be used as the light-blocking film. However, since metals typically have a high reflectance, when the display device is viewed from the substrate side where the color filters are provided, the ambient light, reflected by the light-blocking film constituted by the thin metal film can decrease the contrast of displayed images.

A method by which a film having a refractive index between the refractive index of the transparent substrate and the refractive index of the metal light-blocking film is provided between the transparent, substrate and the metal light-blocking film has been suggested as a means for resolving the aforementioned problem (see, for example, Patent Document 1). In Patent Document 1, glass is used as a material of the transparent, substrate, a transparent inorganic thin film is used as film capable of preventing the reflection, and TiO (titanium oxide) is disclosed as an example of material for the transparent inorganic thin film. Further, Cr (chromium) is disclosed as a material for the metal light-blocking film.
Patent Document 1: Japanese Patent Application Laid-open No. HS-196809

However, the research conducted by the inventors has revealed that even when the transparent, inorganic thin film is arranged, between the transparent substrate and the metal light-blocking film, as descried in the above-mentioned Patent Document 1, external light reflection occurs at the boundary of the transparent substrate and the transparent inorganic thin film and at the interface between the transparent inorganic thin film and the metal light-blocking film.

This reflection occurs apparently because the layered structure based on the above mentioned Patent Document 1 is configured by stacking an air layer (refractive index: 1), a glass layer (refractive index: 1.5), a TiO layer (refractive index: 2.35), and a Cr layer (refractive index: 3.08) and includes a plurality of layers having intermittently different refractive indexes. Light reflection also occurs at the boundary between media when light is transmitted between media with different refractive indexes, and the reflectance of light incident on the boundary between media is determined by the ratio of the second power of the difference in refractive index between the media and the second power of the sum of the refractive indices. Therefore, where the refractive indexes of layers differ intermittently, reflection of light caused by the difference between the refractive index of the transparent substrate and the refractive index of the transparent inorganic thin film occurs at the boundary between the transparent substrate (glass) and the transparent inorganic thin film (TiO) and reflection of light caused by the difference between the refractive index of the transparent inorganic thin film and the refractive index of the metal light-blocking film occurs at the interface between the transparent inorganic thin film (TiO) and the metal light-blocking film (Cr). As a result, sufficient light reflection preventing effect cannot be obtained.

Further, where the transparent inorganic thin film is disposed on the entire transparent substrate, as in the configuration described in Patent Document 1, the display light generates new reflected light not only in the region where the metal light-blocking film is disposed, but also in the pixel region through which the display light is transmitted. Therefore, the amount of reflected light can be, as a whole, even increased.

Where the amount of reflected light increases, when the light inherently used as the display light (for example, light emitted from the backlight of the liquid crystal display device) and the light created by the reflection of external light are mixed, the display light that should be inherently used is greatly inhibited. For example, contrast in a brightly lit room is decreased and display quality is degraded.

DISCLOSURE OF THE INVENTION

The present invention has been created with the foregoing in view and it is an object thereof to provide a display device in which the reduction of reflected light is realized. Another object is to provide a multilayer substrate in which light reflectance is reduced even when the substrate has a plurality of layers with mutually different refractive indexes.

When conducting a comprehensive study of means for inhibiting the decrease in contrast of display device in brightly lit rooms, the inventors focused their attention on the reflection based on the display device structure. Light leak occurring during black display is generally known as the reason for decreased contrast ratio of display, but the decrease in contrast ratio of display has been found to be greatly affected by reflection based on the display device structure. More specifically, screen reflection at the display screen produces a strong effect on decrease in contrast ratio, but it has been found that where the screen reflection is inhibited, the decrease in contrast ratio in a brightly lit room is greatly affected by reflection based on the internal structure of the display device and it has also been found that contrast ratio of display in a brightly lit room can be increased by reducing the reflectance of the internal structure of the display device to below a predetermined value.

Thus, the present, invention provides a display device in which a reflectance of light reflected by an internal structure, of the light incident on the internal structure through a display screen, is less than 1.0%. More specifically, in the present description, the reflectance is a value combining a normal reflectance and a diffusion reflectance and corresponds to an Y value of tristimulus value based on a XYZ color system. The display screen is a screen, at which an image is actually displayed; this is also a region serving as a path by which the external light penetrates into the display device. The light that has entered the interior of the display device through the display screen is reflected by the surface of high-reflectance members of the internal structure of the display device and goes to the outside again through the display screen. Such reflected light is the cause for decreased contrast ratio of display. Light leak occurring when black color is displayed can be considered as a cause for reduced contrast ratio of display. In a display device having a light source behind a panel, such as a liquid crystal display, such an effect is particularly significant in dark environment. In other words, when black is displayed in a dark environment, for example, in a dark room without surrounding light sources or in an environment with weak light sources, as in cinemas, the light from the light source behind the panel leaks to the observation side, thereby decreasing the ratio of white display and black display (contrast ratio). Such light leak from the back-surface light source can be recognized because the black display appears to be lighter than the surrounding darkness and is generally called "floating black". Meanwhile, the reduction of reflected light caused by the display device structure is effective for increasing the contrast ratio in an environment with bright surrounding area, and in addition to reducing surface reflection it is particularly effective in inhibiting the reflection at the internal structure of the display device (referred, to hereinbelow as "internal reflection"), which has heretofore been mainly ignored. As a result, a display device can be obtained that has an excellent contrast ratio even in an environment with bright surrounding area.

This effect can be clarified by the following explanation. When the surrounding environment is bright, that is, when a light source or a white wail serving as a secondary light source is present around a display device, this light source or wall are sometimes reflected on the display screen of the display device. In such a case, the image displayed on the display screen of the display device is difficult to see. Thus, a window or a white wall are reflected on the display screen, thereby making it difficult to see the displayed image. Not only the reflection on the display device screen, but also the reflection from the interior of the display device (reflection by the members constituting the display device interior) contributes to this effect. This reflection on the screen is seen more clearly when the display device displays black, and such a reflection makes it impossible to recognize the black display. The ratio of white display and black display (contrast ratio) is thus greatly reduced. In such a state, it is impossible to increase contrast ratio in an environment with bright surrounding area, unless the reflection on the display screen of the display device is inhibited.

The definition of internal reflection in the display device of the present invention will be explained below. The contrast ratio in a bright place strongly depends on how the external light is reflected. The reflection relating to the display device is considered separately as surface reflection, and internal reflection, caused by the display device structure. The surface reflection as referred to herein takes place on the outermost surface of the display screen of the display device, and the internal reflection is the reflection, inside the display device of light that has entered the interior of the display device through the outermost surface of the display screen. For example, where the members constituting the screen are produced by attaching a film to a substrate, the reflection on the film outermost surface is front surface reflection, and the internal reflection is reflection of light that has entered the device interior from the outermost surface of the film on the boundary of the film and the substrate.

In other words, the internal reflection originates due to the reflection caused by discontinuity of refractive index at interfaces where the materials constituting the display device are in contact with each other, and the reflection caused by metal components such as electrodes used for the internal structure of the display device and the reflection at the interfaces of layers that represent stacked, layers of oxides or organic substances also correspond to the internal reflection.

FIG. 1 is a schematic diagram illustrating how the reflection is caused by the structure of the display device of the present invention. As shown in FIG. 1, the display device of the present invention has as constituent elements a surface base material 111 constituting a display screen and an internal base material 112 constituting the internal structure. More specifically, the surface of the surface base material 111 on the outer space side constitutes the display screen. Light 101 incident on the surface base material 111 from the outside is divided into a component 102 reflected by the surface of the surface base material 111 on the outer space side and a component 103 that is transmitted by the surface base material 111. The component 103 that has been transmitted by the surface base material 111 is further divided into a component (internally reflected component) 104 that is reflected by the surface of members with a high reflectance that constitute the internal structure of the display device and propagate toward the observation surface and a component that is transmitted as is by the internal structure of the display device. Among these components, the internally reflected component 104 is based on the structure of the display device interior and includes not only the reflected component caused by the structure of the internal base material 112, but also a reflected component caused, by the structure of the surface base material 111 outside the surface on the outer space side. Thus, where the reflection based on the display device structure is taken as the entire reflected component, the internally reflected component is a component obtained by subtracting a component reflected by the surface of the surface base material 111 on the outer space side from the entire reflected component.

The definition of internal reflection in the case where the display device of the present invention is a liquid crystal display device will be described below in greater detail. FIG. 2 is a schematic diagram illustrating how the reflection is caused by the structure of the display device of the present invention in the case where the display device of the present invention is a liquid, crystal display device. As shown in FIG. 2, the display device of the present invention (liquid crystal display device is provided with a pair of substrates, namely, a substrate (substrate on the observation surface side) 121 constituting the display screen and a substrate (substrate on the rear surface side) 122 constituting the internal structure. Further, a liquid crystal layer 123 is formed between the above mentioned pair of substrates. Light 101 falling from the side of the substrate 121 on the observation surface side is divided into a component 102 that is reflected by the substrate 121 on the observation surface side at the surface thereof on the outer space side and a component 103 transmitted by the substrate 121 on the observation surface side. The component 103 transmitted by the substrate 121 on the observation surface side is further divided into a component (internally reflected component) 104 that is reflected by the surface of members with a high reflectance that constitute the internal structure of the liquid crystal display device and propagate toward the observation surface side and a component that is transmitted as is by the internal structure of the liquid, crystal display device. Among these components, the internally reflected component 104 is based on the structure of the interior of the liquid crystal display device and includes not only the reflected component caused by the structure of the substrate 122 on the rear surface side, but also a reflected, component caused by the structure of the substrate 121 on the observation surface side outside the surface on the outer space side. Thus, where the reflection based on the structure of the liquid crystal, display device is taken as the entire reflected component, the internally reflected component is a component obtained by subtracting a component reflected by the surface of the substrate 121 on the observation surface side on the surface on the outer-space side from the entire reflected component.

When the liquid crystal display device of the present, invention is a transmission-type or reflection-type liquid crystal display device, a backlight is also present on the rear surface side in addition to the substrate 122 on the rear surface side. Where the light transmitted by the substrate 122 on the rear surface side reaches the backlight, part of this component can be reflected by the backlight structure and can pass through the substrate 121 on the observation surface side and to the outside. According to the definition of internal reflection in the present invention, this light is also included in the internal reflection. However, for example, when the substrate 121 on the observation surface side and the substrate 122 on the rear surface side are each provided with a polarizer, and the polarization axes of this pair of polarizes are in a cross Nicol relationship, this reflected light based, on the backlight structure can be ignored as an internal reflection component of the present invention. This is because during black display, practically the entire light is absorbed by these two polarizers. In other words, because the external light in a black display state is absorbed by two polarizers, the light does not pass through to the backlight side. From the standpoint of improving the contrast ratio, it is preferred that the two polarizers disposed, in cross Nicol relationship be arranged each at a respective substrate of a pair of substrates sandwiching the liquid crystal layer. As a consequence, the reflectance of internal reflection in the transmission-type or semi-transmission-type liquid, crystal display device in which the liquid crystal layer is sandwiched by two polarizers satisfying cross Nicol relationship can be estimated, to be equal to the reflectance of internal reflection caused by a liquid crystal display panel.

However, in a state of the above mentioned polarizer arrangement that is other than the black display state, the cross Nicol state of the front and rear polarizers collapses. Therefore, part of external light passes through the front and rear polarizers, similarly to the light transmitted from the backlight, and enters the backlight side. Therefore, it is possible that new reflected light from the backlight will be added, but since the amount of light emitted from, the backlight is larger than that of the external light, this reflected light has an intensity much lower than that of the entire light from the backlight and can be ignored.

In the present invention, the attention is focused on such internally reflected component, and large improvement of contrast ratio can be obtained, when the reflectance of light reflected by the internal structure of the display device is less than 1.0%. The reflectance based on the internal structure in a typical liquid crystal display device is 1.6 to 2.0%, and in order to attain excellent improvement in contrast ratio in such a device, the internal reflectance should be made at least less than 1.0%. Further, it is preferred that the reflectance of light reflected by the internal structure be less than 0.5%. In such a case, it is possible to obtain a display device in which a high contrast ratio of display is maintained even in an environment with a comparatively bright surrounding area and high display quality is obtained.

As mentioned hereinabove, the display device of the present invention can be used especially advantageously when a treatment for inhibiting surface reflection has been performed. Therefore, it is preferred that in the display device of the present invention the above mentioned display screen have a low-reflection layer on the outermost surface. In particular, it is preferred that the above mentioned low-reflection layer have on the surface thereof a plurality of protrusions with a width between adjacent apex points of equal to or less than the visible light wavelength. In the present description, the low-reflection layer is a layer having a reflectance of equal to or less than 1.5%. Examples of the low-reflection layer used of the present invention include a LR (Low Reflection) film and an AR (Anti Reflection) film that reduce the reflectance on the basis of mutual interference and quenching of light reflected by the front surface of the multilayer substrate and light, reflected, by the surface of the low-reflection layer, an AGLR film having the specific features of both the LR film and the AG (Anti Glare) film that demonstrate antiglare effect by using a protrusion-depression structure provided on the surface of the low-reflection layer and causing scattering of external light, and a moth eye film in which a plurality of protrusions with a width between the adjacent apex points of equal to or less than the visible light, wavelength (380 nm) is formed. With the moth eye structure constituting the moth eye film surface, quasi-continuous variations of the refractive index are obtained from the interface where the multilayer substrate is adjacent to the outer space (air), and practically the entire light is transmitted, regardless of the refractive index interface. Therefore, the surface reflectance can be brought substantially close to zero. More specifically, the moth eye film makes it possible to reduce the surface reflectance to a value equal to or less than 0.3%. Further, by contrast with the low-reflection film for interference action, the reflectance characteristic is unlikely to depend on the incident wavelength in the moth eye structure and the reflectance can be made equal to or less than 0.3% over the entire visible light region. Furthermore, the contribution of internal reflection relatively increases as the surface reflectance decreases. Therefore, the display device having a structure reducing the internal reflection of the present invention is more effective when the surface reflectance is low. As a consequence, the device is effective when used in combination with a low-reflection film having a moth eye structure.

Examples of display devices that can use the present invention include liquid crystal display devices, organic electroluminescence display devices, inorganic electroluminescence display devices, plasma display devices, and CRT display devices. As will be described below, a liquid crystal display device of a linearly polarized light mode in which linearly polarized light passes through the liquid crystal layer is preferred.

The specific features of the display device of the present invention can be applied to an image pickup element having a lens on the surface. Similarly to the above-described display device, the image pickup element also has wirings and electrodes as the internal structure and also has a light receiving lens. The reflected light produced by the internal structure becomes stray light resulting from repeated reflection on both the image pickup element and the lens. Therefore, the reduction of reflected light is effective in terms of picking up images with a high contrast ratio. The image pickup element and display device have different light incidence regions, namely, the image pickup lens and the display screen, but the definition of internal structure is the same.

In the case of a liquid crystal display device, the means for reducing the reflectance of internal structure of the present invention is especially effective when applied in a linearly polarized light mode. The light control modes in a liquid crystal display device can be generally divided into a linearly polarized light mode in which the light passing through a liquid crystal layer is a linearly polarized light and a circularly polarized light mode in which the light passing through a liquid crystal layer is a circularly polarized light. The circularly polarized light can be obtained by using a circularly polarizing plate.

The circularly polarizing plate is fabricated by combining a linearly polarizing plate with a λ/4 phase difference plate. A pair of linearly polarizing plates are provided on the front and rear sides of the panel so as to sandwich the liquid crystal layer, and both on the front and rear sides of the panel, the linearly polarizing plate is disposed on the side that is farther from the liquid crystal layer and the λ/4 phase difference plate is disposed on the side that is closer to the liquid crystal layer. The reflected light of the light entering the interior of the device through the circularly polarizing plate in the circularly polarized light mode becomes the circularly polarized light with a rotation direction opposite to that of the incident light during the reflection. Therefore, where the reflected light falls again on the λ/4 plate on the incidence side, a cross Nicol state is realized in relation to that when the light falls on the linearly polarizing plate, and the light is therefore absorbed by the linearly polarizing plate. As a consequence, in a liquid crystal display device using a circularly polarizing plate the light reflected inside due to the structure of the polarizer itself is absorbed and has substantially no relation to the internal reflection.

However, in the case of a circularly polarized light mode, the light is not completely converted into the circularly polarized light due to wavelength dependence of the λ/4 plate or oblique incidence of the light on the λ/4 plate. For this reason, the contrast ratio is often lower than that in the case of a linearly polarized light mode. Therefore, in a liquid crystal display device in which a high contrast ratio is desired, as in TV sets, the linearly polarized light mode is preferred over the circularly polarized light mode. The reduction of internal reflection in this case is especially effective. In other words, in a linearly polarized light mode, the reflected light that has been reflected inside the liquid crystal display device passes through the linearly polarizing plate and goes out to the observer, without being absorbed, by the circularly polarizing plate, as in the case of the circularly polarized light mode, and the reflected light can be viewed by the observer. Therefore, it makes sense or reduce the effect, of such, reflected light.

Therefore, in the display device of the present invention, the above mentioned display device is preferably a liquid crystal display device, that is, the above mentioned internal structure is preferably provided with a first substrate, a liquid crystal layer, and a second substrate that are stacked in the order of description from the observation surface side toward the rear surface side, and it is further preferred that both the first substrate and the second substrate be provided with polarizers and that the light transmitted by the above mentioned polarizers and also transmitted by the liquid crystal layer be linearly polarized light. In the present description, the "linearly polarized light" means polarized light with oscillations along a substantially straight line, when viewed from a direction facing the light propagation direction. In order to convert the light transmitted by the liquid crystal layer into linearly polarized light, it is preferred that no member converting the light polarization state between the polarizer provided at the first substrate and the polarizer provided, at the second substrate be disposed between the two polarizers. More specifically, it is preferred that no phase difference structure with a phase difference (when viewed, from the direction orthogonal to the display screen) within a range of 95 to 195 nm that is about ¼ of 550 nm, which is the center wavelength of visible light, be disposed between the first polarizer and the second polarizer.

When conducting a comprehensive study of specific means for inhibiting the internal reflection of display devices, the inventors focused their attention on changes in refractive index between the layers in a substrate having a plurality of layers with mutually different refractive indexes. The inventors have then, discovered that with the configuration in which the refractive indexes between the layers do not change intermittently in layer units and in which the refractive indexes in at least the interfaces of layers are substantially equal to each other and the refractive index changes continuously and without interruption within one layer, the light is not affected by changes in the refractive index and the light is transmitted as is between the layers constituted, by a plurality of materials with mutually different refractive indexes. Further, it has been found that with such a configuration, the transmittance is greatly increased and therefore the reflectance is significantly reduced. These findings suggested the possibility of effectively resolving the above mentioned problems and led to the creation of the present invention.

Thus, the present invention also provides a multilayer substrate comprising a first layer and a second layer disposed adjacently to the first layer, in which the refractive index of the above mentioned second layer varies continuously from the interface where the second layer is adjacent to the first layer in the direction from the first layer, with variation being started at a value of the refractive index at the interface where the first layer is adjacent to the second layer (also referred to hereinbelow as the "first multilayer substrate of the present, invention").

The first multilayer substrate of the present invention comprises a first layer and a second layer disposed adjacently to the first layer. The materials of the first layer and second layer are not particularly limited, and may be individual elements, inorganic compounds, or organic compounds, as long as the layers have stationary shapes (solid bodies).

The refractive index of the above mentioned second layer varies continuously from the interface where the second layer is adjacent to the first, layer in the direction from the first layer, with the variation being started at a value of the refractive index at the interface where the first layer is adjacent to the second layer. Thus, the refractive index at the interface where the above mentioned first layer is adjacent to the second, layer is substantially equal to the refractive index at the interface where the second layer is adjacent to the first layer. Since the reflection of light occurring at the interface between the first layer and second layer increases when the difference in refractive index at the interfaces of layers between the first layer and second layer is large, the refractive indexes of layers at least at the interfaces of the mutually adjoining layers are substantially identical in the first layer and second layer. The wording of "refractive indexes are substantially identical" in the present description includes a range in which the difference in refractive index is allowed to a degree such that no light reflection occurs. More specifically, from the standpoint of preventing the reflection of light, it is preferred that the difference in refractive index be equal to or less than 0.04, and it is even more preferred that the above mentioned difference in refractive index be equal to or less than 0.01.

In the present description, the wording of "the refractive index changes continuously" means that the refractive index distribution of the refractive index of the second layer in which the thickness direction of the second layer is plotted against the abscissa and, for example, the wavelength is plotted against the ordinate has no interruptions and is represented by a gently inclined line. The inclination angle may differ depending on the region. The wavelength region in this case is preferably that of visible light (380 to 780 nm). The gentle line obtained in the above mentioned plot is not necessarily a straight line and may be a curved line, but a straight line inclined at a uniform angle is preferred. The variation trend may be that of increase or that of decrease.

With the configuration of the first multilayer substrate of the present invention, even in the case of a structure in which a plurality of layers constituted by materials with different refractive indexes are stacked, practically the entire light is transmitted between the plurality of layers. Therefore, light reflection can be prevented. For example, when the multilayer substrate of the present invention is used as a substrate constituting a display, it is possible to fabricate a display device in which the decrease in contrast caused by light reflection is inhibited.

The configuration of the first multilayer substrate of the present invention is not especially limited as long as it essentially includes such components.

The preferred configurations of the first multilayer substrate of the present invention are described below: (1) the above mentioned multilayer substrate further has a third layer disposed adjacently to the second, layer, and the refractive index of the above mentioned second layer varies continuously till an interface where the second layer is adjacent to the third layer, with the variation being ended at a value of the refractive index at an interface where the second layer is adjacent to the third layer; (2) a layer having on the surface thereof a plurality of protrusions with a width between the adjacent apex points of equal to or less than the visible light wavelength is disposed on the first layer on an opposite side thereof to the second layer; and (3) the second layer includes particles having a refractive index that differs from the refractive index at the interface adjoining the first layer, and the concentration of the above mentioned particles in the second layer varies continuously in the direction from the first layer. If necessary, these configurations (1) to (3) can be combined as appropriate, and the combinations thereof make it possible to obtain a reflection preventing effect superior to that obtained with individual configurations.

The preferred configuration (1) of the first multilayer substrate of the present invention has not only the first layer and second layer, but also the third layer located on the second layer. The material of the third layer is not particularly limited, and may be an individual element, an inorganic compound, or an organic compound, as long as the layer has a stationary shape (solid, body). The relationship between the refractive indexes at the interfaces where the above mentioned second layer and third layer are mutually adjoined, is similar to the relationship between the above mentioned first layer and second, layer. Therefore, because the third layer formed on the second layer has such a specific feature, practically the entire light also passes through the boundary of the second layer and third layer. As a result, the transmission of light from the first layer to the third layer is facilitated and a multilayer substrate with excellent reflection preventing characteristic can be obtained. Likewise, the reflection preventing effect can be also similarly obtained in the case in which additional layers having such a specific feature are also formed.

Further, in the preferred configuration (1) of the first multilayer substrate of the present invention, the refractive index of the third layer can vary continuously from an interface where the third layer is adjacent to the second layer in a direction from the second layer, with the variation being started at a value of the refractive index at the interface where the second layer is adjacent to the third layer. With such a configuration, for example, even when an additional layer having a refractive index different from that of the third layer is further formed adjacently to the third layer, the generation of reflected light at the boundary of the third layer and the above mentioned additional layer can be easily inhibited.

In the preferred configuration (2) of the first multilayer substrate of the present invention, the above-described moth eye film is disposed on the first layer on the surface thereof, from among the two surfaces thereof, on an opposite side thereof to the second layer. As described hereinabove, where a moth eye structure is provided, the variations in refractive index within the region of the first layer on the opposite side to the second layer side, that is, between the outer space (air layer) and the first layer can be made continuous. Therefore, practically the entire light is transmitted by the boundary between the outer space (air layer) and the first layer and the reflectance is greatly reduced.

In the preferred configuration (3) of the first multilayer substrate of the present invention, the second layer includes particles having a refractive index that differs from the refractive index of the material constituting the first layer. More specifically, (i) when the refractive index of the first layer is lower than the refractive index of the third layer, the second layer includes particles having a refractive index that is higher than the refractive index of the region adjoining to the first layer, and the concentration of the particles in the second layer increases continuously in the direction from the first layer, and (ii) when the refractive index of the first layer is higher than the refractive index of the third layer, the second layer includes particles having a refractive index that is lower than the refractive index of the region adjoining to the first layer, and the concentration of the particles in the second layer increases continuously in the direction from the first layer.

Since the particles contained in the second layer have a refractive index different from the refractive index of the first layer, the refractive index distribution in the second layer can be adjusted by adjusting the concentration distribution of the particles in the second layer. In the present description, the wording of "the refractive index changes continuously" means that the refractive index distribution of the refractive index of the second layer in which the thickness direction of the second layer is plotted against the abscissa and, for example, the wavelength is plotted against the ordinate has no interruptions and is represented by a gently inclined line. The inclination angle may differ depending on the region. The wavelength region in this case is preferably that of visible light (380 nm to 780 nm). The gentle line obtained in the above mentioned plot is not necessarily a straight line and may be a curved line, but a straight line inclined at a uniform angle is preferred. Therefore, when the second layer includes particles having a refractive index higher than the refractive index of the region adjacent to the first layer, by setting the particles farther from the first layer, it is possible to obtain a structure in which the refractive index increases continuously in the direction from the first layer, and the difference in refractive index at the mutual interfaces of the first layer and second layer is greatly reduced. Further, when the second layer includes particles having a refractive index lower than the refractive index of the region adjacent to the first layer, by setting the particles farther from the first layer, it is possible to obtain a structure in which the refractive index decreases continuously in the direction from the first layer, and the difference in refractive index at the mutual interfaces of the first layer and second layer is greatly reduced.

By so adjusting the distribution of particle concentration in the second layer, it is possible to adjust the refractive index inside the second layer so that the refractive index varies continuously and to obtain a multilayer substrate with greatly improved antireflection characteristic. Even more preferred configurations relating to the preferred configuration (1) of the first, multilayer substrate will be described below.

It is preferred that the second, layer include a medium, enclosing the particles and the refractive index of the medium be a refractive index at the interface between the first layer and the second layer adjacent thereto. When, the second layer includes two constituent elements, namely, the particles having a refractive index higher than the refractive index of the region adjacent to the first layer and the medium enclosing the particles, the refractive index of the medium can be made substantially equal to the refractive index of the region of the first layer that is adjacent to the second layer, and the second layer, except for the particles, has a refractive index substantially equal to the refractive index of the region of the first layer that is adjacent to the second layer. Therefore, the second layer in which the refractive index changes continuously in the direction from the first layer can be formed by only adjusting the concentration distribution of particles that are the remaining constituent element of the second layer.

The particles are preferably black or transparent. The black color is capable of absorbing light better than other colors. Therefore, by using black particles, it is possible to reduce the amount of reflected light. Where the particles are transparent, light transmittance can be increased over that in the case of particles of other colors. Therefore, the amount of reflected light can be reduced. Where the particles have another color, the transmitted light can be colored, for example, when the light is transmitted by the multilayer substrate.

The second layer preferably includes nanoparticles with a diameter equal to or less than the visible light wavelength. The shape of the nanoparticles is not particularly limited. In the present description, the particle diameter is the diameter of the largest portion of the nanoparticles. The particle diameter can be measured, for example, by using an optical microscope. It is preferred, that the diameter of the nanoparticles be equal to or greater than 20 nm. By additionally including the nanoparticles with a diameter equal to or less than the visible light wavelength into the second layer, it is possible to average optically the refractive index inside the second layer to a better degree and to obtain a refractive index distribution with a more uniform slope. Where the diameter of the nanoparticles is larger than the lower limit (380 nm) of the visible light wavelength, the reflectance is conversely increased.

Further, the present invention also provides a multilayer substrate including a fourth layer and a fifth layer disposed adjacently to the fourth layer, wherein the fourth layer has a plurality of protrusions with a width between the adjacent apex points of equal to or less than the visible light wavelength on the surface thereof at the fifth layer side, and the fifth layer has a plurality of depressions filling the spaces between the plurality of protrusions on the surface thereof on the fourth layer side (this multilayer substrate will be referred to hereinbelow as the second multilayer substrate of the present invention). The materials of the fourth layer and fifth layer are not particularly limited, and may be individual elements, inorganic compounds, or organic compounds, as long as the layers have stationary shapes (solid bodies).

Each of a plurality of protrusions formed on the surface of the fourth layer has a substantially drill shape, that is, a shape such that the width decreases gradually in the direction toward the tip. In other words, the surface of the fourth layer is constituted by a moth eye structure. Further, the fifth layer has a plurality of depressions filling the spaces between the plurality of protrusions on the surface thereof on the fourth layer side. Thus, the surface of the fifth layer is constituted by a structure symmetrical to a moth eye structure. As described hereinabove, light reflection also occurs at the boundary between media when, light is transmitted, between media with different refractive indexes. Such reflection occurs at interfaces with a discontinuous refractive index. The amount of reflected light in this case is determined by the ratio of the second power of the difference in refractive index between the media and the second power of the sum of the refractive indices. Due to the shape thereof, the moth eye structure demonstrates the effect of connecting continuously the interfaces with discontinuous refractive indexes. Therefore, in the region in which such, mutually adjacent layers are constituted by a moth eye structure and a structure symmetrical thereto, the refractive index changes continuously from the refractive index of the fourth layer to the refractive index of the fifth layer, the discontinuity of refractive index received by the light transmitted through the region in which the protrusions of the fourth, layer mesh with, the depressions of the fifth layer is eliminated, practically the entire light passes through the boundary of the fourth layer and fifth layer, and the reflectance occurring at the boundary of the fourth layer and fifth layer is greatly reduced.

In the second multilayer substrate of the present invention, similarly to the above mentioned first multilayer substrate of the present invention, the above-described moth eye film is preferably disposed on that surface of the fourth layer, from among the two surfaces thereof, which is on the opposite side the fifth layer. Thus, it is preferred, that a layer having on the surface thereof a plurality of protrusions with a width between the adjacent apex points of equal to or less than the visible light wavelength be disposed on the fourth layer on the opposite side thereof to the fifth layer. As a result, the refractive index can be made to change continuously between the outer space (air layer) and the fourth layer. Therefore, practically the entire light is transmitted by the boundary between the outer space (air layer) and the fourth layer and the reflectance is greatly reduced.

Further, the present, invention also provides a multilayer substrate including a sixth layer, a seventh layer, and an intermediate layer disposed between the sixth layer and the seventh layer, and the refractive index of the intermediate layer changes continuously so as to connect the refractive index of the sixth layer and the refractive index of the seventh layer (this multilayer substrate will be referred to hereinbelow as the third multilayer substrate of the present invention). The materials of the sixth layer and seventh layer are not particularly limited, and may be individual elements, inorganic compounds, or organic compounds, as long as the layers have stationary shapes (solid bodies). Since the refractive index of the intermediate layer disposed between the sixth layer and the seventh layer changes continuously so as to connect the refractive index of the sixth layer and the refractive index of the seventh layer, the discontinuity of refractive index received by the light transmitted through these layers is eliminated, practically the entire light passes through the boundary of the sixth layer and intermediate layer and the boundary of the intermediate layer and seventh layer, and the reflectance is greatly reduced.

In the third multilayer substrate of the present invention, similarly to the above mentioned first multilayer substrate and second multilayer substrate of the present invention, the above-described moth eye film is preferably disposed on that surface of the sixth layer, from among the two surfaces thereof, which is on the opposite side to the seventh layer. Thus, it is preferred that a layer having on the surface thereof a plurality of protrusions with a width between the adjacent apex points of equal to or less than the visible light wavelength be disposed on the sixth layer on the surface thereof on the opposite side to the seventh layer. As a result, the refractive index can be made to change continuously between the outer space (air layer) and the sixth layer. Therefore, practically the entire light is transmitted by the boundary between the outer space (air layer) and the sixth layer and the reflectance is greatly reduced.

In the third multilayer substrate of the present invention, it is preferred that the intermediate layer-include particles having a refractive index of the seventh layer and the concentration of the particles in the intermediate layer increase continuously in the direction from the sixth, layer. Further, in the third multilayer substrate of the present invention, it is also preferred that the intermediate layer include particles having a refractive index of the sixth layer and the concentration of the particles in the intermediate layer decrease continuously in the direction from the sixth layer.

When the intermediate layer includes particles having a refractive index different from that of the sixth layer or seventh layer, the distribution of refractive index inside the intermediate layer can be adjusted by adjusting the distribution of particle concentration inside the intermediate layer. Therefore, when the refractive index of the seventh layer is higher than the refractive index of the sixth layer, a structure in which the refractive index increases continuously in the direction from, the sixth layer can be obtained by including the particles with a refractive index equal to the refractive index of the seventh layer into the intermediate layer, and bringing the particles farther from the sixth layer and closer to the seventh layer. In this case, the refractive index of the sixth layer and the refractive index of the seventh layer can be connected by the intermediate layer. When the refractive index of the seventh layer is lower than the refractive index of the sixth layer, a structure in which the refractive index decreases continuously in the direction from the sixth layer can be obtained by including the particles with a refractive index equal to the refractive index of the sixth layer into the intermediate layer, and bringing the particles closer to the sixth layer and farther from the seventh layer. In this case, the refractive index of the sixth layer and the refractive index of the seventh layer can be connected by the intermediate layer.

By so adjusting the concentration distribution of particles in the intermediate layer, it is possible to adjust easily the refractive index so that the refractive index changes continuously inside the intermediate layer and to obtain a multilayer substrate with the antireflection characteristic greatly improved with respect to that attained in the case in which the refractive index changes intermittently.

When the concentration of the particles inside the intermediate layer increases continuously in the direction from the sixth layer, it is preferred that the intermediate layer include a medium enclosing the particles, and the refractive index of the medium be a refractive index of the sixth layer. Further, when the concentration of the particles inside the intermediate layer decreases continuously in the direction from the sixth layer, it is preferred that, the intermediate layer include a medium enclosing the particles, and the refractive index of the medium be a refractive index of the seventh layer.

When the intermediate layer includes two constituent elements, namely, the particles having a refractive index of the seventh layer and the medium enclosing the particles, where the refractive index of the medium is made equal to the refractive index of the sixth layer, the intermediate layer, except for the particles, will have a refractive index of the sixth layer. Therefore, the refractive index of the intermediate layer can be caused to change continuously in the direction from the sixth layer and to be connected to the refractive index of the seventh layer by only adjusting the concentration distribution of the particles that are the remaining constituent elements of the intermediate layer.

When the intermediate layer includes two constituent elements, namely, the particles having a refractive index of the sixth, layer and the medium enclosing the particles, where the refractive index of the medium, is made equal to the refractive index of the seventh layer, the intermediate layer, except for the particles, will have a refractive index of the seventh layer. Therefore, the refractive index of the intermediate layer can be caused to change continuously in the direction from the sixth layer and to be connected to the refractive index of the seventh layer by only adjusting the concentration distribution of the particles that are the remaining constituent element of the intermediate layer.

The above mentioned particles are preferably black or transparent. The black color is capable of absorbing light better than other colors. Therefore, by using black particles, it is possible to reduce the amount of reflected light. Where the particles are transparent, light transmittance can be increased over that of particles of other colors. Therefore, the amount of reflected light can be reduced. Where the particles have another color, the transmitted light can be colored, for example, when the light is transmitted by the multilayer substrate.

The intermediate layer preferably includes nanoparticles with a diameter equal to or less than the visible light wavelength. The shape of the nanoparticles is not particularly limited. The particle diameter can be measured, for example, by using an optical microscope. It is preferred that the diameter of the nanoparticles be equal to or greater than 20 nm. By additionally including the nanoparticles with a diameter equal to or less than the visible light wavelength into the intermediate layer, it is possible to average optically the refractive index inside the intermediate layer to a better degree and to obtain a refractive index distribution with a more uniform slope. Where the diameter of the nanoparticles is larger than the lower limit (380 nm) of the visible light wavelength, the reflectance is conversely increased.

The preferred configuration of the internal structure of the display device of the present invention is explained below. The same effect can be also obtained when the below-described configuration is used in the internal structure of an image pickup element.

The internal structure is preferably provided with the above mentioned multilayer substrate (any of the first to third multilayer substrates of the present invention). The reflectance of light reflected by the internal structure in the display device of the present invention is reduced to less than 1.0%, even less than 0.5%. Therefore, the above-described multilayer substrate of the present invention is very effective for use in the display device of the present invention.

The internal structure is preferably a liquid crystal display panel in which a first substrate, a liquid crystal layer, and a second substrate are stacked in the order of description from the observation surface side to the back surface side. In other words, in this embodiment, the display device of the present invention is used in a liquid crystal display device, and the observation surface side means the screen, surface side. A liquid crystal display device usually has a pair of substrates sandwiching a liquid crystal layer, and members such as color filters, black matrix, electrodes, wirings, and semiconductor elements are provided on the pair of substrates. Such, members include those having a high reflectance. Further, in a stacked portion constituted by a plurality of layers formed from different materials, light reflection easily occurs on the boundaries between the plurality of layers due to a difference in refractive index between the materials of the plurality of layers. Due to such specific features of the liquid crystal display device, the specific features of the present invention can be advantageously applied to the liquid crystal display device.

The first substrate and/or the second substrate is preferably the above mentioned multilayer substrate (any of the first to third multilayer substrates of the present invention). By using the multilayer substrate of the present invention in a liquid crystal display device, it is possible to reduce the internal reflection in the liquid crystal display device and obtain a liquid crystal display device having excellent contrast ratio even in a bright surrounding environment. When, examples with respect to the first substrate and the second substrate are provided in further detail, the first substrate is a color filter substrate and the second substrate is an array substrate, or the first substrate is a transparent substrate and the second substrate is a color filter on-array substrate provided with color filters and pixel electrodes.

The internal structure is preferably provided with at least one conductive layer having the front surface constituted by any one material selected from the group consisting of copper oxide, silver oxide, titanium nitride, and tantalum oxide. From the standpoint of electric conductivity and reliability, it is preferred that a low-resistance metal such as aluminum (Al), silver (Ag), copper (Cu), and nickel (Ni) be used for wirings provided in the internal structure of the display device and electrodes of thin-film transistors. However, these materials have a high reflectance. By contrast, since copper oxide has black color and absorbs light easier than copper, the reflectance thereof is low. Likewise, silver oxide has black color and absorbs light easier than silver, titanium nitride has black color and absorbs light easier than titanium, and tantalumoxide has black color and absorbs light easier than tantalum. Therefore, these materials are effective in terms of inhibiting the internal reflection of the display device. It is preferred that these materials be used in combinations thereof. It is preferred that titanium nitride be used at locations for which titanium is preferred and tantalum oxide be used at locations for which tantalum is preferred. As a result, the internal reflectance of the display device can be reduced more efficiently.

It is preferred that the internal structure comprise at least one stacked structure of a conductive layer having aluminum as a constituent material and a conductive layer having any one material selected from the group consisting of titanium, tantalum, molybdenum, and magnesium as a constituent material that is positioned on the observation surface side from the conductive layer having aluminum as a constituent material. When aluminum is used for the conductive layer, it is preferred that a conductive layer of a different material be additionally provided on the aluminum film surface because hillocks (fine projections) are easily formed on the aluminum film surface. A conductive layer having titanium, tantalum, molybdenum, or magnesium as a constituent material can be used as the conductive layer provided on the aluminum film surface. When such a conductive layer is used, the reflectance can be reduced by 30 to 40% with respect to that attained when aluminum alone is used as a material for the conductive layer. As a result, the internal reflection in the display device can be inhibited. Further, it is preferred that these materials be combined with each other as appropriate. For example, a configuration may be used in which molybdenum is stacked on aluminum at some locations and magnesium is stacked on aluminum at other locations. As a result, the internal reflection of the display device can be reduced more efficiently.

The internal structure preferably comprises a conductive layer constituted by any one material selected from the group consisting of oxidized or nitrided silicon and aluminum-silicon alloys. Such a conductive layer can be easily formed in a mixed gas atmosphere of oxygen and nitrogen, and the film thus formed functions as a member with a low reflectance.

It is also preferred that the internal structure comprise at least one conductive layer constituted by any one material selected from the group consisting of aluminum, copper, silver, and nickel and have a light-blocking film on a region superimposed on the conductive layer, and the light-blocking film be positioned on the observation surface side from the conductive layer. Even when the conductive layer used in the internal structure has a high reflectance, the reflection based on the internal structure can be inhibited by disposing a material with a low reflectance on the observation surface side from the member with a high reflectance. The light-blocking film is from a photosensitive resin, that is used, when patterning the conductive layer by a photolithography method, and from the standpoint of production efficiency, it is preferred that the photosensitive resin include a black pigment. For example, when the conductive layer is used for wirings, the conductive layer should be precisely patterned. A resist (photosensitive resin) that is used for patterning can be used efficiently as a member for reducing the reflectance by admixing a black pigment thereto, performing wiring processing by etching, and then leaving the resist as is, that is, without stripping. Carbon particles and titanium nitride particles are preferred as the above mentioned black pigment because of high production, efficiency and low reflection ability. These materials are preferably used by combining them with each other as appropriate. For example, it is preferred, that a light-blocking film be formed on the region superimposed on the conductive layer having aluminum as a constituent material and a region superimposed on the conductive layer having copper as a constituent material. As a result, the internal reflection of the display device can be reduced more efficiently.

The photosensitive resin including a black pigment may be used, not only as the patterning resist. Thus, it is also possible to coat the resin on the produced array substrate having a stacked structure including a conductive layer and then expose the coated resin from the opposite side to the coated side (front surface side of the resin), thereby leaving the coated resin only on the wirings and electrode layer of the array substrate. The advantage of such a procedure is that the wiring pattern of the produced array substrate uses the photosensitive resin including the black pigment as a patterning mask and the light-blocking film can be formed on the array substrate, without using additional masks.

It is preferred that the processing operations performed to reduce the reflectance of reflection occurring on the surface of the above-described wirings and electrodes in the display device of the present invention be used in combinations thereof. With such combinations, the reflectance of light reflected by the internal structure of the display device of the present invention can be reduced to less than 1.0% and even to less than 0.5% more efficiently.

THE EFFECT OF THE INVENTION

The present invention makes it possible to obtain a display device having a high contrast ratio even in an environment with bright surrounding area. Further, with the multilayer substrate of the present invention, it is possible to inhibit the reflection of light occurring at interfaces of a plurality of layers.

DESCRIPTION OF THE PREFERRED EMBODIMENTS

Figure 1:
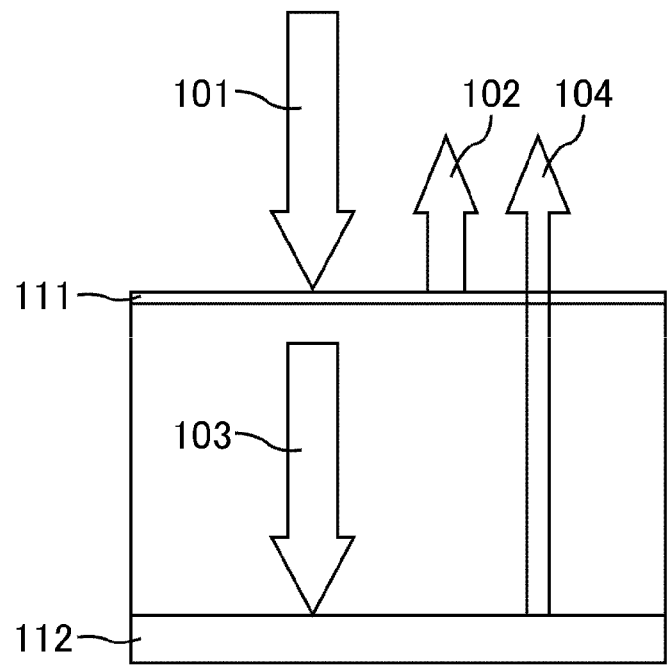
FIG. 1 is a schematic diagram illustrating how the reflection, is caused by the structure of the display device of the present invention.
Figure 2:
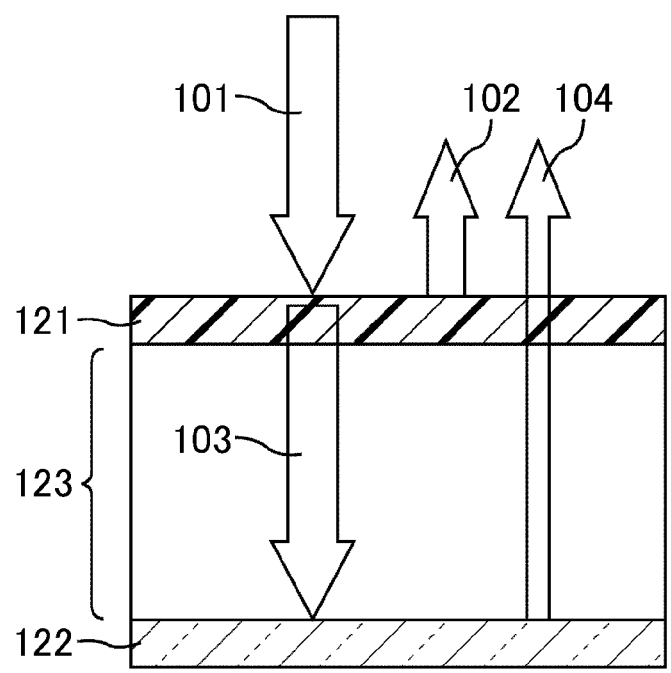
FIG. 2 is a schematic diagram illustrating how the reflection is caused by the structure of the liquid crystal display device of the present invention.

The present invention will be mentioned, in more detail referring to the drawings in the following embodiments, but is not limited to these embodiments.

Embodiment 1

Embodiment 1 relates to a multilayer substrate that can be used as a color filter substrate in a liquid crystal display device. The multilayer substrate according to Embodiment 1 is the second multilayer substrate of the present invention. The multilayer substrate according to Embodiment 1 has a polarizer, a glass substrate (transparent substrate), a moth eye film, a color filter layer, a black matrix (BM), and a common electrode.

Figure 3:
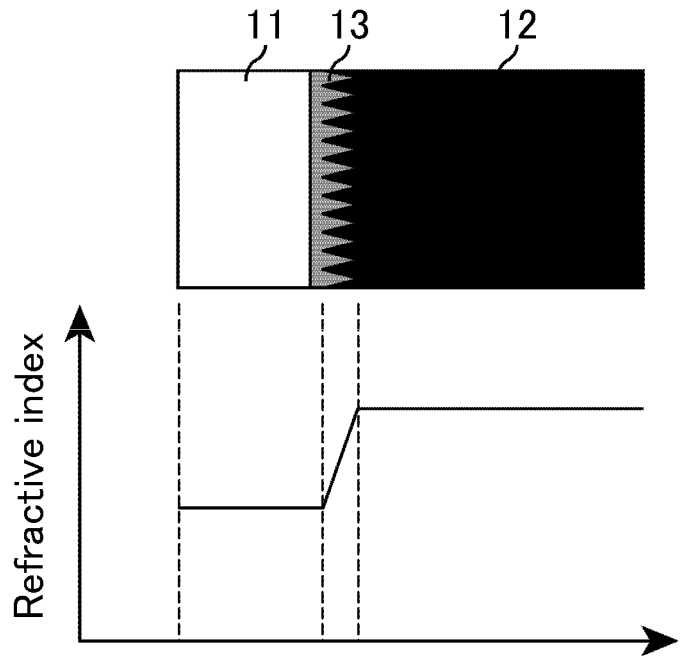
FIG. 3 is a schematic diagram in which a portion of the glass substrate, moth eye film, and black matrix of the multilayer substrate of Embodiment 1 is extracted; this figure shows the arrangement configuration of the glass substrate, moth eye film, and black matrix and the refractive index distribution thereof.

FIG. 3 is a schematic diagram in which portions of glass substrate, moth eye film, and black matrix of the multilayer substrate of Embodiment 1 are extracted. This figure shows the arrangement configuration of the glass substrate, moth eye film, and black matrix and refractive index distribution thereof. In Embodiment 1, a moth eye film 13 corresponds to the fourth layer of the present invention, and a BM 12 corresponds to the fifth layer of the present invention.

The moth eye film 13 is constituted by an acrylic UV resin (for example, urethane acrylate) for nano imprint molding. The BM 12 is constituted by carbon black particles demonstrating the black color of the BM 12 and a binder resin (medium) enclosing the carbon black particles. The refractive index of glass is about 1.5 and the refractive index of the acrylic UV resin for nano imprint molding is about 1.5. The refractive index of the binder resin is about 1.5 and the refractive index of carbon black particles is about 2.0. The carbon black particles included in the BM 12 are uniformly distributed in the layer constituting the BM 12. Therefore, when the BM 12 is viewed as a whole, the refractive index has a value of about 1.8 that is obtained by averaging the refractive index of the binder resin and carbon black particles.

Examples of the binder resin materials include acrylic resins, methacrylic resins, thiol-ene resins, and UV polymerizable resins for nano imprint molding including one or a combination of such resins. It is useful to adjust the refractive index in the binder resin from the following standpoints. (i) When a refractive index distribution of glass substrate, moth eye film, and black matrix is designed in a multilayer configuration, a composite configuration (carbon black particles and binder resin) can be selected by adjusting the refractive index of the binder resin according to the refractive index of carbon black particles. For example, a case can be supposed in which the refractive index is adjusted by selecting as the binder resin material a material with an average refractive index lower than the average refractive index (about 1.5) in the target composite system. (ii) Likewise, when carbon black particles to be dispersed in the resin are used in a plurality of types and the average refractive index thereof is less than about 2.0, the refractive index of the BM 12 as a whole can be adjusted by setting the refractive index of the binder resin to a value higher than the aforementioned target value.

As shown in FIG. 3, the moth eye film 13 is disposed between the glass substrate 11 and the BM 12. A plurality of protrusions with a width between the adjacent apex points equal to or less than, the visible light wavelength is formed on the surface of the moth eye film 13, and a protrusion-depression structure (moth eye structure) having a very small period is thus configured. Each of the protrusions (unit structure of the moth eye structure) has a structure such that the refractive index increases continuously tip to bottom. Meanwhile, the BM 12 is formed to be embedded between, the plurality of protrusions of the moth eye film 13. Therefore, the BM 12 has a structure symmetrical to the moth eye structure. More specifically, a plurality of depressions having a structure symmetrical to that of the protrusions of the moth eye film 13 is formed on the surface of the BM 12 at the moth eye film 13 side.

In the region in which the protrusions of the moth eye film 13 mesh with the depressions of the BM 12, two layers with mutually different refractive indexes are mated. As the thickness of this region increases, the volume ratios of the protrusions of the moth eye film 13 and the depressions of the BM 12 change regularly. Further, since the width between the adjacent apex points of the moth eye film 13 is equal to or less than the visible light wavelength, changes in the volume ratio thereof are small. As a result, in the region where the protrusions of the moth eye film 13 mesh with the depressions of the BM 12, the refractive index changes continuously and the graph such as shown in FIG. 3 can be obtained.

The refractive index of the moth eye film is about 1.5 and the refractive index of the BM 12 is about 1.8. In the region, where the protrusions of the moth eye film 13 and the depressions of the BM 12 mesh, the refractive index changes from about 1.5 to about 1.8. Therefore, where the multilayer substrate of Embodiment 1 is viewed as a whole, a configuration is obtained in which the refractive index does not change intermittently from the glass substrate 11 to the BM 12. Therefore, according to the configuration of the multilayer substrate of Embodiment 1, light is transmitted, as is through the glass substrate 11, moth eye film 13, and BM 12, and the effect of reflectance reduction can thus be obtained. Further, since carbon black particles having black color are used in Embodiment 1 as particles constituting the BM 12, the component that is not transmitted by the BM 12 is easily absorbed by the carbon black particles. One more specific feature of such a configuration of Embodiment 1 is that a region in which the refractive index changes continuously is formed, by two layers.

The surface structure of the moth eye film will be described, below in greater detail. The moth eye film used in Embodiment 1 has on the surface thereof a plurality of protrusions with a width between the apex points of adjacent protrusions being equal to or less than the visible light wavelength. The moth eye film, of Embodiment 1 has a structure in which a plurality of protrusions are present such that the distance between the apex points of adjacent protrusions (width of the adjacent protrusions in the case of an aperiodic structure) or pitch (width of the adjacent protrusions in the case of a periodic structure) is equal to or less than the visible light wavelength. It is preferred that the protrusions in Embodiment 1 do not have a regular arrangement (aperiodic arrangement). The advantage of such a configuration is that no unnecessary diffraction light is generated.

Figure 4:
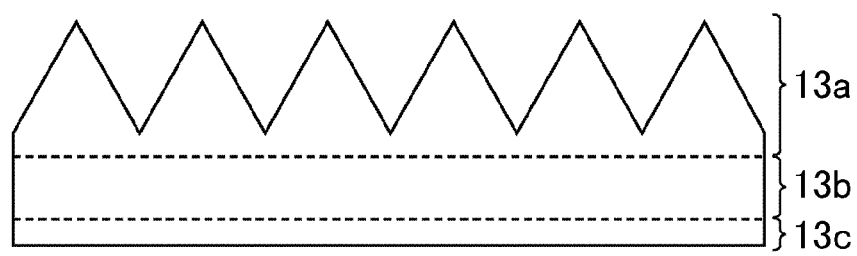
FIG. 4 is a schematic cross-sectional view illustrating the case in which the moth eye film of Embodiment 1 is configured by stacking.

FIG. 4 is a schematic cross-sectional view illustrating the case in which the moth eye film of Embodiment 1 is configured by stacking. The moth eye film may have a monolayer structure or a stacked structure. When the moth eye film is constituted by a stack as shown in FIG. 4, a protrusion-depression portion 13a in which a plurality of protrusions are configured on the surface and a support portion 13b that supports the protrusion-depression portion 13a may be films of different materials. An adhesive portion 13c for bonding the moth eye film to a base material may be provided on the surface of the support portion 13b that is on the opposite side to the surface facing the protrusion-depression portion 13a. In this case, the materials constituting the protrusion-depression portion 13a, support portion 13b, and adhesive portion 13c should have substantially same refractive index.

Examples of materials suitable for constituting the protrusion-depression portion of the moth eye film include resins that can be used for photo nano imprinting and thermal nano imprinting and are curable under predetermined conditions. As mentioned hereinabove, photocurable resins such as acrylate resins and methacrylate resins that enable photo nano imprinting with particularly accurate patterning are preferred.

Examples of materials suitable for constituting the support portion 13b of the moth eye film include resin materials such as triacetyl cellulose, polyethylene terephtnalate, polyolefin resins such as cyclic olefin polymers (typical examples include Zeonoa (manufactured by Nippon Zeon Co., Ltd.), which is a norbornene resin, and Arton (manufactured by JSR Corp.), polypropylene, polymethyl pentene, polycarbonate resins, polyethylene naphthalate, polyurethanes, polyether ketones, polysulfones, polyether sulfones, polyesters, polystyrene resins, and acrylic resins.

The material constituting the adhesive portion 13c of the moth eye film is not particularly limited. An anchor processed layer or a hard coat layer for improving the adhesion may be formed between, the support, portion 13b and adhesive portion 13c of the moth eye film.

Figure 5:
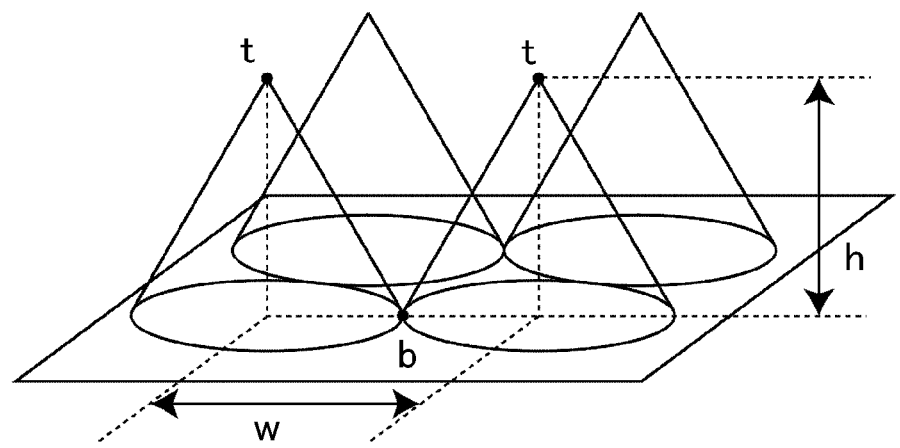
FIG. 5 is a perspective view of the moth eye film of Embodiment 1; this figure illustrates the case in which the unit structure of the protrusion is a cone.
Figure 6:
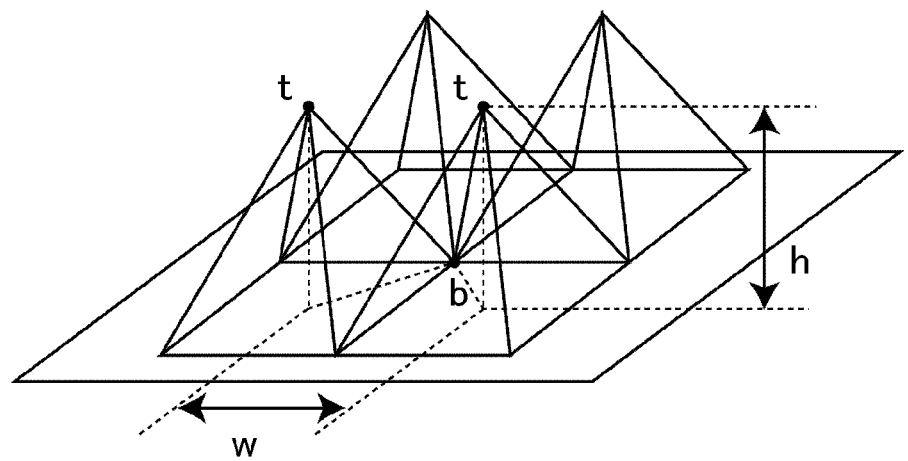
FIG. 6 is a perspective view of the moth eye film of Embodiment 1; this figure illustrates the case in which the unit structure of the protrusion is a tetragonal pyramid.
Figure 7:
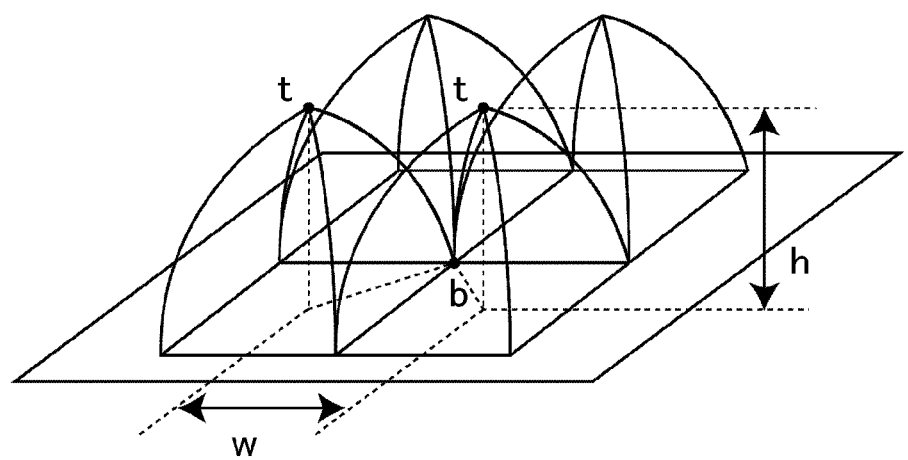
FIG. 7 is a perspective view of the moth eye film of Embodiment 1; this figure illustrates the case in which the unit structure of the protrusion has a gentle slope from the bottom point to the vicinity of the apex point and the tip is sharp.
Figure 8:
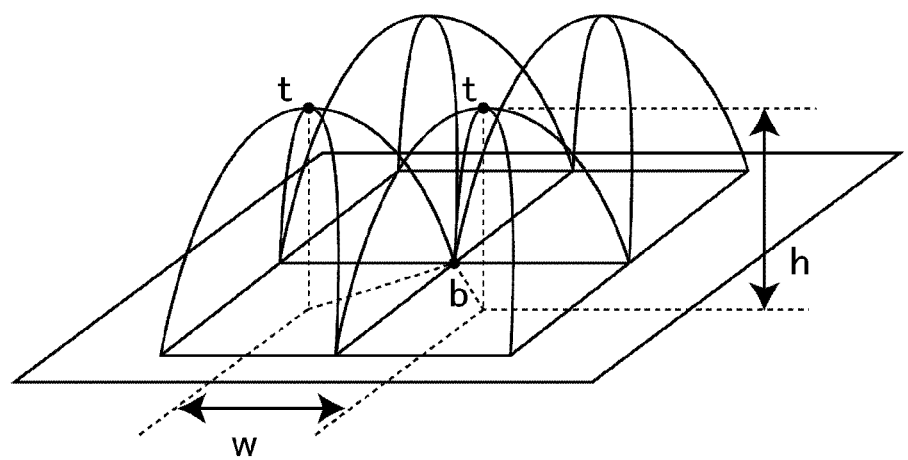
FIG. 8 is a perspective view of the moth eye film of Embodiment 1; this figure illustrates the case in which the unit structure of the protrusion has a gentle slope from the bottom point to the vicinity of the apex point and the tip is rounded.
Figure 9:
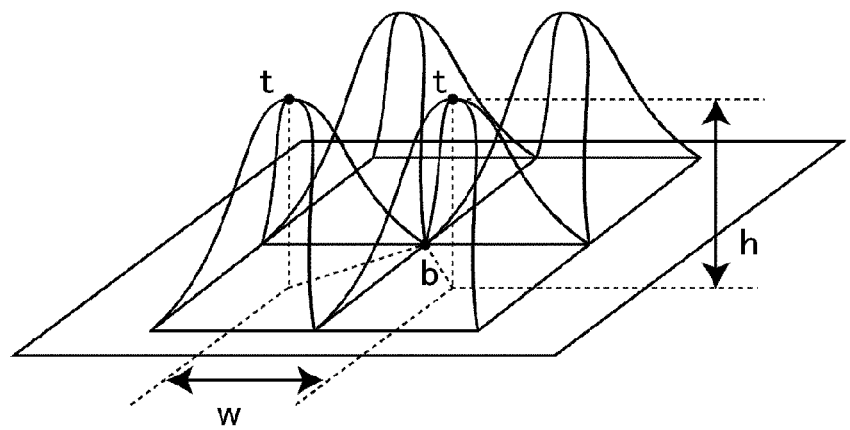
FIG. 9 is a perspective view of the moth eye film of Embodiment 1; this figure illustrates the case in which the unit structure of the protrusion has a steep slope from the bottom point to the vicinity of the apex point and the tip is rounded.
Figure 10:
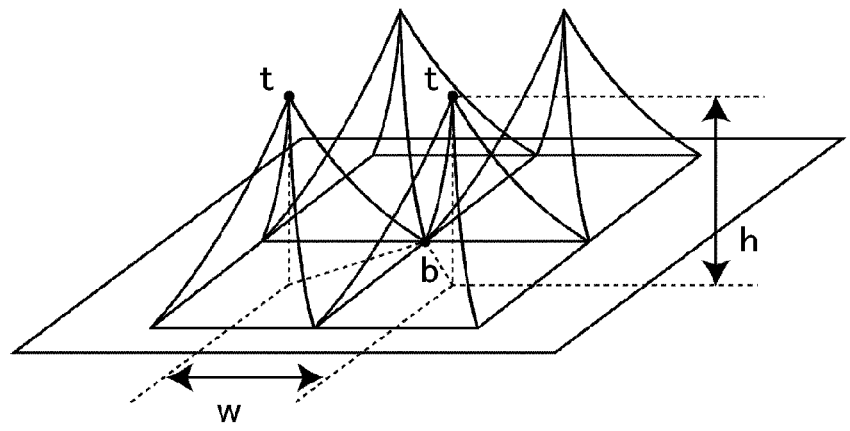
FIG. 10 is a perspective view of the moth eye film of Embodiment 1; this figure illustrates the case in which the unit structure of the protrusion has a steep slope from the bottom point to the vicinity of the apex point and the tip is sharp.

The shape of one protrusion of the moth eye film, will be described below in greater detail. FIGS. 5 to 10 are perspective views of the moth eye film of Embodiment 1. FIG. 5 illustrates the configuration in which a unit structure of the protrusion is a cone. FIG. 6 illustrates the configuration in which a unit structure of the protrusion is a tetragonal pyramid. In FIG. 7, the protrusion has a dome-like shape with smooth inclination from bottom to top and a sharp tip. In FIG. 8, the protrusion has a dome-like shape from bottom to top and a rounded tip. In FIG. 9, the protrusion has a needle-like shape with steep inclination from bottom to top and a rounded tip. In FIG. 10, the protrusion has a needle-like shape with steep inclination from bottom to top and a sharp tip. As shown in FIGS. 5 to 10, in the surface structure of the moth eye film, the apex portion of the protrusion is an apex point t, and the point in which the protrusions are in contact with each other is a bottom point b. As shown in FIGS. 5 to 10, the width w between the apex points of adjacent protrusions constituting the surface structure of the moth eye film is represented by a distance between two points obtained, by dropping perpendiculars from the apex points of respective protrusions on the same plane. The height h from the apex point to the bottom point of the moth eye structure is represented by a distance obtained when a perpendicular is dropped from the apex point t of the protrusion to the plane in which the bottom point b is positioned.

In the moth eye film of Embodiment 1, the width w between the apex points of the adjacent protrusions of the surface structure of the moth eye film is equal to or less than 380 nm, preferably equal to or less than 300 nm, and more preferably equal to or less than 200 nm. Further, the height h from the apex point to the bottom point of the protrusion-depression structure of the moth eye film is preferably 100 nm to 300 nm. In FIGS. 5 to 10, a cone, a rectangular pyramid, a dome, and a needle are shown as representative shapes of the unit structure of the protrusion. However, the protrusion-depression structure in Embodiment 1 is not particularly limited to these unit structures, provided that a protrusion-depression structure is obtained in which the apex points and bottom points are formed and the width is controlled to a value equal to or less than the visible light wavelength. For example, a step-like shape may be used for the slopes of each of the aforementioned shapes.

Figure 11:
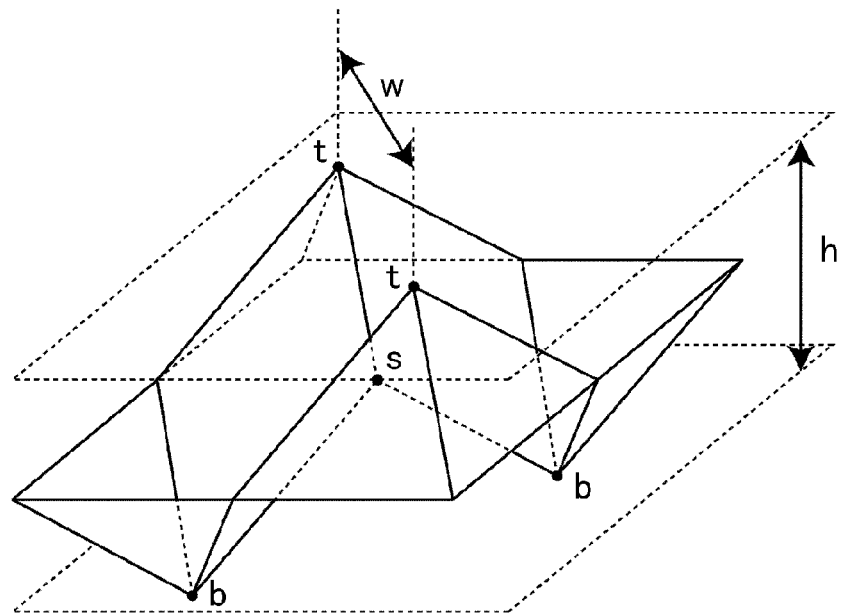
FIG. 11 is a perspective view of the moth eye film of Embodiment 1; this figure illustrates the case where a shape is obtained in which the adjacent protrusions have different height of bottom points and a saddle portion and a saddle point are present between the adjacent protrusions.
Figure 12:
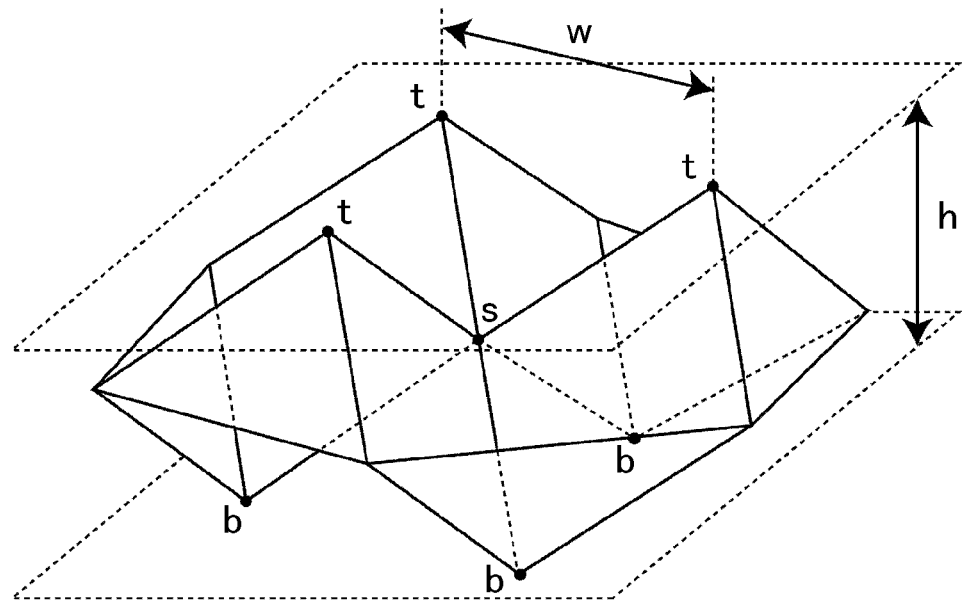
FIG. 12 is a perspective view of the moth eye film of Embodiment 1; this figure illustrates the case where a shape is obtained in which a plurality of contact points of adjacent protrusions is present and a saddle portion and a saddle point are present between the adjacent protrusions.
Figure 13:
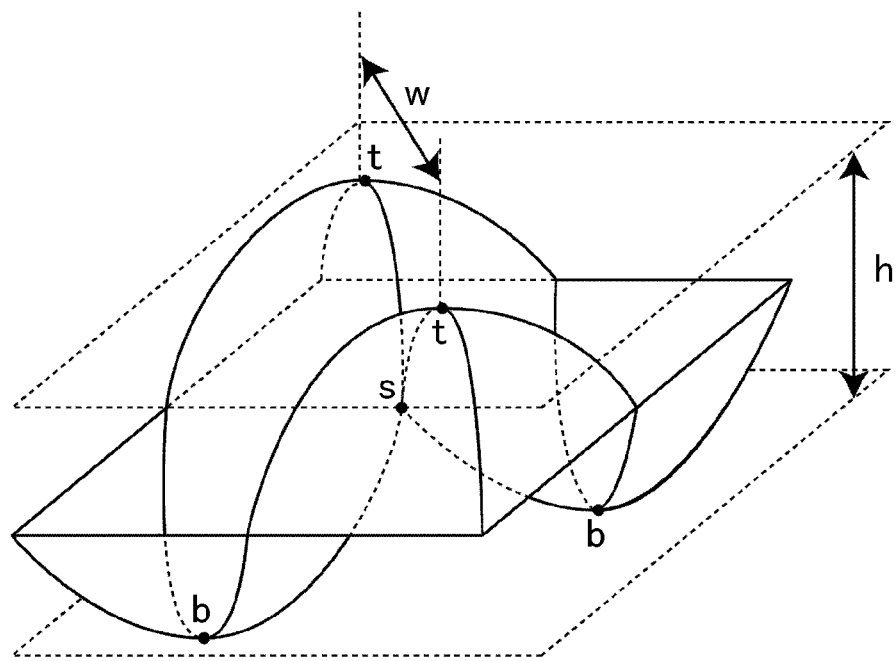
FIG. 13 is a perspective view of the moth eye film of Embodiment 1; this figure illustrates the case where a shape is obtained in which a plurality of contact points of adjacent protrusions is present and a saddle portion and a saddle point are present between the adjacent protrusions.

In the moth eye film of Embodiment 1, a plurality of protrusions may be arranged with regularity or irregularly. Thus, possible configurations are not limited to those in which the bottom points, which are the points in which the protrusions are in contact with each other, are at the same height in the adjacent protrusions. For example, as shown in FIGS. 11 to 13, a configuration may be used in which the heights of points (contact points) on the surface where the protrusions are in contact with each other have a plurality of different values. A saddle portion is present in such configurations. The saddle portion as referred to herein is a depression in the mountain ridgeline. In such a configuration, when a protrusion having an apex point t is taken as a reference, there is a plurality of contact points located below the apex point t and saddle portions are formed. In the present description, the contact point located at the lowest location present around any protrusion is referred to as a bottom point b, and a point that is positioned below the apex point t and above the bottom point b and serves as an equilibrium point of saddle portion is referred to as a saddle point s. In this case, the distance w between the apex points of protrusions corresponds to the width between the adjacent apex points and the distance h in the vertical direction from the apex point to the bottom point corresponds to the height of the protrusion.

Figure 14:
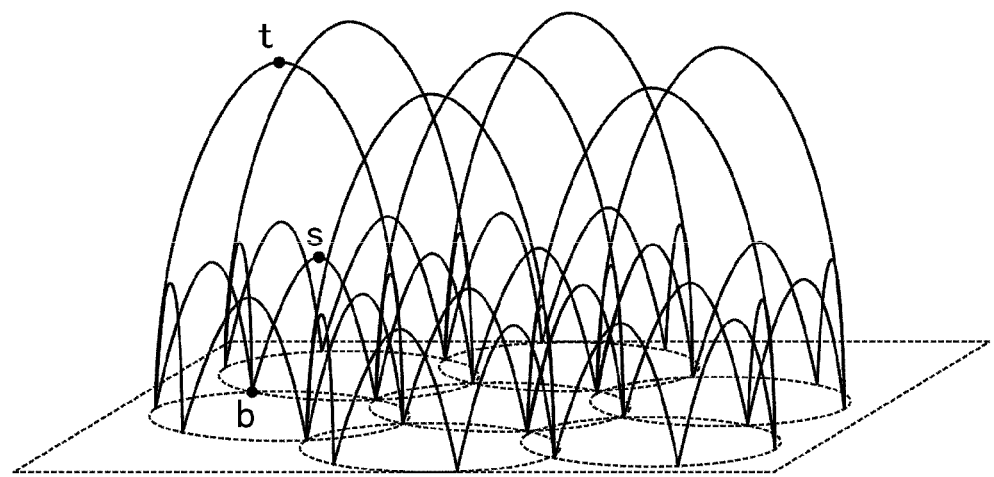
FIG. 14 is a perspective view of a protrusion of the moth eye film of Embodiment 1; this figure is an enlarged drawing illustrating the case in which the protrusions are of a dome-like shape and have saddle portions and saddle points.
Figure 15:
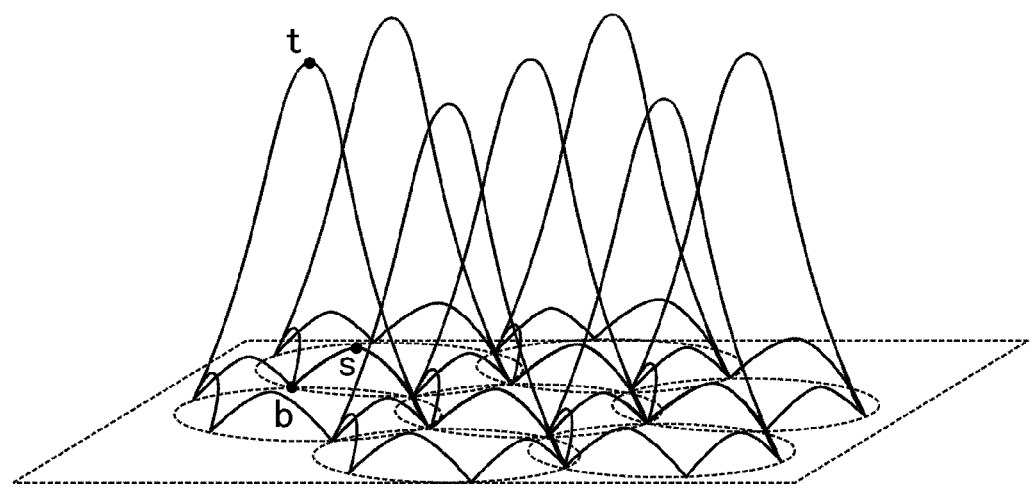
FIG. 15 is a perspective view of a protrusion of the moth eye film of Embodiment 1; this figure is an enlarged drawing illustrating the case in which the protrusions are of a needle-like shape and have saddle portions and saddle points.

More detailed explanation is provided below. Thus an example will be considered in which when a protrusion having one apex point is considered as a reference, a plurality of contact points with the adjacent, protrusions are present and saddle portions (saddle points) are formed at positions below the apex point t. FIGS. 14 and 15 are perspective schematic diagrams illustrating in detail the protrusions of the moth eye film of Embodiment 1. FIG. 14 is an enlarged view illustrating a configuration with dome-like protrusions that has saddle portions and saddle points. FIG. 15 is an enlarged view illustrating a configuration with needle-like protrusions that has saddle portions and saddle points. As shown in FIGS. 14 and 15, with respect to one apex point t of one protrusion, there is a plurality of contact points with the adjacent protrusions that are positioned below the apex point t. As follows from the comparison of FIGS. 14 and 15, in the dome-like and needle-like configurations, the height of the saddle portion can be easily less in the case of needle-like protrusions.

Figure 16:
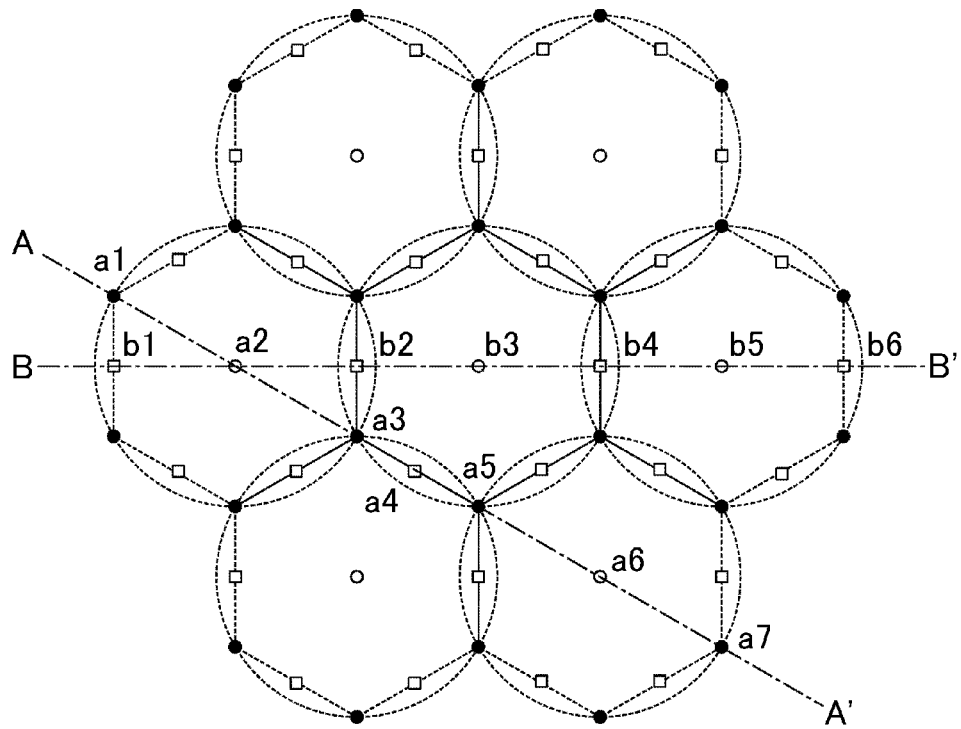
FIG. 16 is a plan schematic view of protrusions of the moth eye film of Embodiment 1.

FIG. 16 is a plan schematic view of protrusions of the moth eye film of Embodiment 1. White round points shown in FIG. 16 represent apex points, black round points represent bottom points, and white rectangles represent saddle points of saddle portions. As shown in FIG. 16, bottom points and saddle points are formed on concentric circles centered on one apex point. In the schematic configuration shown in FIG. 16, six bottom points are formed on one circle and six saddle points are formed, on one circle, but such a configuration is actually not limiting, and a more irregular configuration can be also used. The white circles (O) represent apex points, white rectangles ( ) represent saddle points, and black circles (•) represent bottom points.

Figure 17:
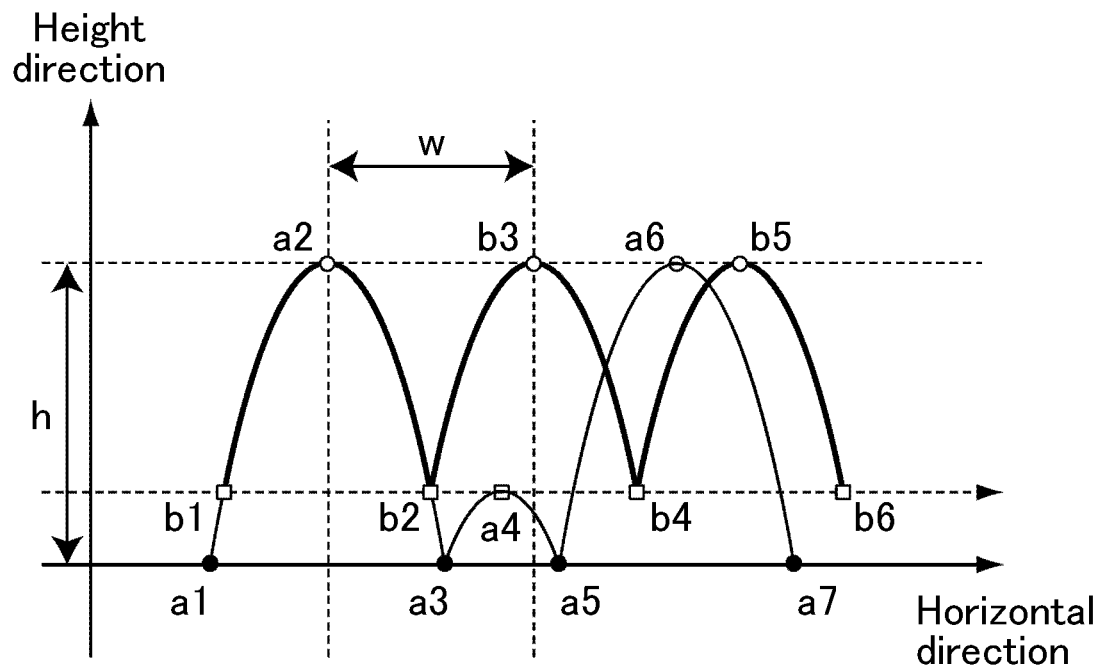
FIG. 17 is a schematic view illustrating a cross section taken along the A-A' line in FIG. 16 and a cross-section taken along the B-B' line in FIG. 16.

FIG. 17 is a schematic drawing illustrating a cross section taken along the A-A' line in FIG. 16 and a cross section taken along the B-B' line in FIG. 16. The apex points are represented by a2, b3, a6, and b5. The saddle points are represented by b1, b2, a4, b4, and b6. The bottom points are represented by a1, a3, a5, and a7. In this case, the relationship between a2 and b3 and the relationship between b3 and b5 are the relationships between the adjacent apex points, and the distance between a2 and b3 and the distance between b3 and b5 corresponds to the width w between the adjacent apex points. The distance between a2 and a1 or a3 and the distance between a6 and a5 or a7 correspond to the height h of the protrusion.

In FIGS. 4 to 15, a plurality of protrusions are all arranged side by side with a period repeating unit, equal to or less than the visible light wavelength, but portions without periodicity may be also present or the configuration as a whole may have no periodicity. Further, the widths between, any one protrusion from among a plurality of protrusions and a plurality of protrusions adjacent thereto may differ from each other. From the standpoint of performance, the advantage of the configuration that has no periodicity is that diffraction and scattering of the transmitted and reflected light caused by regular arrangement is unlikely to occur, and from the standpoint of production, and advantage is that the pattern is easy to produce. Furthermore, as shown in FIGS. 11 to 17, in the moth eye film, a plurality of contact points of different heights may be formed around one protrusion, these contact points being lower than the apex point of the protrusion. Protrusions and depressions of a micron order or of a larger size, which are larger than the nano-order protrusions and depressions, may be also formed on the moth eye film surface, that is, a double protrusion-depression structure may be present.

A method for fabricating the moth eye film 13 will be described below in greater detail. When the moth eye film 13 is fabricated, first, it is necessary to prepare a mold having on the surface thereof a plurality of depressions with a width between the adjacent bottom points of equal to or less than, the visible light wavelength. An example of such mold is an alumina ($Al_2O_3$) substrate obtained by anodic oxidation of aluminum surface and having a large number of holes formed therein. More specifically, a mold having a plurality of depressions that have a shape tapered toward the inside of the mold and a width between the adjacent bottom points of equal to or less than the visible light wavelength can be fabricated by preparing an aluminum substrate and repeatedly performing a plurality of anodic oxidation and etching operations.

The anodic oxidation can be conducted, for example, under the following conditions: oxalic acid 0.6 wt %, liquid temperature 5° C., applied voltage 80 V, and anodic oxidation time 25 sec. By adjusting the anodic oxidation time, it is possible to create the difference in size between the depressions that are formed. The etching can be conducted, for example, under the following conditions: phosphoric acid 1 mol/l, liquid temperature 30° C., and time 25 min.

Then, a curable resin film with a smooth surface that serves as a base material for moth eye film is prepared, and the moth eye film 13 can be fabricated by performing necessary curing, for example, by light irradiation or thermal treatment, while pressing the mold surface having the above mentioned plurality of depressions thereon against the surface of the above mentioned base material.

The mold substrate is not limited to glass and may be a metal material such as SUS and Ni, and resins, for example, polyolefin resins such as polypropylene, polymethylpentene, cyclic olefin polymers (typical examples include Zeonor (manufactured by Nippon Zeon Co., Ltd.), which is a norbornene resin, and Arton (manufactured by JSR Corp.), polycarbonate resins, polyethylene terephthalate, polyethylene naphthalate, and triacetyl cellulose. Further, an aluminum bulk substrate may be used instead of the substrate having an aluminum film deposited thereon. The mold may have a flat shape or a roll-like (cylindrical) shape. A variety of methods such as a 2P method (Photo-Polymerization method), a thermal pressing method (embossing method), an injection molding method, a copying method such as a sol-gel method, a method of laminating a fine protrusion-depression pattern sheet, and a method of transferring a fine protrusion-depression layer may be selected as appropriate according to the application of the antireflective article and type of the base material as a specific method for forming (copying) fine protrusions and depressions on a base material by using a mold. The mold depressions depth, height of the transferred material, and width of mold depressions of transferred material protrusions can be measured using a SEM (Scanning Electron Microscope).

The moth eye film 13 fabricated in the above-described manner is placed on the glass substrate 11, and the BM 12 provided on the multilayer substrate of Embodiment 1 can be then fabricated, by coating the material of the BM 12 on the moth eye film 13 by using a film forming method such as a spin coating method or a DFR (dry film) method or a photolithography method. When the multilayer substrate of Embodiment 1 is used as a color filter substrate of a liquid crystal display device, the patterning shape of the BM 12 is preferably such as to surround the periphery of a predetermined zone (sub-pixel region) corresponding to the outer frame of a sub-pixel. In such a case, the BM 12 serves as a partition member between color filters of different colors, that is, between sub-pixels, and color mixing or light leak occurring at the boundaries between color filters of different colors can be prevented. Furthermore, a color filter layer can be easily formed by discharging an appropriate color layer material into the region partitioned by the BM 12, for example, by an ink jet method, and curing the color layer material.

Figure 18:
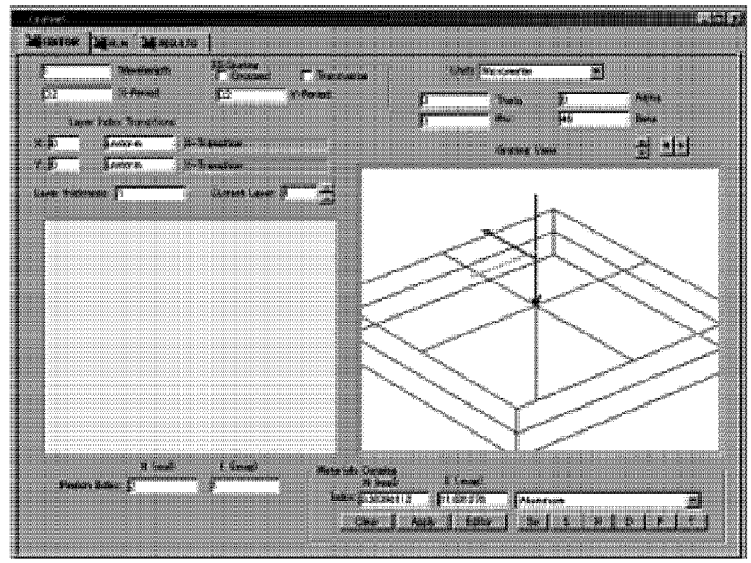
FIG. 18 is a cross-sectional schematic view of the measurement screen and BM that shows the measurement results of BM simulation in which the refractive index is varied intermittently.
Figure 18:
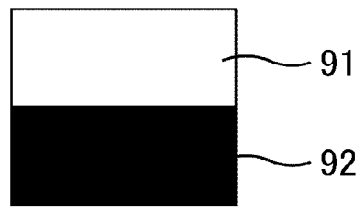

Simulation results illustrating the BM reflectance reducing effect in the liquid crystal display provided with the multilayer substrate of Embodiment 1 will be explained below. The simulation was conducted using simulation software G-SOLVER (produced by Grating Solver Development Company). FIG. 18 shows the measurement results obtained in simulation of a BM in which the refractive index is varied intermittently. Thus, a measurement screen and a cross-sectional schematic diagram of BM are shown in the figure. FIG.

19 shows the measurement results obtained in simulation of a BM in which the refractive index is varied continuously. Thus, a measurement screen and a cross-sectional schematic diagram of BM are shown in the figure.

As shown in FIG. 18, a BM 92 in which the refractive index is varied intermittently, is disposed on a glass substrate 91 having a flat surface and has a flat surface. As shown in FIG. 18, the reflectance (%) measured in the present simulation relates to the case where light falls in the direction orthogonal to the plane of such glass substrate 91 and BM 92.

Figure 19:
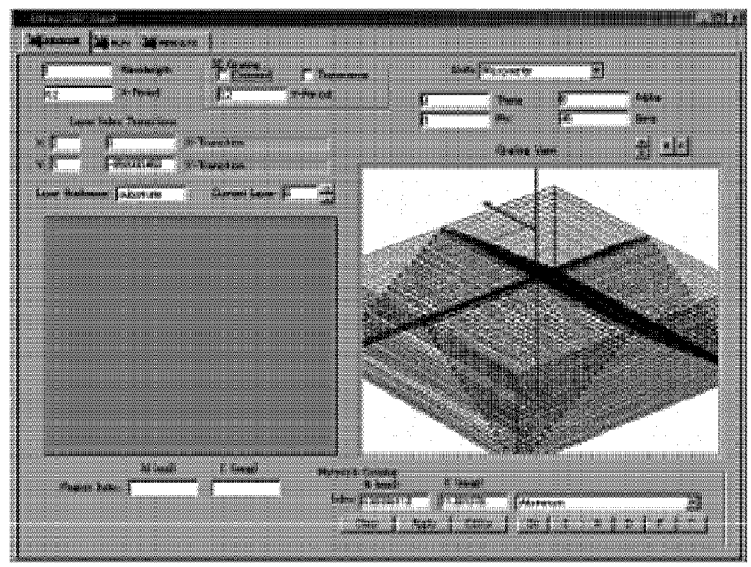
FIG. 19 is a cross-sectional schematic view of the measurement screen and BM that shows the measurement results of BM simulation in which the refractive index is varied continuously.
Figure 19:
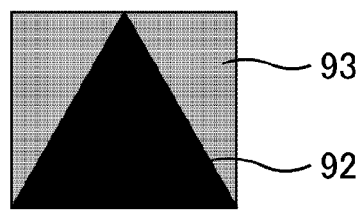

As shown in FIG. 19, the BM 92 in which the refractive index is varied continuously is formed in a pyramid-like shape, that is, a shape with triangular cross section, on the glass substrate. A resin layer 93 is disposed so as to be embedded, in the gaps between protrusions and depressions of the BM 92. As shown in FIG. 19, the reflectance (%) measured in the present simulation relates to the case where light falls in the direction orthogonal to the plane of such glass substrate.

The simulation conditions will be described below. Non-polarized light was used as the incident light, and only a positively reflected light was observed as the observation light. The refractive index of the glass substrate 91 was 1.5, the refractive index of the BM 92 was 2.0-i, and the refractive index of the resin layer 93 was 1.5. Here, i stands for an imaginary portion representing light quenching (light absorption coefficient); the value thereof relates to the absorbing substance. The height of the BM 92 was 200 nm and the pitch of the BM 92 was 200 nm. The simulation wavelength was measured with 50 nm notches within a 400 to 800-nm range. The simulation results are presented in Table 1 below.

TABLE 1

| Wavelength (nm) | Reflectance (%) | |
|---|---|---|
| | Conventional type | Embodiment 1 |
| 400 | 0.09434 | 0.000001 |
| 450 | 0.09434 | 0.000012 |
| 500 | 0.09434 | 0.000018 |
| 550 | 0.09434 | 0.000014 |
| 600 | 0.09434 | 0.000012 |
| 650 | 0.09434 | 0.000020 |
| 700 | 0.09434 | 0.000034 |
| 750 | 0.09434 | 0.000045 |
| 800 | 0.09434 | 0.000051 |

In view of the results shown in Table 1, comparing the reflectance at a wavelength of 550 nm at which the largest action is provided on the human vision, it was confirmed that in the conventional liquid crystal display device the reflectance was 0.09434, whereas in the liquid crystal display device of the present, embodiment the reflectance was 0.000014, It was thus confirmed that the reflectance has been reduced to about 1/6500. In the present simulation, only the normal reflectance was calculated, but the reflectance reduction effect based on the same principle can be also obtained, with respect to the entire reflectance additionally including diffusion reflectance.

Embodiment 2

Embodiment 2 relates to a multilayer substrate that can be used as a color filter substrate in a liquid crystal display device. The multilayer substrate of Embodiment 2 is the first multilayer substrate of the present invention. The multilayer substrate of Embodiment 2 is provided with a polarizer, a glass substrate, a color filter layer, a black matrix, and a common electrode.

Figure 20:
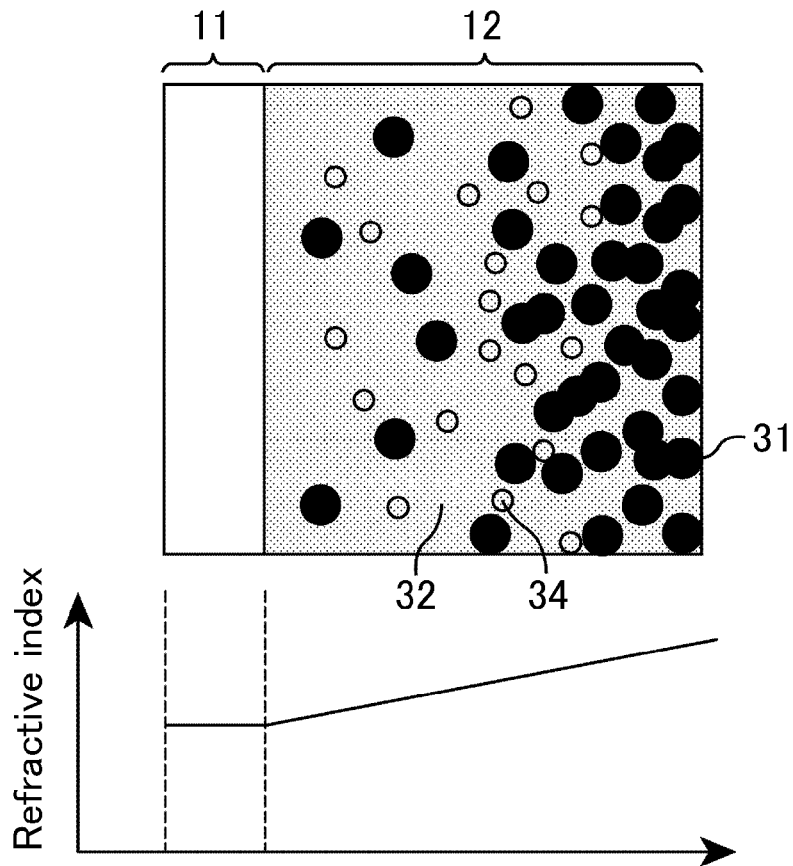
FIG. 20 is a schematic diagram in which a portion of the glass substrate and black matrix of the multilayer substrate of Embodiment 2 is extracted; this figure shows the arrangement configuration of the glass substrate and black matrix and the refractive index distribution thereof.

FIG. 20 is a schematic diagram in which a portion of the glass substrate and black matrix of the multilayer substrate of Embodiment 2 is extracted; this figure shows the arrangement configuration of the glass substrate and black matrix and the refractive index distribution thereof. In Embodiment 2, the glass substrate (transparent substrate) 11 corresponds to the first layer of the present invention, and the BM 12 corresponds to the second layer of the present invention. The BM 12 includes carbon black particles 31 demonstrating black color of the BM 12 and a binder resin (medium) 32 enclosing the carbon black particles 31. The refractive index of glass is about 1.5, the refractive index of the binder resin 32 is about 1.5, and the refractive index of carbon black particles is about 2.0. The particle size of the carbon black particles 31 is equal to or less than about 100 nm.

As shown in FIG. 20, in Embodiment 2, the BM 12 has nanoparticles 34 with a diameter equal to or less than the visible light wavelength in addition to the carbon black particles 31. The diameter of the nanoparticles 34 is 20 to 380 nm and equal to or less than the visible light wavelength. The shape of the nanoparticles 34 is not particularly limited, and the nanoparticles can have spherical, polygonal, or irregular shape. By admixing nanoparticles 34 to the BM 12, it is possible to average optically the refractive index inside the BM 12 to a better degree and to form the BM 12 having a refractive index distribution with a more uniform slope. It is preferred that the nanoparticles 34 be black or transparent.

As shown in FIG. 20, the distribution of carbon black particles 31 contained in the BM 12 is such that the content ratio of carbon black particles in the layer constituting the BM 12 is higher at positions farther from the glass substrate 11. Therefore, the concentration of carbon black particles 31 inside the BM 12 increases continuously with the distance from the glass substrate 11. As a result, as shown in FIG. 20, the refractive index inside the BM 12 increases continuously with the distance from the glass substrate 11, that is, toward the side opposite the glass substrate 11. More specifically, the refractive index of the binder resin 32 is about 1.5 and equal to the refractive index of the glass substrate 11, and the refractive index of carbon black particles 31 is about 2.0 and higher than the refractive index of the glass substrate 11 and the refractive index of the binder resin 32. Therefore, by continuously changing the concentration gradient of carbon black particles 31, it is possible to change continuously the variation of refractive index of the stacked body of the glass substrate 11 and the BM 12, and a graph such as shown in FIG. 20 can be obtained.

With the configuration of the multilayer substrate of Embodiment 2, light that has passed through the glass substrate 11 is unlikely to be reflected at the boundary of the glass substrate 11 and the BM 12. This is so because the refractive index of the BM 12 changes continuously, rather than intermittently, as shown in FIG. 20, from the interface between the glass substrate 11 and the BM 12 adjacent thereto in the direction from the glass substrate 11, with the change being started at the refractive index value at the interface between the BM 12 and the glass substrate 11 adjacent thereto. As a result, practically the entire light that has passed through the glass substrate 11 passes through inside the glass substrate 11 and the BM 12. Further, since carbon black particles 31 having black color are used as the particles constituting the BM 12 in Embodiment 2, the component that is not transmitted, by the BM 12 is easily absorbed, by the carbon black particles 31.

Thus, with the configuration of the multilayer substrate of Embodiment 2, even when, a black matrix formed on the glass substrate includes carbon black particles having a refractive index significantly a different from that of the glass substrate, no region in which intermittent change of refractive index occurs is formed, inside the multilayer substrate. As a result, a multilayer substrate with reduced light reflectance can be obtained. One more specific feature of such a configuration of Embodiment 2 is that, a region in which the refractive index changes continuously is fabricated by using two layers.

Embodiment 3

Embodiment 3 relates to a multilayer substrate that can be used as a color filter substrate in a liquid crystal display device. The multilayer substrate of Embodiment 3 is the second multilayer substrate of the present invention. The multilayer substrate of Embodiment 3 is provided, with a polarizer, a moth eye film, an intermediate layer, a glass filter, a black matrix (BM), and a common electrode.

Figure 21:
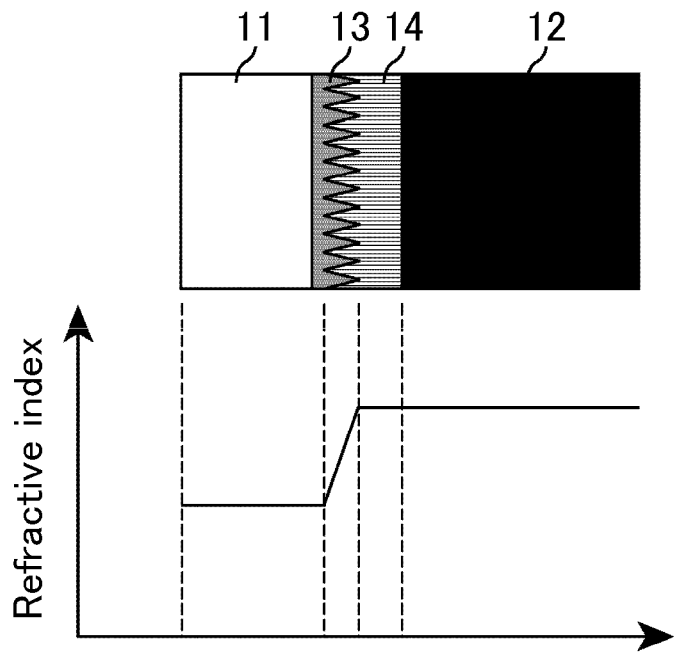
FIG. 21 is a schematic diagram in which a portion of the glass substrate, moth eye film, intermediate resin layer, and black matrix of the multilayer substrate of Embodiment 3 is extracted; this figure shows the arrangement configuration of the glass substrate, moth eye film, intermediate resin layer, and black matrix and the refractive index distribution thereof.

FIG. 21 is a schematic diagram in which, a portion of the glass substrate, moth eye film, intermediate resin layer, and black matrix of the multilayer substrate of Embodiment 3 is extracted; this figure shows the arrangement configuration of the glass substrate, moth eye film, intermediate resin layer, and black matrix and the refractive index distribution thereof. In Embodiment 3, the moth eye film 13 corresponds to the fourth layer of the present invention, and the intermediate resin layer 14 corresponds to the fifth layer. The moth eye film 13 is constituted, for example, by an acrylic UV-curable resin for nano imprint forming. The intermediate resin layer 14 is constituted by a sulfur-containing or halogen-containing UV curable resin and can be fabricated, for example, by a spin coating method or a photolithography method. The BM 12 includes carbon black particles demonstrating black color of the BM 12 and a binder resin (medium) enclosing the carbon black particles. The refractive index of glass is about 1.5, the refractive index of the sulfur-containing or halogen-containing UV curable resin is about 1.8, the refractive index of the binder resin is about 1.5, and the refractive index of carbon black particles is about 2.0. The carbon black particles included in the BM 12 are uniformly distributed in the layer constituting the BM 12. Therefore, when the BM 12 is viewed as a whole, the refractive index is about 1.8, which is the value obtained by performing averaging for the binder resin and carbon black particles. A material described in Embodiment 1 can be used for the binder resin. UV-curable resins (for example, materials for optical applications including simple or composite polymers using sulfur-containing or halogen-containing UV resins with a high refractive index) can be used for the intermediate resin layer having a refractive index of about 1.8 which is equal to the refractive index of the BM 12. More specifically, materials including copolymers of sulfur-containing (meth)acrylate and isobornyl (meth)acrylate can be used. Resin materials including a coating liquid TI-44 (manufactured by Rasa Kogyo KK) for forming a film with a high refractive index, such as an organic-inorganic nanocomposite material (including dispersed $TiO_2$ ultrafine particles) can be also used for the intermediate resin layer.

As shown in FIG. 21, a moth eye film 13 is disposed between the glass substrate 11 and the intermediate resin layer 14. A plurality of protrusions with a width between the adjacent apex points of equal to or less than the visible light wavelength are formed on the surface of the moth eye film 13. The protrusions have a structure such that the refractive index increases continuously from the tip to the bottom portion. The intermediate resin, layer 14 has depressions with a structure symmetrical to that of the protrusions of the moth eye film 13. As a result, as shown in FIG. 21, in the region where the moth eye film and the intermediate resin layer 14 mesh, the refractive index increases continuously.

The refractive index of the glass substrate is about 1.5, the refractive index of the moth eye film 13 is about 1.5, the refractive index of the intermediate resin layer 14 is about 1.8, and the refractive index of the BM 12 is about 1.8. In the region where the protrusions of the moth eye film 13 and the depressions of the intermediate resin layer 14 mesh, the refractive index changes from about 1.5 to about 1.8. Therefore, where the multilayer substrate of Embodiment 3 is viewed as a whole, a configuration is obtained in which the refractive index does not change intermittently from the glass substrate 11 to the BM 12. Therefore, according to the configuration of the multilayer substrate of Embodiment 3, light is transmitted as is through the glass substrate 11, moth eye film 13, and BM 12, and the effect of reflectance reduction can thus be obtained. According to Embodiment 3, it is possible not to form the BM 12 directly on the moth eye film 13. Therefore, the degree of freedom in thickness adjustment and selection of production method for the BM 12 is increased.

Further, since carbon black particles having black color are used as the particles constituting the BM 12 in Embodiment 3, the component that is not transmitted by the BM 12 is easily absorbed by the carbon black particles.

Embodiment 4

Embodiment 4 relates to a multilayer substrate that can be used as a color filter substrate in a liquid crystal display device. The multilayer substrate of Embodiment 4 is the first multilayer substrate and third multilayer substrate of the present invention. The multilayer substrate of Embodiment 4 is provided with a polarizer, a glass substrate, an intermediate layer, a glass filter, a black matrix (BM), and a common electrode.

Figure 22:
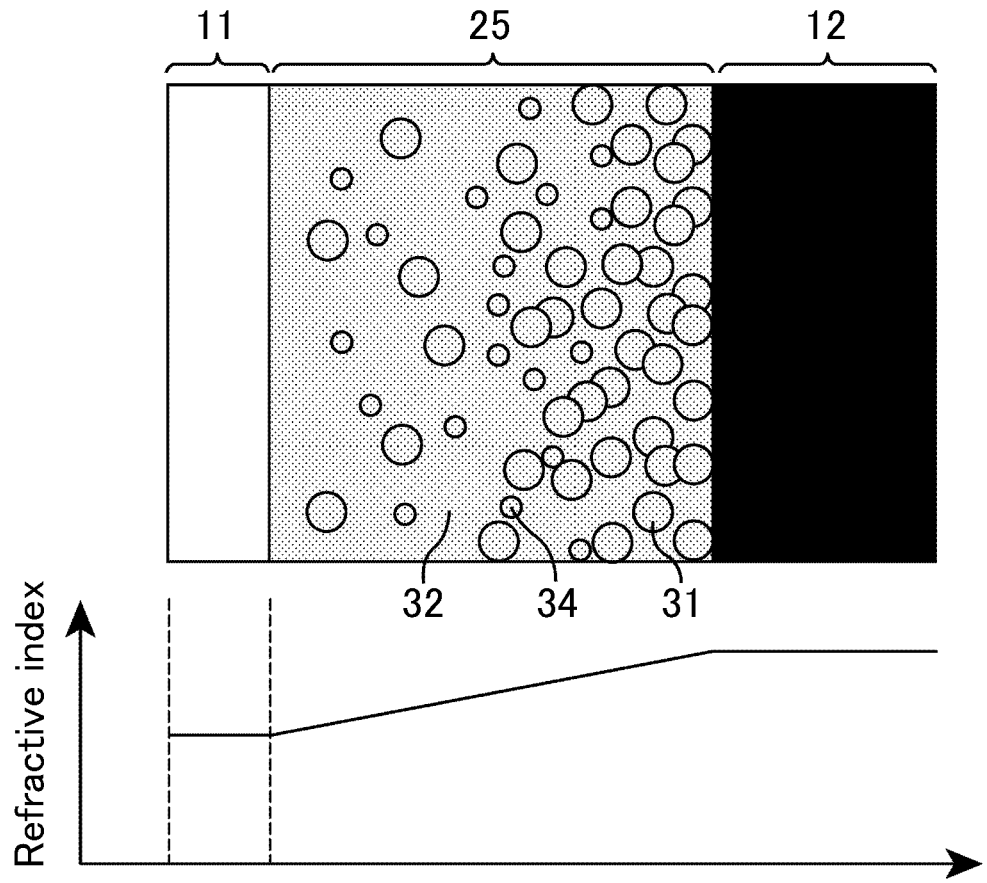
FIG. 22 is a schematic diagram in which a portion of the glass substrate, intermediate resin layer, and black matrix of the multilayer substrate of Embodiment 4 is extracted; this figure shows the arrangement configuration of the glass substrate, intermediate resin layer, and black matrix and the refractive index distribution thereof.

FIG. 22 is a schematic diagram, in which a portion of the glass substrate, intermediate layer, and black matrix of the multilayer substrate of Embodiment 4 is extracted; this figure shows the arrangement configuration of the glass substrate, intermediate layer, and black matrix and the refractive index distribution thereof. In Embodiment 3, the glass substrate 11 corresponds to the first layer of the present invention, the intermediate layer 25 corresponds to the second layer of the present invention, and the BM 12 corresponds to the third layer of the present invention. Further, the glass substrate 11 corresponds to the sixth layer of the present invention, the intermediate layer 25 corresponds to the intermediate layer of the present invention, and the BM 1.2 corresponds to the seventh layer of the present invention. The intermediate resin layer 25 includes transparent particles 33 with a refractive index different from that of the glass substrate 11 and a binder resin (medium) 32 enclosing the transparent particles 33. The refractive index of the glass substrate 11 is about 1.5, the refractive index of the binder resin is about 1.5, the refractive index of the transparent particles is about 1.8, and the refractive index of carbon black particles included in the BM 12 is about 2.0. The carbon black particles are uniformly distributed in the layer constituting the BM 12. Therefore, when the BM 12 is viewed as a whole, the refractive index is about 1.8, which is the value obtained by performing averaging for the binder resin and carbon black particles. An acrylic resin or the like can be used as a material for the above mentioned transparent particles. The diameter of the transparent particles is not more than 100 nm.

As shown in FIG. 22, in Embodiment 4, the binder resin 32 has nanoparticles 34 with a diameter equal to or less than the visible light wavelength in addition to the transparent particles 33. Nanoparticles similar to those of Embodiment 2 can be used, as the nanoparticles 34. By admixing nanoparticles 34 to the intermediate layer 25, it is possible to average optically the refractive index inside the intermediate layer 25 to a better degree and to form the intermediate layer 25 having a refractive index distribution with a more uniform slope.

As shown in FIG. 22, the intermediate layer 25 is disposed between the glass substrate 11 and the BM 12. Further, the distribution of transparent particles 33 contained in the intermediate layer 25 is such that the content ratio of transparent particles in the intermediate layer 25 is higher at positions farther from the glass substrate 11. Therefore, the concentration of transparent particles 33 inside the intermediate layer 25 increases continuously with the distance from the glass substrate 11. As a result, as shown in FIG. 22, the refractive index inside the intermediate layer 25 increases continuously with the distance from the glass substrate 11, that is, toward the side opposite the glass substrate 11. More specifically, the refractive index of the binder resin 32 is about 1.5 and equal to the refractive index of the glass substrate 11, and the refractive index of transparent particles 33 is about 1.8 which is higher than the refractive index of the glass substrate 11 and the refractive index of the binder resin 32 and equal to the refractive index of the BM. Therefore, by continuously changing the concentration gradient of transparent particles 33, it is possible to change continuously the variation of refractive index from the glass substrate 11 to the BM 12, as shown, in FIG. 22. Furthermore, a graph can be obtained in which the refractive index of the glass substrate 11 and the refractive index of the BM 12 are connected.

With the configuration of the multilayer substrate of Embodiment 4, the light that has passed through the glass substrate 11 is unlikely to be reflected at the boundary of the glass substrate 11 and the intermediate layer 25 and at the interface between the intermediate layer 25 and the BM 12. This is so because the refractive index of the intermediate layer 25 changes continuously, rather than intermittently, as shown, in FIG. 22, from the interface between the intermediate layer 25 and the glass substrate 11 adjacent thereto up to the interface between the intermediate layer 25 and the BM 12 adjacent thereto, with the change being started at the value of the refractive index at the interface between the intermediate layer 25 and the glass substrate 11 adjacent thereto and being ended at the value of the refractive index at the interface between the BM 12 and the intermediate layer 25 adjacent thereto. In other words, this is so because the refractive index of the intermediate layer 25 changes continuously so as to connect the refractive index of the glass substrate 11 to the refractive index of the BM 12. As a result, practically the entire light that has passed through the glass substrate 11 passes through the boundary of the glass substrate 11 and the intermediate layer 25, and practically the entire light that has passed through the intermediate layer 25 passes through the boundary of the intermediate layer 25 and the BM 12 and then passes through the BM 12. Further, since carbon black particles having black color are used as the particles constituting the BM 12 in Embodiment 4, the component that is not transmitted by the BM 12 is easily absorbed by the carbon black particles.

Thus, with the configuration of the multilayer substrate of Embodiment 4, even when a BM having a refractive index significantly different from that of the glass substrate is formed on the glass substrate, because an intermediate layer connecting these refractive indexes is disposed between the glass substrate and the BM, no region in which the refractive index changes intermittently is formed inside the multilayer substrate. As a result, a multilayer substrate with reduced light reflectance can be obtained. One more specific feature of such a configuration of Embodiment 4 is that a region in which the refractive index changes continuously is fabricated by using three layers.

Embodiment 5

Embodiment 5 relates to a multilayer substrate that can be used as a color filter substrate in a liquid crystal display device. In the multilayer substrate of Embodiment 5, a low-reflection layer is further disposed on the surface of the multilayer substrate of Embodiment 1 on the outer space side (observation surface side) thereof. Thus, the multilayer substrate of Embodiment 5 has a low-reflection layer, a polarizer, a glass substrate, a color filter layer, a black matrix, and a common electrode.

For example, a LR (Low Reflection) film and an AR (Anti Reflection) film, that reduce the reflectance on the basis of mutual interference and quenching of light reflected by the front surface of the multilayer substrate and light reflected by the surface of the low-reflection layer, an AGLR film having the specific features of both the LR film and the AG (Anti Glare) film that demonstrate antiglare effect by using a protrusion-depression structure provided on the surface of the low-reflection layer and causing scattering of external light, and a moth, eye film in which, as described hereinabove, a plurality of protrusions with a width between the adjacent apex points of equal to or less than, the visible light wave length is formed, quasi-continuous variations of the refractive index are obtained on the interface where the multilayer substrate is adjacent to the outer space (air), and practically the entire light is transmitted, regardless of the refractive index interface, can be used for the low-reflection layer used in Embodiment 5.

Figure 23:
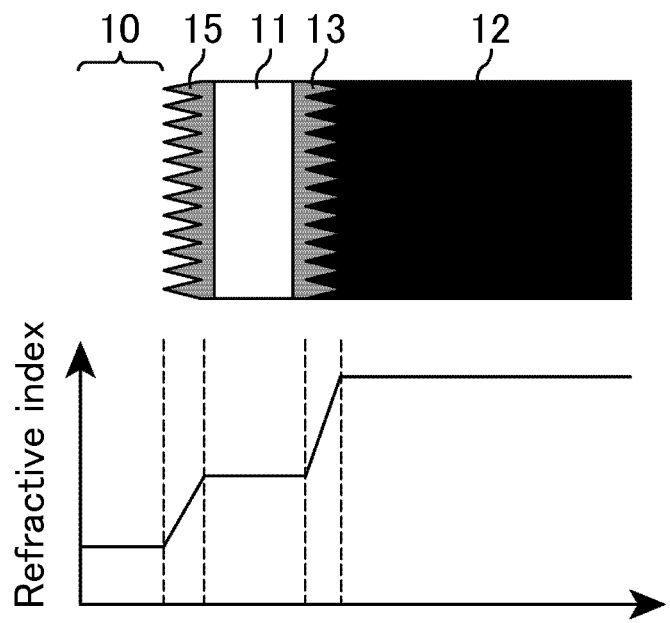
FIG. 23 is a schematic diagram in which the moth eye film (low-reflection layer), glass substrate, moth eye film, and black matrix of the multilayer substrate of Embodiment 5 is extracted; this figure shows the arrangement configuration of the moth eye film (low-reflection layer), glass substrate, moth eye film, and black matrix and the refractive index distribution including the external space (air).

FIG. 23 is a schematic diagram, in which the moth eye film, (low-reflection layer), glass substrate, moth eye film, and black matrix of the multilayer substrate of Embodiment 5 is extracted; this figure shows the arrangement configuration of the moth eye film (low-reflection layer), glass substrate, moth eye film, and black matrix and the refractive index distribution including the external space (air). In Embodiment 5, the moth eye film 13 corresponds to the fourth layer of the present invention, and the black matrix (BM) corresponds to the fifth layer of the present invention. The moth eye film 15 disposed on the glass substrate 11 on the surface thereof on the opposite side to the moth eye film 13 is constituted by an acrylic UV resin for nano imprinting. The BM 12 is constituted by carbon black particles demonstrating the black color of the BM 12 and a binder resin (medium) enclosing the carbon black particles. The refractive index of the glass is about 1.5, the refractive index of the acrylic UV resin for nano imprinting is about 1.5, the refractive index of the binder resin is about 1.5, and the refractive index of the carbon black particles is about 2.0, and the carbon black particles contained in the BM 12 are uniformly distributed in the layer constituting the BM 12. Where the BM 12 is viewed as a whole, the refractive index has a value of about 1.8 that is obtained by averaging the refractive indexes of the binder resin and carbon black particles.

As shown in FIG. 23, in Embodiment 5, the moth eye film 15 is disposed, between the glass substrate 11 and the outer space (air) 10. The configuration and method for fabrication of the moth eye film are same as those described in Embodiment 1.

As shown in FIG. 23, the moth eye film 13 is disposed between the glass substrate 11 and the BM 12. A plurality of protrusions with a width between the adjacent apex points of equal to or less than the visible light wavelength is formed on the surface of the moth eye film 13, and a depression-protrusion structure (moth eye structure) with a very small period is thus obtained. Each of the protrusions (unit structure of the moth eye structure) has a structure such that the refractive index increases continuously from the tip toward the bottom portion. The BM 12 is formed so as to fill the spaces between the plurality of protrusions of the moth eye film 13. Therefore, the BM 12 has a structure symmetrical to the moth eye structure. More specifically, a plurality of depressions having a structure symmetrical to that of the protrusions having the moth eye film 13 are formed on the BM 12 on the surface thereof on the moth eye film 13 side.

The region in which the protrusions of the moth eye film 13 mesh with the depressions of the BM 12 becomes a region in which two layers with mutually different refractive indexes are mated, and the volume ratio of the protrusions of the moth eye film 13 and the depressions of the BM 12 changes regularly as the thickness of this region increases. Further, since the width between the apex points of protrusions in the moth eye film 13 is equal to or less than the visible light wavelength, the variations in the volume ratio are small. As a result, the region where the protrusions of the moth eye film 13 mesh with the depressions of the BM 12 can be taken as a region in which the refractive index changes continuously, and a graph, such as shown in FIG. 23 can be obtained.

The refractive index of the air layer is about 1.0, the refractive index of the moth eye film is about 1.5, the refractive index in the region in which the air layer meshes with the protrusions of the moth eye film changes from about 1.0 to about 1.5. Further, the refractive index of the moth eye film, is about 1.5, the refractive index of the BM 12 is about 1.8, and the refractive index in the region in which the protrusions of the moth eye film 13 mesh with the depressions of the BM 12 changes from, about 1.5 to about 1.8. Therefore, where the entire multilayer substrate of Embodiment 5 is considered, it can be found to have a configuration in which no intermittent changes in the refractive index are observed, from the air layer 10 to the BM 12.

Therefore, in the configuration of the multilayer substrate of Embodiment 5, light is transmitted as is through the air layer 10, moth eye film 15, glass substrate 11, moth eye film 13, and BM 12. As a result, a reflectance reducing effect can be obtained. Further, since carbon black particles having black color are used in Embodiment 5 as particles constituting the BM 12, the component that is not transmitted, by the BM 12 is easily absorbed by the carbon black particles.

Embodiment 6

Embodiment 6 relates to a multilayer substrate that can be used as a color filter substrate in a liquid crystal display device. The multilayer substrate of Embodiment 6 is the second multilayer substrate of the present invention. The multilayer substrate of Embodiment 6 has a moth eye film (low-reflection layer), a polarizer, a glass substrate, a moth eye film, a color filter layer, an intermediate layer, a black matrix, and a common electrode.

Figure 24:
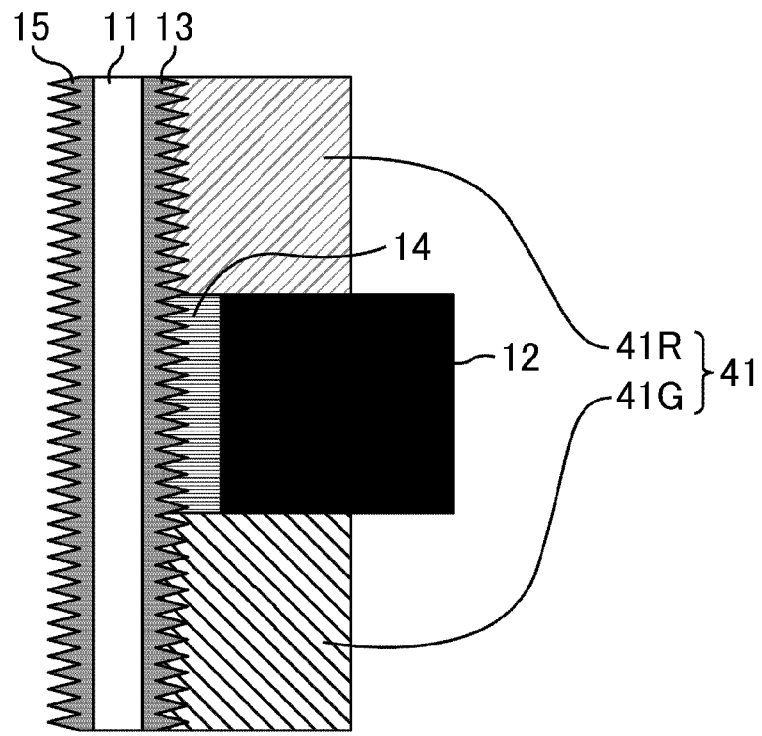
FIG. 24 shows the arrangement, configuration of the moth eye film (low-reflection layer), glass substrate, moth eye film, color filter layer, intermediate resin layer, and black matrix of the multilayer substrate of Embodiment 6.

FIG. 24 shows the arrangement configuration of the moth eye film (low-reflection layer), glass substrate, moth eye film, color filter layer, intermediate resin layer, and black matrix of the multilayer substrate of Embodiment 6. In Embodiment 6, the moth eye film 13 corresponds to the fourth layer of the present invention, and the color filter layer 41 and the intermediate resin layer 14 correspond to the fifth layer. A layer in which, a pigment of a desired color is dispersed in a binder resin or a dye of a desired color can be used as the color filter layer 41. The moth eye film 13 positioned on the glass substrate 11 on the BM 12 side, the intermediate resin layer 14, and the BM 12 can be similar to those used in Embodiment 4. The moth eye film 15 positioned on the glass substrate 11 on the side opposite the BM 12 side can be similar to that used in Embodiment 5. From the standpoint of production efficiency, it is preferred that the intermediate resin layer be patterned together with the BM 12.

As shown in FIG. 24, the moth eye film 13 is disposed between the glass substrate 11 and the intermediate resin layer 14. A plurality of protrusions with a width between the adjacent apex points of equal to or less than the visible light wavelength is formed on the surface of the moth eye film 13. Each of the protrusions has a structure such that the refractive index increases continuously from the tip toward the bottom portion. The intermediate resin layer 14 and the color filter layer 41 have depressions with a structure symmetrical to that of the protrusions of the moth eye film 13. Therefore, the region in which the protrusions of the moth eye film mesh with the depressions of the intermediate resin layer 14 and the region in which the protrusions of the moth eye film mesh with the depressions of the color filter layer 41 become the regions in which the refractive index increases continuously.

The refractive index of the glass substrate 11 is about 1.5, the refractive index of the moth eye film 13 is about 1.5, the refractive index of the intermediate resin layer 14 is about 1.8, the refractive index of the color filter layer 41 is about 1.8, and the refractive index of the BM 12 is about 1.8. In the region in which the protrusions of the moth eye film 13 mesh with the depressions of the intermediate resin layer 14, the refractive index changes from about 1.5 to about 1.8, and in the region in which the protrusions of the moth eye film 13 mesh with the depressions of the color filter layer 41, the refractive index changes from about 1.5 to about 1.8. Therefore, where the entire multilayer substrate of Embodiment 6 is considered, no intermittent changes in the refractive index are observed in the region overlapping the intermediate resin layer 14 or the region overlapping the color filter layer 41 from the glass substrate 11 to the BM 12.

Therefore, in the configuration of the multilayer substrate of Embodiment 6, light is transmitted as is through the glass substrate 11, moth eye film 13, intermediate resin layer 14, and BM 12, and also light is transmitted as is through the glass substrate 11, moth eye film 13, color filter layer 41, and BM 12. Therefore, a reflectance reducing effect can be obtained within a wide range. Further, according to Embodiment 6, it is possible not to form the BM 12 directly on the moth eye film 13. Therefore, the degree of freedom in thickness adjustment and selection of production method for the BM 12 is increased.

Further, since carbon black particles having black color are used as the particles constituting the BM 12 in Embodiment 6, the component that is not transmitted by the BM 12 is easily absorbed by the carbon black particles.

Comparative Example 1

The conventional multilayer substrate will be explained below in detail as a multilayer substrate of Comparative Example 1 in order to compare the multilayer substrate of the present invention with the conventional multilayer substrate. The multilayer substrate of Comparative Example 1 is used as a color filter substrate.

Figure 25:
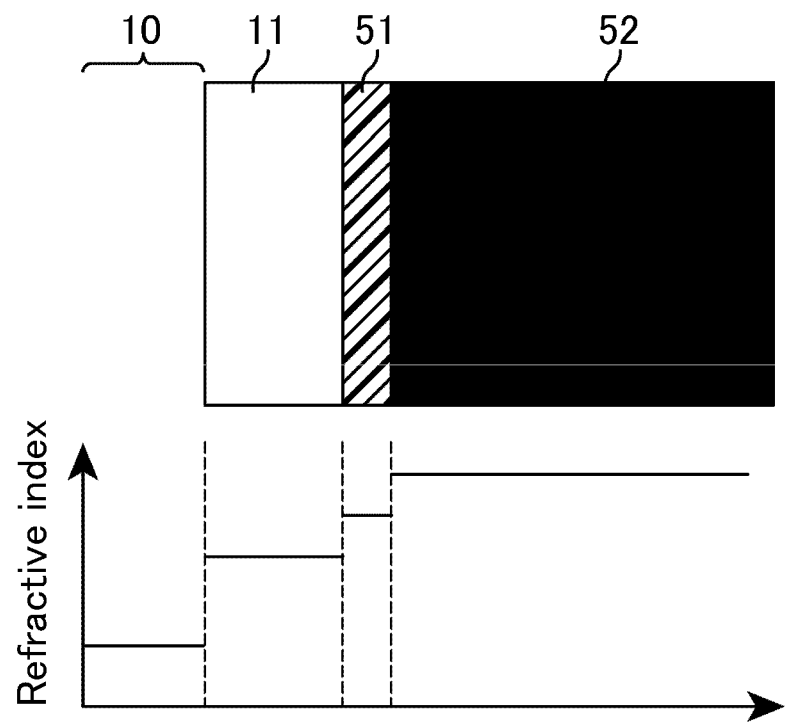
FIG. 25 is a schematic diagram, in which the glass substrate, transparent inorganic thin film, and black matrix of the multilayer substrate of Comparative Example 1 is extracted; this figure shows the arrangement configuration of the glass substrate, transparent inorganic thin film, and black matrix and the refractive index distribution including the external space (air).

FIG. 25 is a schematic diagram, in which the glass substrate, transparent inorganic thin film, and black matrix of the multilayer substrate of Comparative Example 1 is extracted; this figure shows the arrangement configuration of the glass substrate, transparent inorganic thin film, and black matrix and the refractive index distribution including the external space (air).

As shown in FIG. 25, the multilayer substrate of Comparative Example 1 has a configuration in which a glass substrate 11, a transparent inorganic thin film 51, and a black matrix (BM) 52 are stacked in the order of description. The surface of the glass substrate 11 on the opposite side to the BM 52 is adjacent to an outer space (air) 10. The transparent inorganic thin film 51 is constituted, by titanium oxide (TiO), and the BM 52 is constituted by chromium (Cr). As shown in FIG. 25, the refractive index of the outer space (air) 10 is about 1.0, the refractive index of the glass substrate 11 is about 1.5, the refractive index of the transparent inorganic thin film 51 is about 2.35, and the refractive index of the BM 52 is about 3.08.

In the configuration of Comparative Example 1, the refractive index is uniform inside each of the plurality of layers having different refractive indexes. Therefore, when the multilayer substrate is viewed as a whole, intermittent changes in refractive index can be observed at the interfaces between the layers as boundaries. Therefore, respective predetermined amounts of light are reflected at the boundary of the outer space 10 and the glass substrate 11, at the boundary of the glass substrate 11 and the transparent inorganic thin film 51, and at the boundary of the transparent inorganic thin film 51 and the BM 12. Because of such reflected light, when the multilayer substrate of Comparative Example 1 is used, for example, in a liquid crystal display device, the light emitted from the backlight that is used as the original display light is mixed with the light produced by the reflection of the external light and the effect, of the display light that should be inherently used, is significantly suppressed, and contrast in a brightly lit room is reduced.

Embodiment 7

Figure 26:
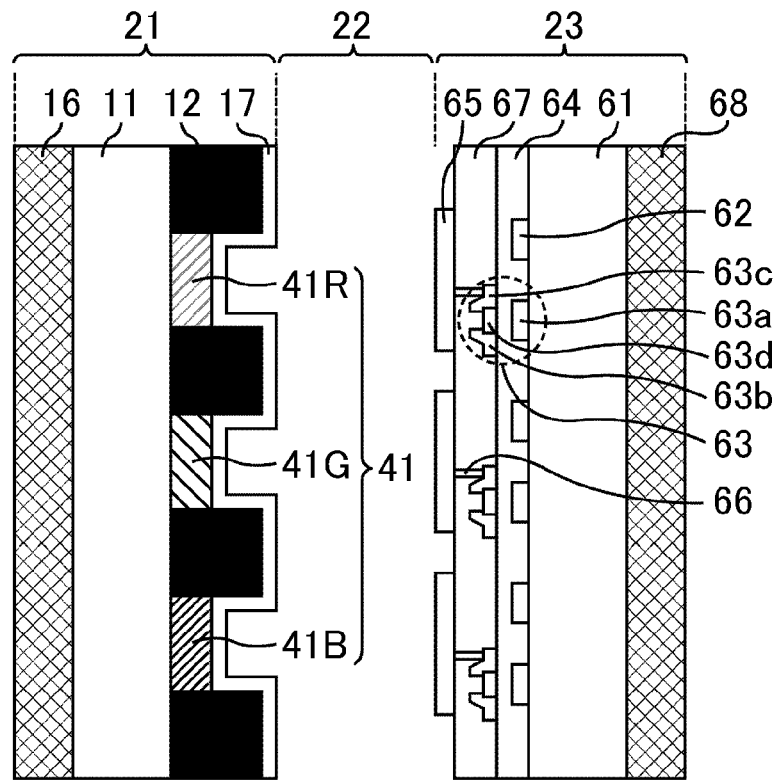
FIG. 26 is a cross-sectional schematic view of the liquid crystal display device of Embodiment 7.

Embodiment 7 relates to the liquid crystal display device of the present invention. FIG. 26 is a cross-sectional schematic view of the liquid crystal display device of Embodiment 7, As shown in FIG. 26, the liquid crystal display device of Embodiment 7 is provided with a color filter substrate (multilayer substrate) 21, a liquid crystal layer 22, and an array substrate (opposed substrate) 23 disposed in the order of description from the observation surface side (display screen side) toward the rear surface. The liquid crystal material contained in the liquid crystal layer 22 is not particularly limited. The orientation mode of the liquid crystal is also not particularly limited and may be a twisted nematic (TN) mode, a vertical alignment (VA) mode, and an in-plane switching (IPS) mode.

The color filter substrate 21 is provided with the glass substrate 11, and the color filter layer 41 and BM 12 are provided on the surface of the glass substrate 11, from the two surfaces thereof, which is on the liquid, crystal-layer 22 side. For example, a three-color combination of a red color filter layer 41R, a green color filter layer 41G, and a blue color filter layer 41B can be used as the color filter layer 41, but layers using yellow, cyan, and magenta colors may be also used for the color filter layer, and combinations of four or more colors may be also used. The BM 12 is disposed, between the color filter layers 41R, 41G, and 41B.

A common electrode 17 constituted by a metal oxide such as ITO (Indium Tin Oxide) is formed on the color filter layer 41 and BM 12. By forming the common electrode 17, it is possible to apply the desired voltage to the liquid crystal layer 22. The common electrode 17 can be formed by a sputtering method or a CVD method. By disposing an alignment layer on the common electrode 17, it is possible to control a pretilt angle of liquid, crystal molecules.

The color filter substrate 21 is provided with a polarizer 16 on the glass substrate 11 on the surface thereof that is on the opposite side to the liquid crystal layer. The polarizer 16 is a linearly polarizing plate and can be configured, for example, by causing adsorption of a iodine complex, a dichroic colorant, or the like on a film of a polyvinyl alcohol (PVA) system that has been stretched, in a certain direction and then pasting protective films such as TAC (triacetyl cellulose) films on both surfaces. A phase difference plate such as λ/4 plate or λ/2 plate is not attached to the surface of the polarizer 16 on the liquid crystal layer 22 side.

The array substrate 23 is provided with wirings, electrodes, and semiconductor elements for controlling the orientation of liquid crystal molecules contained in the liquid crystal layer 22. Examples of control systems include an active matrix system and a passive matrix system.

Figure 27:
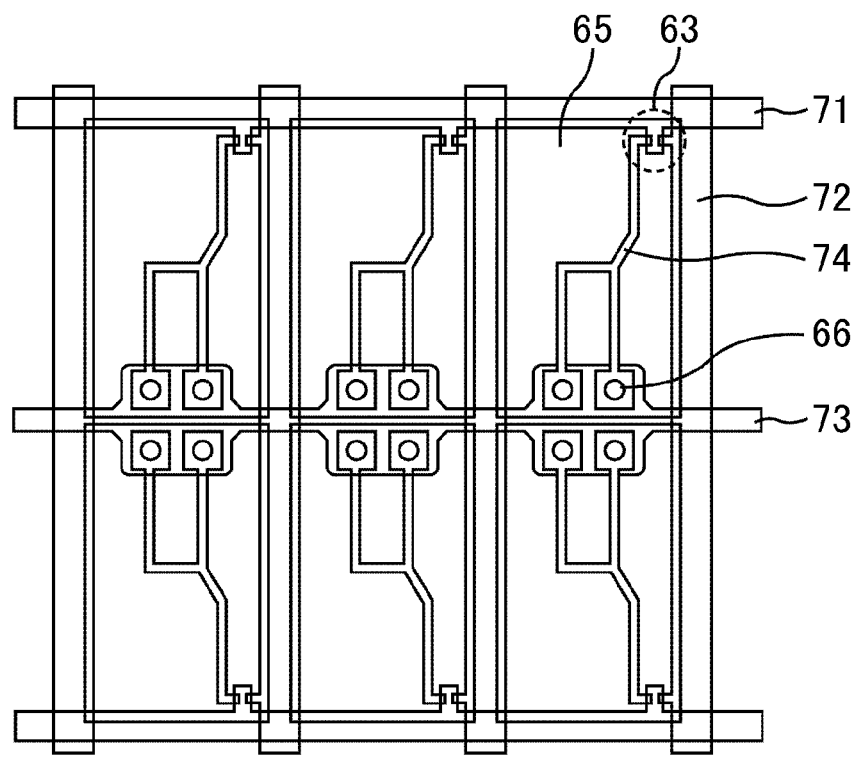
FIG. 27 is a planar schematic view of the array substrate of active matrix system provided in the liquid crystal display device of Embodiment 7.

FIG. 27 is a planar schematic view of the array substrate of active matrix system provided in the liquid crystal display device of Embodiment 7. In the array substrate 23 of active matrix system, a plurality of gate wirings 71 and storage capacitor (CS) wirings 73 extending parallel to each other cross a plurality of gate wirings 71 and storage capacitor (CS) wirings 73 on the glass substrate and a plurality of source wirings 72 extending parallel to each other is also provided therein. Thin-film transistors (TFT) 73 are disposed in the crossing portions of the gate wirings 71 and source wirings 72.

In the planar schematic view shown in FIG. 27, one pixel is shown that is constituted by three sub-pixels of red, green, and blue colors. A region surrounded by the gate wirings 71 and source wirings 72 corresponds to one sub-pixel, and two pixel electrodes 65 and two TFT 63 are disposed for each sub-pixel. One pixel electrode 65 is controlled by one TFT 63. Therefore, one sub-pixel is divided into a plurality of regions. As a result the display is more accurately controlled. The sub-pixels constituting one pixel may be of three colors including yellow, cyan, and magenta colors, or may be of four or more colors including any of these colors.

The CS wiring 73 is disposed to cross the sub-pixel center and formed, to expand in width in the center portion of the sub-pixel. The TFT 73 is a field effect transistor of a three-terminal type. This transistor has three electrodes, namely, a gate electrode, a source electrode, and a drain electrode in addition to the semiconductor layer. The gate electrode is connected to a gate wiring 71, and the source electrode is connected to a source wiring 72. Further, a wiring (referred to hereinbelow as drain lead-out wiring) 74 is formed that extends from the drain electrode toward the sub-pixel center. The drain lead-out wiring 74 has a surface area larger than the extending portion in the region superimposed on the CS wiring 73 and can form a storage capacitor of a predetermined value with the CS wiring 73 superimposed thereupon, with an insulating film being interposed therebetween. The pixel electrode 65 is connected to the drain electrode of the TFT 63 by a contact portion 66 provided in the insulating film, and ON/OFF control of the voltage applied to the liquid crystal is controlled in units of pixel electrode 65. These wirings and electrodes are separated, if necessary, by insulating films.

The array substrate of active matrix type that is provided in the liquid crystal display device of Embodiment 7 will be explained below with reference to FIG. 26. As shown in FIG. 26, the array substrate 23 is provided with a glass substrate 61, and TFT 63 and wirings 62 are provided on the glass substrate 61 on the liquid crystal, layer side. The wirings 62 in FIG. 26 mean gate wirings, source wirings, and CS wirings. The TFT 63 is constituted by a gate electrode 63a, a semiconductor layer 63d disposed at a layer different from the layer where the gate electrode 63a is positioned, with a gate insulating film 64 being interposed therebetween, a source electrode 63b, and a drain electrode 63c. The source electrode 63b and the drain electrode 63c are each directly electrically connected to the semiconductor layer 63d. Pixel electrodes 65 and TFT 63 are provided in respective layers, with an insulating film 67 interposed, therebetween, and electrically connected to each other by contact portions 66 provided in the insulating film 67.

The array substrate 23 is provided with a polarizer 68 on the surface of the glass substrate on the opposite side to the liquid crystal layer. The polarizer 68 provided at the array substrate 23 can be similar to the polarizer 16 provided, at the color filter substrate 21, but the polarization axis of the polarizer 68 provided at the array substrate 23 is substantially parallel or substantially orthogonal to the polarization axis of the polarizer 16 provided at the color filter substrate 21.

Such a liquid crystal display device of Embodiment 7 can be advantageously used in the case where a low-reflection layer such as a moth eye film is formed on the outermost surface and in the case of a linearly polarized light mode in which linearly polarized light passes through a liquid crystal layer. Where the low-reflection layer is formed on the outermost surface, the effect of internal reflection becomes easily noticeable. Therefore measures aimed at the reduction of such internal reflection are effective. In the case of linearly polarized light mode, the elements with internal reflection are increased in size, and the configuration is therefore effective. Furthermore, a contrast higher than that in the case of a circularly polarized light mode can be obtained.

The internal reflection in the liquid crystal display device of Embodiment 7 will be explained with reference to FIG. 26. The internal reflection as referred, to in this case is the reflection that the light falling from the outside on the display screen of the liquid crystal display device, that, is, through, the surface of the color filter substrate 21 on the outer space side, undergoes inside the liquid crystal display panel, in other words, the reflection in the color filter substrate 21, except for the surface of the color filter substrate 21 on the outer space side, and the reflection in the array substrate 23. In Embodiment 7, the reflection occurring at the boundary of the outer space and the color filter substrate 21 is surface reflection that is distinguished from the internal reflection. Further, practically no reflection caused by the liquid crystal layer 22 is observed. In the case of a liquid crystal display device, the surface reflection as referred to herein means the reflection, occurring at the boundary of air and the polarizer (TAG film), and when an antireflective film is disposed on the surface of the TAG film, the surface reflection means the reflection occurring at the boundary of air and the antireflective film (LR film, AR film, AGLR film, moth eye film, and the like).

Examples of reflection caused by the structure of the color filter substrate 21 include reflection occurring on the boundary of the glass substrate 11 and the BM 12, reflection occurring on the boundary of the glass substrate 11 and the color filter 41, reflection occurring on the boundary surface of the BM 12 and the contact electrode 17, and reflection occurring at the boundary surface of the color filter 41 and the common electrode 17. Transparent metal oxide films such as ITO (Indium Tin Oxide) and IZO (Indium Zinc Oxide) can be advantageously used as the material of the common electrode 17, but in such cases a high reflectance can be realized at certain incidence angles of external light. Resins colored by red, green, and blue dyes or pigments can be used as materials for the color filter 41. Resins colored by black dyes or pigments and black metals can be used as materials for the BM 12.

Examples of the reflection caused by the structure of the array substrate 23 include reflection occurring on the surface of gate signal line 71, source signal line 72, storage capacitor (CS) wiring 73, and also gate electrode, source electrode, and drain electrode of the TFT 63. From the standpoint of electric conductivity and reliability, it is preferred that low-resistance metals such as aluminum (Al), silver (Ag), copper (Cu), and nickel (Ni) be used as the materials of these wirings and electrodes in TFT, and such materials have a high reflectance. Other reflection caused by the structure of the array substrate 23 occurs on the pixel electrode surface. A metal oxide film having light transmission ability, such as ITO and IZO, is also preferably used for the pixel electrode, in the same manner as for the common electrode, but a high reflectance is sometimes obtained for certain incidence angles of the external light.

Examples of methods for measuring the reflectance caused by internal reflection include: (1) a method using a spectrocolorimeter, and (2) a method using a spectromicroscope.

A method for measuring a reflectance by using CMI-2002 (manufactured by Konika-Minolta Co.) is known as a method using a spectrocolorimeter. More specifically, first, a sample (a) is prepared in which linearly polarizing plates are attached to both surfaces of a glass substrate. The linearly polarizing plate is constituted by a PVA film that is dyed with iodine and serves as a polarizer and a TAC film that is located on the front and rear surface of the PVA film for protection thereof. Therefore, at least one TAC film is disposed on the outer space side of the PVA film. The linearly polarizing plates are adjusted to obtain cross Nicol relationship with mutually orthogonal polarization axes. The refractive index of the polarizer and the refractive index of the TAC films are 1.5 and equal to each other.

The sample (a) has no surfaces with refractive index discontinuity and includes not structure causing internal reflection. Furthermore, the sample has the polarizers satisfying the cross Nicol condition. Therefore, the light that passes through the polarizer attached to the front surface of the glass substrate and enters the interior of the sample (a) is absorbed by the polarizer attached to the rear surface of the glass substrate. Therefore, the value measured for the sample (a) with the spectrocolorimeter represents the reflectance of light at the interface of the linearly polarizing plate (TAG film) of the sample (a) and the air, that is, the surface reflectance of the sample (a). A liquid crystal display panel constituted by a color filter substrate, a liquid crystal layer, and an array substrate is then prepared as a sample (b). The linearly polarizing plates identical to those used in the sample (a) are also used in the sample (b) at the linearly polarizing plate provided in the color filter substrate and the linearly polarizing plate provided in the array substrate. By performing measurements on sample (b) with the spectrocolorimeter, it is possible to measure a sum total of the surface reflectance and internal reflectance caused by the structure of sample (b). Therefore, the internal reflectance of sample (b) can be measured by subtracting the value obtained by conducting measurements on sample (a) from the value obtained by conducting measurements on sample (b). In this case, it is impossible to determine which member causes the reflection.

The above mentioned CMI-2002 is provided with a SCI (Specular Component Include) mode in which normally reflected light and diffusion reflected light are measured with an integrating sphere and a SCE (Specular Component Exclude) mode in which only the diffusion reflected light is measured with the integrating sphere.

Figure 28:
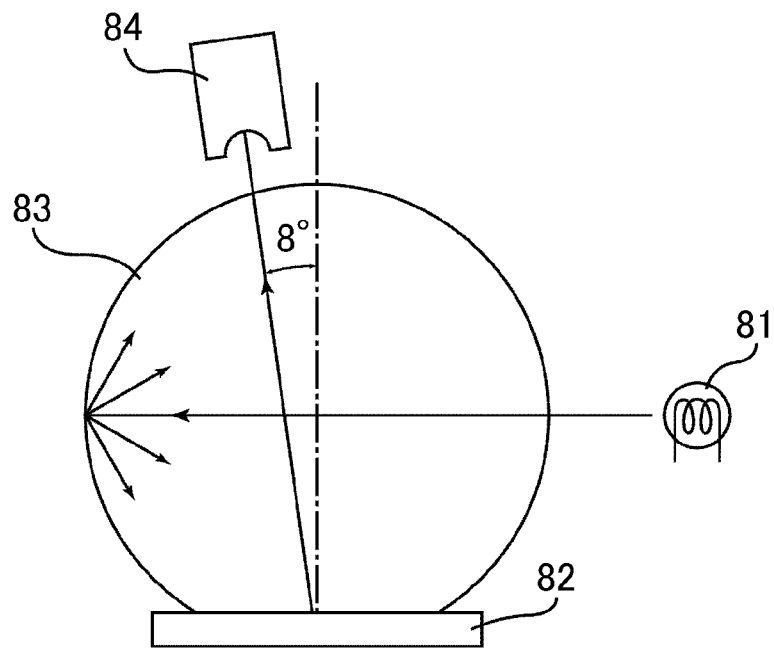
FIG. 28 is a schematic diagram illustrating how the reflected, light in a. SCI mode is measured.
Figure 29:
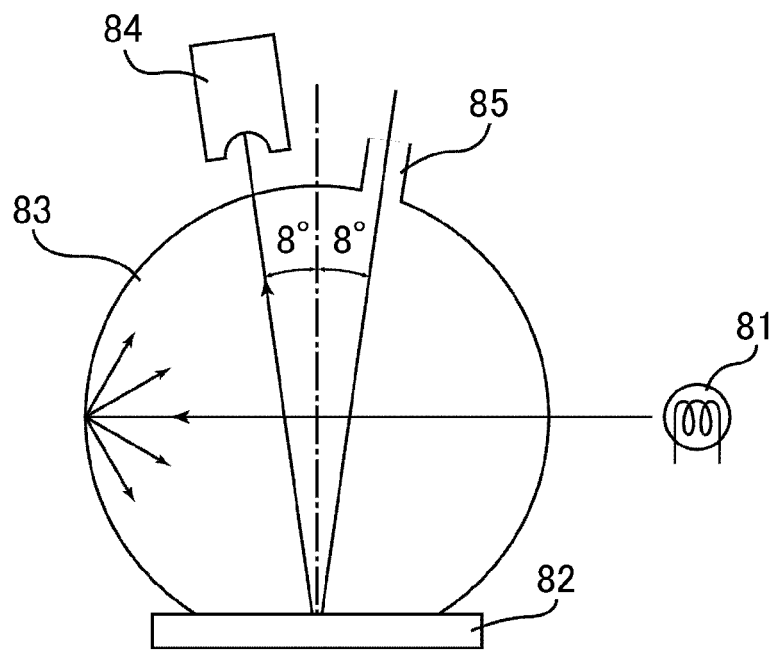
FIG. 29 is a schematic diagram illustrating how the reflected light in a SCE mode is measured.

The SCI mode and SCE mode will be explained herein in greater detail. FIG. 28 is a schematic diagram illustrating how the SCI-mode reflected light is measured. FIG. 29 is a schematic diagram illustrating how the SCE-mode reflected light is measured.

As shown in FIGS. 28 and 29, when the reflected light measurements are performed, a light source 81, a measurement sample 82, an integrating sphere 83 disposed to cover the surface of the measurement sample 82, and a light receiving unit 84 that receives the reflected light are prepared. In the configurations shown in FIGS. 28 and 29, the light receiving units 84 are disposed at positions with an angle of 8° against the normal direction of the surface of the measurement sample 82. A white coating material (for example, barium sulfate) that almost entirely diffusion reflects the light that has reached the surface of the integrating sphere 83 is coated on the inner surface of the integrating sphere 83. As a result, the light that has been emitted from the light source 81 and has entered the integrating sphere 83 is diffusion reflected by the inner surface of the integrating sphere 83. As a result, the surface of the measurement sample 82 is irradiated with the diffusion light from a variety of angles.

In the case of SCI mode illustrated, by FIG. 28, the light receiving unit 84 measures the entire normal reflected light and diffusion reflected light that have been reflected by the surface of the measurement sample 82. By contrast, in the case of SCE mode illustrated by FIG. 29, the integrating sphere 83 has an optical trap unit 85 at a position symmetrical to the light receiving unit 84 with respect to the normal to the surface of the measurement sample 82 as an axis of symmetry, and the light incident on the light trap unit 85 is led out, as is, to the outside of the integrating sphere 83. As a result, the light receiving unit 84 measures the diffusion reflected light that, remains after excluding the normal reflected light from the reflected light that has been reflected by the surface of the measurement sample 82.

The internal reflectance determined, herein represents the reflectance obtained by adding up the normal reflectance and the diffusion reflectance. Actually, when window frames or walls are reflected on the display device, the normal reflection component is large, but the structure based on the reflection of the display device is not necessarily a mirror surface. Thus, for example, thin-film circuits are present inside the display device and the wiring surface of such thin-film, circuits is not always flat. Further, diffraction caused by the repeating pattern of fine wirings is also present. Therefore, a more adequate approach involves determining the internal reflectance as a reflectance including not only the normal reflection by also the diffusion reflectance. Therefore, for escalope, when the reflectance is measured by using CMI-2002, only the measurement results obtained in the SCI mode may be used. In this case, because the region measured with CM-2002 is sufficiently larger than the pixels, the measurement value includes the entire reflection, from the internal structure of the display device, that is, from a variety of structural components, including the surface reflection.

When it is desirable to calculate only the normal reflectance, it can be obtained by subtracting the SCE-mode measurement value (diffusion reflectance) from the SCI-mode measurement value (normal reflectance+diffusion reflectance). In this case, when sample (a) and sample (b) are to be measured using CMI-2002, either of sample (a) and sample (b) should be measured in the SCI mode and SCE mode. The normal reflectance can be represented by the following formula.

Normal reflectance of internal reflection=$SCI$(normal reflectance+diffusion reflectance)−$SCE$ (diffusion reflectance)−$Rs$ (reflectance of linearly polarizing plate surface).

The reflectance corresponds to an Y value of tristimulus value based on XYZ color system, that is, the Y value measured by CMI-2002.

Figure 30:
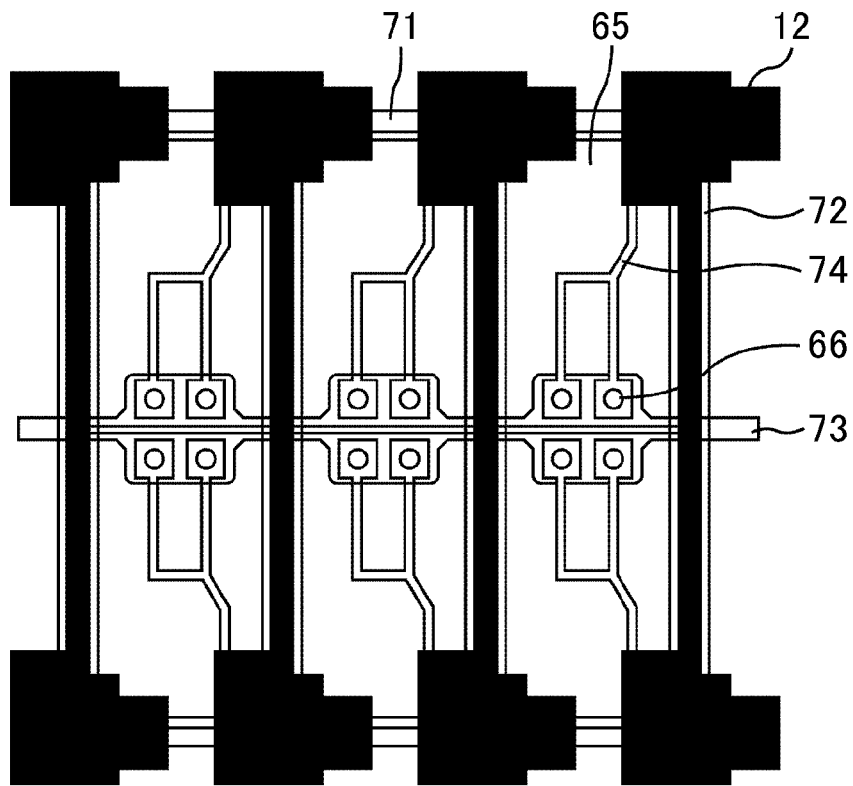
FIG. 30 is a planar schematic view of a pixel unit in the case where the liquid crystal, display device of Embodiment 7 is observed using a spectroscopic microscope.

The reflectance of each member can be also measured by using a spectromicroscope (for example, OSP-200 (Olympus Co.)). FIG. 30 is a planar schematic diagram of a pixel unit relating to the case in which the liquid crystal display device of Embodiment 7 is observed using a spectromicroscope. One pixel constituted by three (red, green, and blue) sub-pixels is shown.

The spectromicroscope makes it possible to observe each member in detail, as in the drawing shown in FIG. 30, and the reflectance of observed portions can be measured. Further, the reflectance of portions that have come into focus can be measured. For this reason, the reflectance measurements by CMI-2002 as a whole are conducted in detail in structural units, and the spectromicroscope is useful in terms of enabling the verification of measurements conducted, with CMI-2002. Further, with the spectromicroscope, it is not necessary to measure the surface reflectance. However, the measurements with the spectromicroscope are those of a normal reflection component.

Measurements with CMI-2002 will be described below in comparison with those performed using a spectromicroscope. As shown in FIG. 30, when a pixel is directly viewed from the observation surface side, the region of the array substrate that is superimposed on the BM 12 of the color filter substrate is covered with black color. The BM 12 is disposed so as to cover almost the entire gate wiring 71, almost the entire source wiring 72, and the entire TFT 73.

The configuration of the portion producing the internal reflection when the liquid crystal display panel of Embodiment 7 is measured with a spectromicroscope includes the gate wiring 71, source wiring 72, CS wiring 73, drain lead-out wiring 74, contact portion 66, pixel electrode 65, and BM 12. The sum total value of internal reflection can be obtained by multiplying unit reflectance of each member by the surface area ratio S, combining all of the results obtained, and multiplying the obtained sum value by the transmittance Tp of the linearly polarizing plates arranged in a parallel Nicol configuration. The value thus obtained is that of normal reflectance and corresponds to the value obtained, by subtracting the SCE-mode measurement value from the above-described SCI-mode measurement value of CMI-2002.

Elements used for measuring the internal reflection are combined in Table 2. Here, S1 to S5 mean surface area ratios of wirings and electrodes in the entire surface area where the reflection occurs. The normal reflectance of internal reflection of the display device can be represented by the following formula on the basis of table 2.

Normal reflectance of internal reflection=$\{\Sigma(i \times S1, ii \times S2, iii \times S3, iv \times S4, v \times S5, vi, vii)\} \times Tp$,

TABLE 2

| Members | Reflectance | Area ratio | Transmittance of polarizer (Parallel Nicol) |
|---|---|---|---|
| Gate wiring | i | S1 | Tp |
| Source wiring | ii | S2 | Tp |
| CS wiring | iii | S3 | Tp |
| Drain lead-out wiring | iv | S4 | Tp |
| Contact point | v | S5 | Tp |
| Pixel electrode | vi | — | Tp |
| BM | vii | — | Tp |

When the measurements were actually conducted on the same sample with the method using a spectrocolorimeter (method (1)) and the method using a spectromicroscope (method (2)), the values of normal reflectance matched with an accuracy in percentage (0.1%) of the first number after the decimal point.

The relationship between the internal reflection and display quality will be explained below. The value of contrast ratio in a display device is important in terms of increasing the display quality from the standpoint of image clarity. The larger is the contrast ratio, the clearer is the image. The contrast ratio is calculated from [(luminance value in a display ON state (white display))/(luminance value in a display OFF state (black display)], but in an environment with a bright surrounding area, the value of display contrast ratio strongly depends on the brightness of surrounding area. More specifically, the higher is the brightness of surrounding area, the lower is the contrast ratio.

Even in an environment with the same brightness of surrounding area, the amount of light reflection caused by the display device structure differs between the display devices with different structures, and the amount of light reflection caused by the display device structure affects the value of contrast ratio in the display region. More specifically, the higher is the amount of light reflection caused by the display device structure, the larger is the quantity of reflected light emitted from the display screen and therefore the lower is the contrast ratio.

Liquid crystal display devices A to I that had different internal reflectance, surface reflectance, and contrast ratios at a brightness of surround area of 0 Lx (also referred to hereinbelow as dark-place contrast ratio) were actually simulated and evaluation of the contrast ratio of each liquid crystal display device was performed.

FIGS. 31 to 37 are graphs illustrating the relationships between the brightness of surrounding area fix) and contrast ratio in the liquid crystal display devices obtained when the internal reflectance and surface reflectance were set to respectively different values in the liquid crystal display devices A to I. The brightness of surrounding area is plotted against the abscissa, and the contrast ratio of liquid crystal display device is plotted against the ordinate. The brightness determined by illumination in a typical living room is 100 to 200 Lx, the brightness determined by light through windows on a cloudy day is 1000 Lx, and that on a clear day is 2000 Lx. More specifically, the brightness is 50 Lx in a dark, living room, 100 Lx in the usual, living room, and 200 Lx in a bright living room.

Therefore, a range of viewing at ambient light with 50 to 2000 Lx is suitable for practical use as the environment used in the usual home. An environment with a brightness equal to or higher than 1000 Lx would also be a range suitable for practical use in the case of billboards in offices, stations, and convenience stores. Further, from the standpoint of reflection on the screen, even in the environment with a brightness about 100 Lx, when a white building is present outside and a white curtain is directly reflected and directly seen, it will actually correspond to threefold to fivefold brightness. Therefore, the range suitable for practical use can be up to about 1000 Lx.

Figure 31:
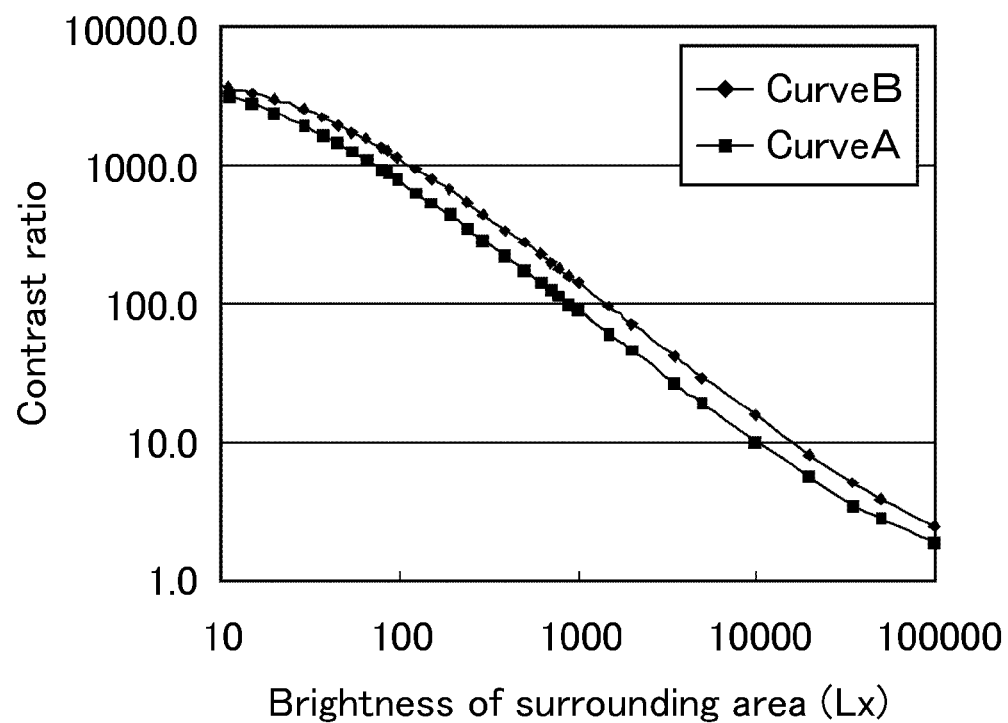
FIG. 31 is a graph illustrating the relationship between the brightness of surrounding area (Lx) and contrast ratio in the liquid crystal display device A and liquid crystal display device B.

The curve A (■) shown in FIG. 31 is a graph illustrating the relationship between the contrast ratio and the brightness (Lx) around the liquid, crystal display device (liquid crystal display device A) with an internal reflectance of 2.0% and a surface reflectance of 1.5%. The curve B (♦) shown in FIG. 31 is a graph illustrating the relationship between the contrast ratio and the brightness (Lx) around the liquid crystal display device (liquid crystal display device B) with an internal reflectance of 2.0% and a surface reflectance of 0.2%. The brightness around the display device in this case is assumed, to relate to an environment with a completely average reflectance. More specifically, the display device is assumed to be surrounded by a perfectly diffusing wall having a uniform, reflectance. Further, a light source such as illumination is assumed to be disposed above and the display device is assumed to be installed vertically and substantially orthogonally to the floor. At a certain brightness, the surrounding wail is reflected, on the display surface of the display device. In this state, the illumination intensity of the display surface is measured and the measurement result is multiplied by the reflectance obtained by adding up the surface reflectance and the internal reflectance. The product is taken as a reflected light of the display surface, this reflected light is added to the black luminance obtained in the case where no external light is present (luminance determined from, the contrast in the case where the external light is absent (0 Lx)), the sum obtained is taken as the black luminance in the ambient light, and the ratio thereof to the luminance of white display is taken to obtain a contrast at the ambient light brightness.

The liquid, crystal display device A and the liquid crystal display device B have the same internal structure, that is, configuration of the color filter substrate, liquid crystal layer, and array substrate inside the liquid crystal display device, but different surface structures. Thus, the surface at the outer space side of the color filter substrate provided in the liquid crystal display device A is constituted by a LR (low-reflection coating) film, whereas the surface at the outer space side of the color filter substrate provided in the liquid crystal display device B is constituted by a moth eye film. As follows from FIG. 31, in both the liquid crystal display device A and the liquid crystal display device B, the value of contrast ratio decreases with the increase in ambient brightness. In the liquid crystal display device B, the surface reflectance is suppressed to a degree higher than in the liquid crystal display device A. Therefore a certain improvement in contrast ratio is observed, but no significant difference in contrast ratio between the devices can be found. In the case of a brightness of 100 Lx which is a typical living room brightness, the contrast ratio in the liquid crystal display device A decreases to 1000. Likewise the contrast ratio in the liquid crystal display device B also decreases to 1000 at 100 Lx.

Figure 32:
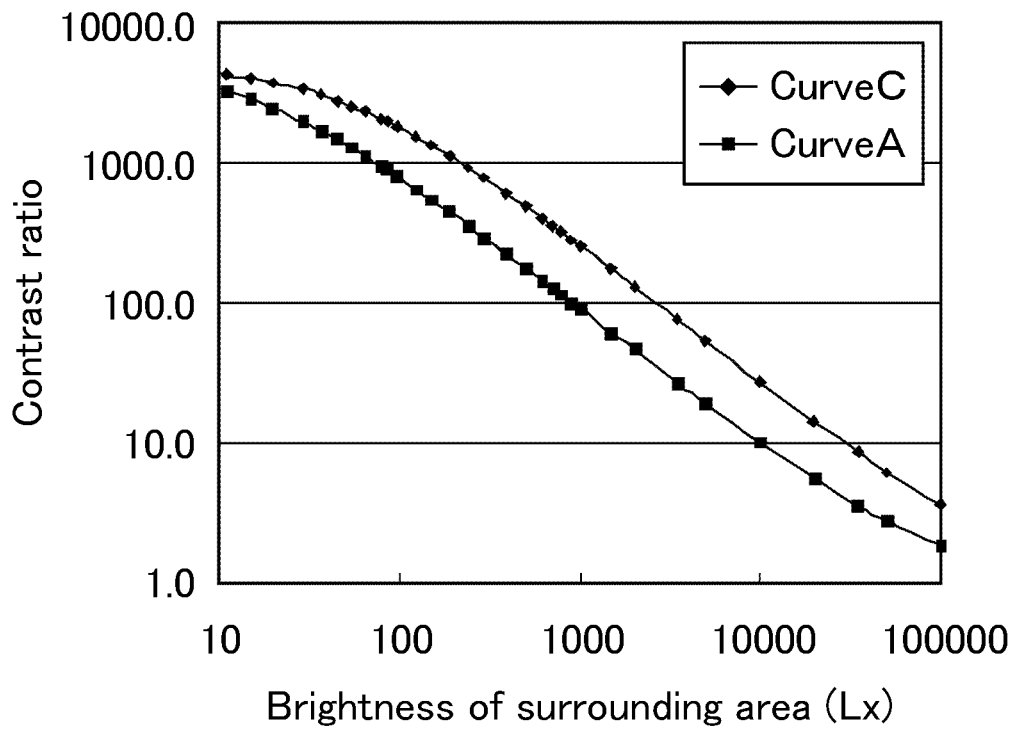
FIG. 32 is a graph illustrating the relationship between the brightness of surrounding area (Lx) and contrast ratio in the liquid crystal display device A and liquid crystal display device C.

The curve A (■) shown in FIG. 32 is a graph, illustrating the relationship between the contrast ratio and the brightness (Lx) around the liquid crystal display device (liquid crystal display device A) with an internal reflectance of 2.0% and a surface reflectance of 1.5%. The curve C (♦) shown in FIG. 32 is a graph illustrating the relationship between the contrast ratio and the brightness (Lx) around the liquid crystal display device (liquid crystal display device C) with an internal reflectance of 1.0% and a surface reflectance of 0.2%.

The liquid crystal, display device A and the liquid crystal display device C differ not only in the surface structure, but also in the internal structure. The surface at the outer space side of the color filter substrate provided in the A is constituted by a LR (low-reflection coating) film, whereas the surface at the outer space side of the color filter substrate provided in the liquid crystal display device C is constituted by a moth eye film. Not only the surface reflectance, but also the internal reflectance of the liquid crystal display device C is improved over that of the liquid crystal display device A. Therefore, a significant improvement in contrast ratio is observed. In the liquid crystal display device A, the contrast ratio has decreased to 1000 at 100 Lx, but in the liquid crystal display device C, the contrast ratio has not decreased to 1000 at 100 Lx. More specifically, at 100 Lx, the liquid crystal display device C had a contrast ratio by a factor of about 1.5 higher than that of the liquid crystal display device A, and at 1000 Lx, the liquid crystal display device C had a contrast ratio by a factor of about 3 higher than that of the liquid crystal display device A.

The liquid crystal display devices A to C have a white luminance of 500 cd/cm$^2$ and can be used in standard liquid crystal TV sets. The dark-place contrast ratio in any of the liquid crystal display devices A to C is about 5000. The dark-place contrast ratio of a standard liquid crystal TV set is 3000 to 5000. The dark-place contrast ratio is determined by the amount of light leaking during dark display and is not greatly affected by the difference in reflectance of internal structures.

Considering the results obtained with the configurations shown, in FIGS. 31 and 32, it is clear that not only the improvement in surface reflection, but also the improvement in internal reflection is effective in greatly increasing the display contrast ratio.

Figure 33:
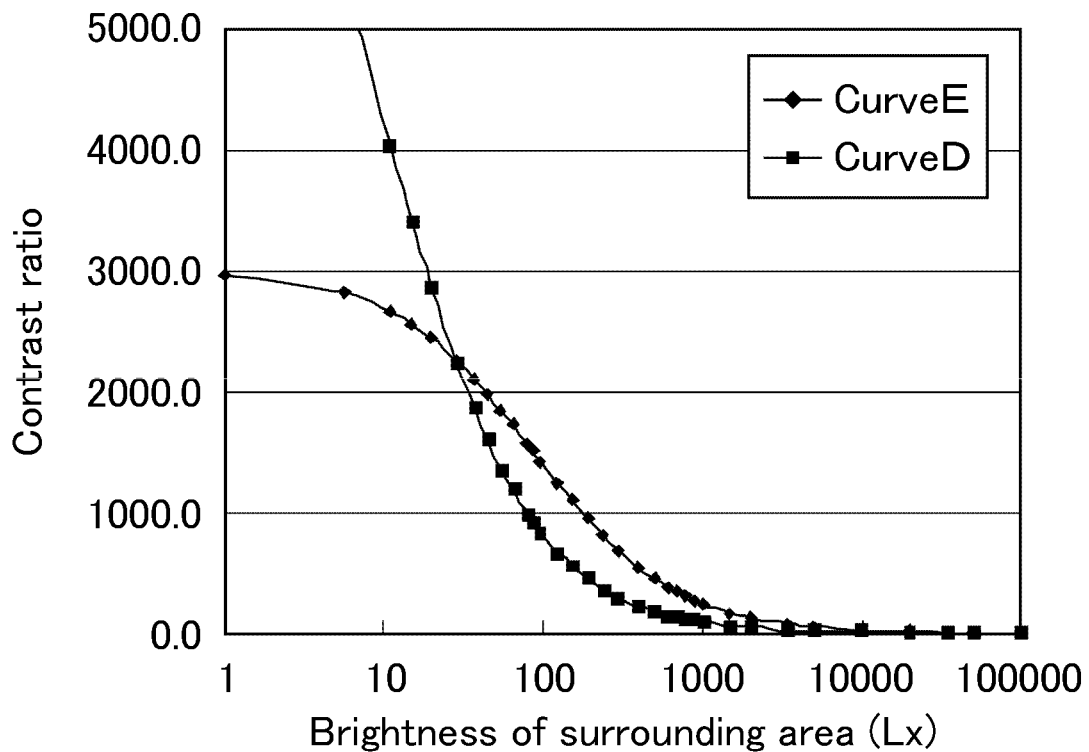
FIG. 33 is a graph illustrating the relationship between the brightness of surrounding area (Lx) and contrast ratio in the liquid crystal display device D and liquid crystal display device E.

The curve D (■) shown in FIG. 33 is a graph illustrating the relationship between the contrast ratio and the brightness (Lx) around the liquid crystal display device (liquid crystal display device D) with an internal reflectance of 2.0% and a surface reflectance of 1.5%. The curve E (♦) shown in FIG. 33 is a graph illustrating the relationship between the contrast ratio and the brightness (Lx) around the liquid crystal display device (liquid crystal display device E) with an internal reflectance of 1.0% and a surface reflectance of 0.2%. The dark-space contrast ratio of the liquid crystal display device D is 8000 and the dark-space contrast ratio of the liquid crystal display device E is 3000.

Figure 34:
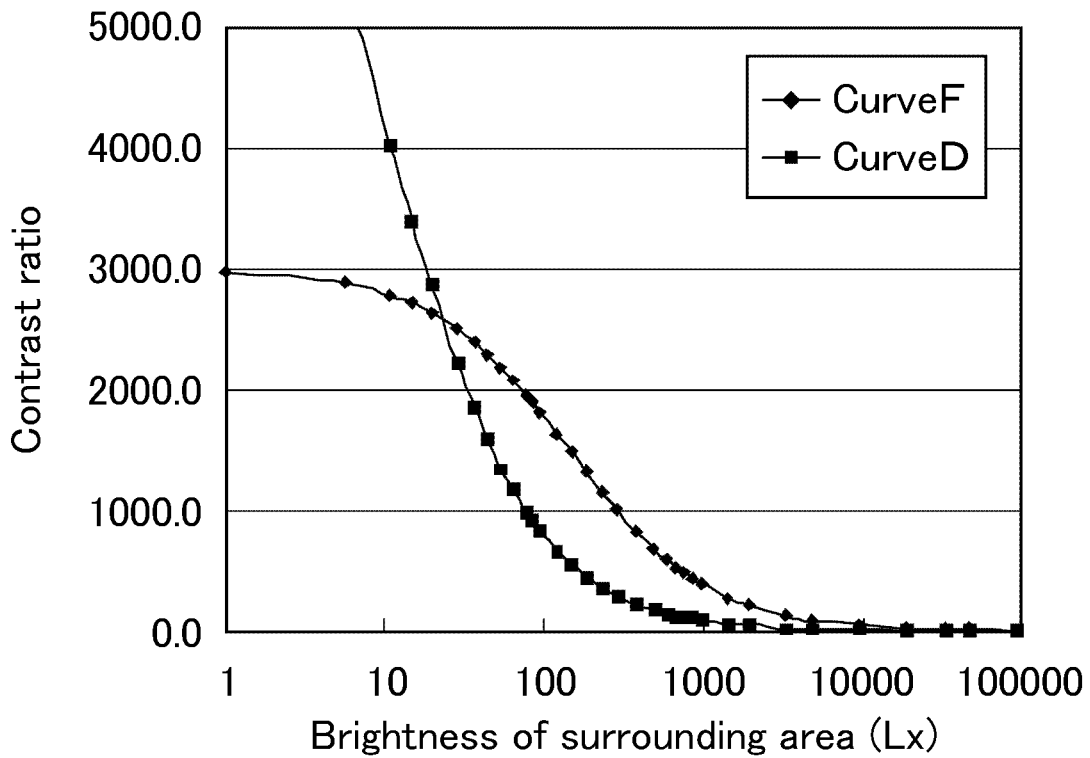
FIG. 34 is a graph illustrating the relationship between the brightness of surrounding area (Lx) and contrast ratio in the liquid crystal display device D and liquid crystal display device F.

The curve D (■) shown in FIG. 34 is a graph illustrating the relationship between the contrast ratio and the brightness (Lx) around the liquid crystal display device (liquid crystal display device D) with an internal reflectance of 2.0% and a surface reflectance of 1.5%. The curve F (♦) shown in FIG. 34 is a graph illustrating the relationship between the contrast ratio and the brightness (Lx) around the liquid crystal display device (liquid crystal display device F) with an internal reflectance of 0.5% and a surface reflectance of 0.2%. The dark-space contrast ratio of the liquid crystal display device D is 8000 and the dark-space contrast ratio of the liquid crystal display device F is 3000.

The surface, on the outer space side, of the color filter substrate provided in the liquid crystal display device D is constituted by a LR film (low-reflection coating), whereas the surfaces, on the outer space side, of the color filter substrates provided in the liquid crystal display devices E and F are constituted by moth eye films.

Considering the results obtained with the configurations shown in FIGS. 33 and 34, it is clear that although the liquid crystal display devices E and F in which both the internal reflectance and the surface reflectance were reduced have a dark-place contrast ratio lower than that of the liquid crystal display device D, they are superior in contrast ratio at a brightness of 100 to 200 Lx of a typical living room. Therefore in practical use, the reflection of light based on the structure of the liquid crystal display panel strongly affects the display and in order to obtain the excellent display quality, it is important not only to increase the dark-place contrast ratio, but also to inhibit the reflectance of light based on the structure of the liquid crystal display panel. In other words, from the standpoint of inhibiting light leak of the backlight, the increase in a dark-place contrast ratio represents a characteristic of the liquid crystal display panel, and the increase in bright-place contrast ratio and the increase in dark-place contrast ratio can be said to have different evaluation axes.

Further, where the liquid crystal display device D, liquid crystal display device E, and liquid crystal display device F are compared, the contrast ratio of the liquid crystal display device D used under surrounding environment of 100 Lx, which represents a typical living room, is less than 1000, whereas the contrast ratio in the liquid crystal display device E has a value sufficiently higher than 1000, and the contrast ratio in the liquid crystal display device F has a value much higher than 1000. The contrast ratio value being 1000 indicates that the reflection of ambient light is 0.1% of the screen brightness and also indicates that the reflection of objects located around the liquid crystal display device, for example, white fluorescent lamps and white clothing of the viewer is greatly reduced in relation to screen brightness. This value is an indicator for evaluating the contrast ratio, and because of such an effect, it can be said that a liquid crystal display device with an excellent contrast ratio is obtained. Therefore, where the contrast ratio of 1000 is taken as a standard, the liquid crystal display device E has a contrast ratio in excess of 1000 in a range of surrounding brightness of 100 to 200 Lx and therefore can be said to have a sufficient contrast ratio in a typical living room. Further, the liquid crystal display device F has a contrast ratio in excess of 1000 in a range of surrounding brightness of 100 to 500 Lx and can be said to maintain a sufficient contrast ratio even in a bright environment with brightness equal to or higher than that of the typical living room. Usually, even when the living room is not illuminated, when the weather is clear or in the environment such that morning sunshine can enter the room, it is quite possible that the brightness inside the room will be equal to or higher than 100 Lx.

Figure 35:
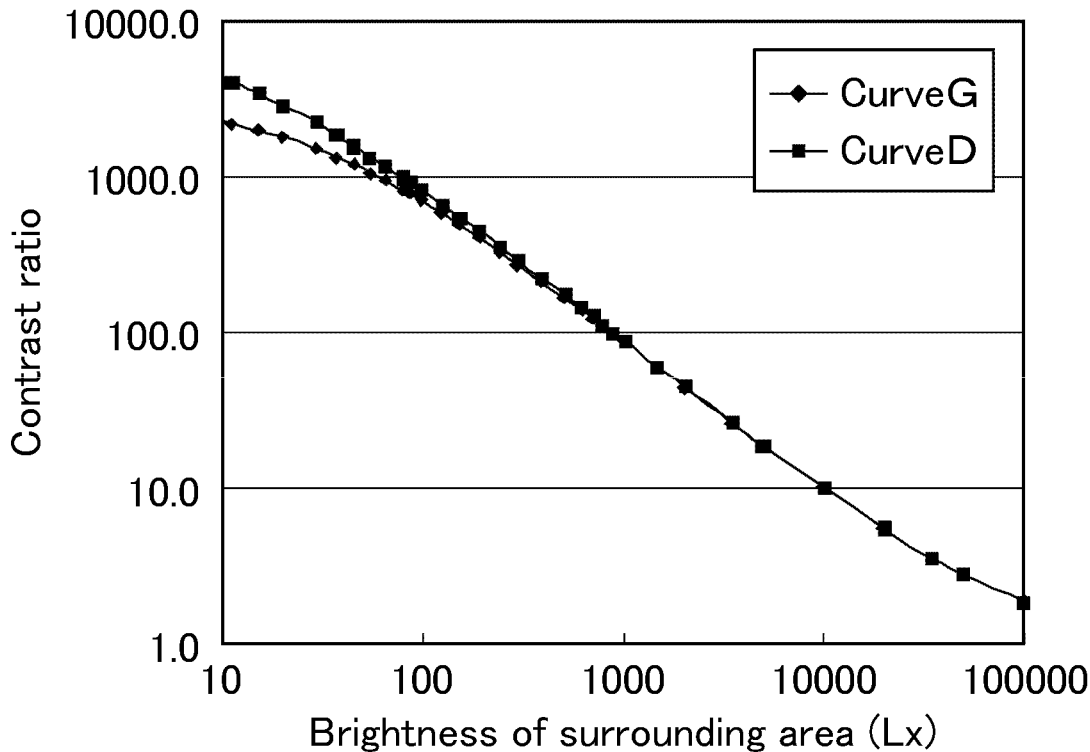
FIG. 35 is a graph illustrating the relationship between the brightness of surrounding area (Lx) and contrast ratio in the liquid crystal display device D and liquid crystal display device G.

The curve D (■) shown in FIG. 35 is a graph illustrating the relationship between the contrast ratio and the brightness (Lx) around the liquid crystal display device (liquid crystal display device D) with an internal reflectance of 2.0% and a surface reflectance of 1.5%. The curve G (♦) shown in FIG. 35 is a graph illustrating the relationship between the contrast ratio and the brightness (Lx) around the liquid crystal display device (liquid, crystal display device G) with an internal reflectance of 2.0% and a surface reflectance of 1.5%. The dark-space contrast ratio of the liquid crystal display device D is 8000 and the dark-space contrast ratio of the liquid crystal display device G is 3000.

As follows from FIG. 35, the liquid crystal display device D and the liquid crystal display device G have the same internal reflectance and surface reflectance and differ only in the dark-place contrast ratio. When these two liquid crystal display devices were compared, it was found that in the dark environment (at 1 to 50 Lx) although the liquid crystal display device D with a higher dark-space contrast ratio maintains a contrast ratio higher than that of the liquid crystal display device G, in the vicinity of 100 Lx, which is the brightness of a typical living room, the liquid crystal display devices D and G both have a contrast ratio of 1000, and the liquid crystal display device D and the liquid crystal display device G demonstrate almost the same contrast characteristic in the environment that is brighter than 100 Lx. This result indicates that although the improvement of dark-place contrast ratio is effective in terms of dynamically representing images in a dark room, practically no effect is produced in the environment with a brightness higher than that of the living room.

Figure 36:
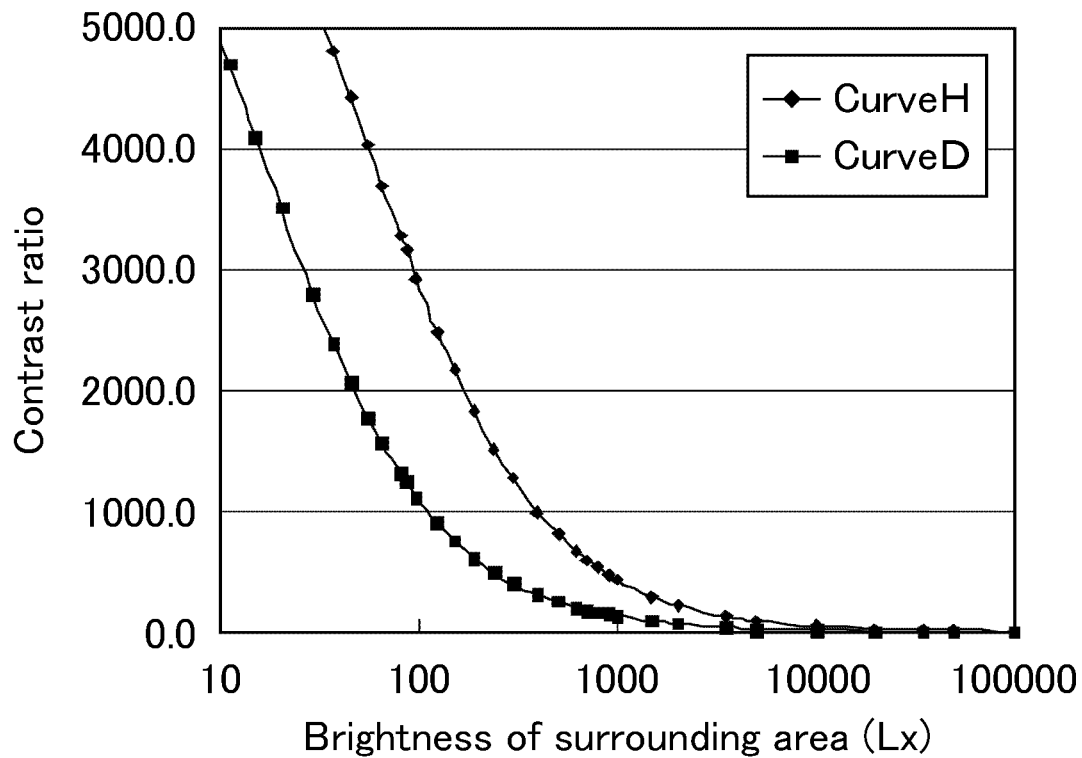
FIG. 36 is a graph illustrating the relationship between the brightness of surrounding area (Lx) and contrast ratio in the liquid crystal display device D and liquid crystal display device H.

The curve D (■) shown in FIG. 36 is a graph, illustrating the relationship between the contrast ratio and the brightness (Lx) around the liquid crystal display device (liquid crystal display device D) with an internal reflectance of 2.0% and a surface reflectance of 1.5%. The curve H (♦) shown in FIG. 36 is a graph illustrating the relationship between the contrast ratio and the brightness (Lx) around the liquid crystal display device (liquid crystal display device H) with an internal reflectance of 0.5% and a surface reflectance of 0.2%. The dark-space contrast ratio of the liquid crystal display device D is 8000 and the dark-space contrast ratio of the liquid crystal display device F is 8000.

Figure 37:
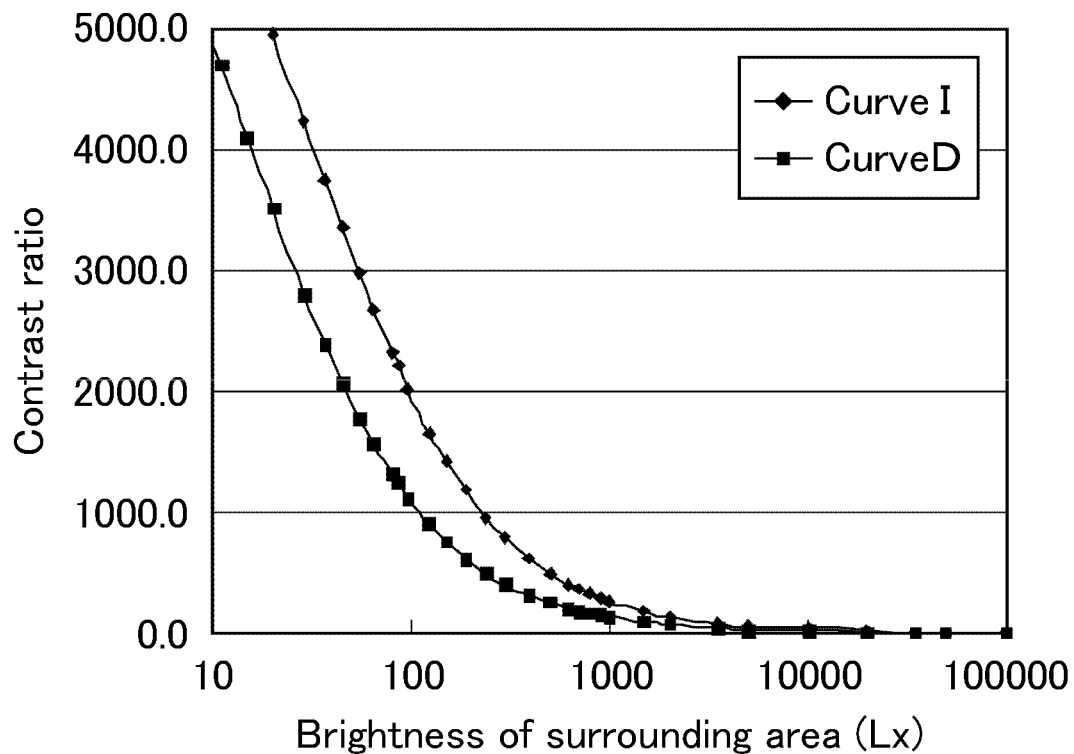
FIG. 37 is a graph illustrating the relationship between the brightness of surrounding area (Lx) and contrast ratio in the liquid crystal display device D and liquid crystal display device I.

The curve D (■) shown in FIG. 37 is a graph, illustrating the relationship between the contrast ratio and the brightness (Lx) around the liquid crystal display device (liquid crystal display device D) with an internal reflectance of 2.0% and a surface reflectance of 1.5%. The curve I (♦) shown in FIG. 37 is a graph illustrating the relationship between the contrast ratio and the brightness (Lx) around the liquid crystal display device (liquid crystal display device I) with an internal reflectance of 1.0% and a surface reflectance of 0.2%. The dark-space contrast ratio of the liquid crystal display device G is 8000 and the dark-space contrast ratio of the liquid crystal display device I is 8000.

In the liquid crystal display device G, liquid crystal display device H, and liquid crystal display device I, the dark-room contrast ratio is the same, but the internal reflectance and surface reflectance differ between the devices. Further, in the liquid crystal display device H and liquid crystal display device I, the surface reflectance is the same, but the inner reflectance differs between the devices. As shown in FIGS. 36 and 37, even when the dark-place contrast ratio is the same, the liquid crystal display device H and liquid crystal display device I that has lower internal reflectance and surface reflectance maintain a contrast ratio higher than that of the liquid crystal display device G having higher internal reflectance and surface reflectance as the brightness increases. Comparing the liquid crystal display device H and the liquid crystal display device I, it is clear that only the internal reflectance is improved by 0.5%, and that the inhibition of decrease in contrast ratio differs among the devices.

Examining FIGS. 36 and 37, the contrast ratio in the liquid crystal display device G with an internal reflectance of 2.0% in an environment with 100 Lx is 1000, and the contrast ratio in the liquid crystal display device H with an internal reflectance of 1.0% in an environment with 100 Lx is 2000. These results indicate that, where the liquid, crystal display device H with an internal reflectance of 1.0% is used, the contrast ratio in an environment with 100 Lx can be improved by a factor of two over that in the liquid crystal display device G with an internal reflectance of 2.0%. Further, with the liquid, crystal display device H, a contrast ratio of equal to or higher than 1000 can be ensured even in an environment with 200 Lx. Therefore, dynamic images can be viewed even in a bright living room, and a liquid crystal display device with an internal reflectance of 1.0% is especially effective.

Further, the contrast, ratio in the liquid crystal display device I with an internal reflectance of 0.5% in an environment with 100 Lx is 3000. Therefore, where the liquid crystal display device I with an internal reflectance of 0.5% is used, the contrast ratio in an environment with 100 Lx can be improved by a factor of three over that in the liquid crystal display device G with an internal reflectance of 2.0%. Further, with the liquid crystal display device I, a contrast ratio of 1000 can be obtained even in an environment with 400 Lx corresponding to windows through which sunlight does not directly enters the room on a shiny day or to a bright office with several fluorescence lamps on the ceiling.

Summarizing the aforementioned results, it is clear that by inhibiting the internal reflectance of a liquid crystal display device to less than 1.0%, it is possible to maintain the contrast ratio equal to or higher than 1000 even in an environment with 100 to 200 Lx that is used in the usual living room and to obtain a liquid crystal display device with excellent utility. Further, it is clear that by inhibiting the internal reflectance of a liquid crystal display device to 0.5% or less, it is possible to maintain the contrast ratio equal to or higher than 1000 even in an environment with a brightness of 200 to 500 Lx, which is equal to or higher than that in the usual living room, and to obtain a liquid crystal display device with even better utility. All of the aforementioned liquid crystal display devices have a white luminance of 500 cd/cm$^2$ and can be used in standard liquid crystal TV.

Embodiment 8

The liquid crystal display device of Embodiment 8 is similar to the liquid crystal display device of Embodiment 7 in all aspects, except that it additionally has a means for modulating the intensity of backlight in each region for increasing the contrast ratio. More specifically, the backlight that is turned on at all times is divided into regions (areas), a backlight luminance control circuit is separately provided, and the intensity of backlight light is modulated according to the image signal. The backlight luminance can thus be increased in a bright image area, the black image can be dropped by reducing the backlight luminance in a dark image area, and a clearer image representation with an expanded contrast range can be realized. Such a configuration is actually effective when a crisp contrast is wished to be obtained in a static image such as an ad image, or when an impact-providing image is further emphasized. Furthermore, the "floating image" phenomenon that is caused by leak of backlight light occurring when a dark image is displayed in an environment with a dark surrounding area can be also inhibited. In addition, by modulating the backlight light, it is possible to reduce power consumption by comparison with the case where the backlight is on at all times.

Figure 38:
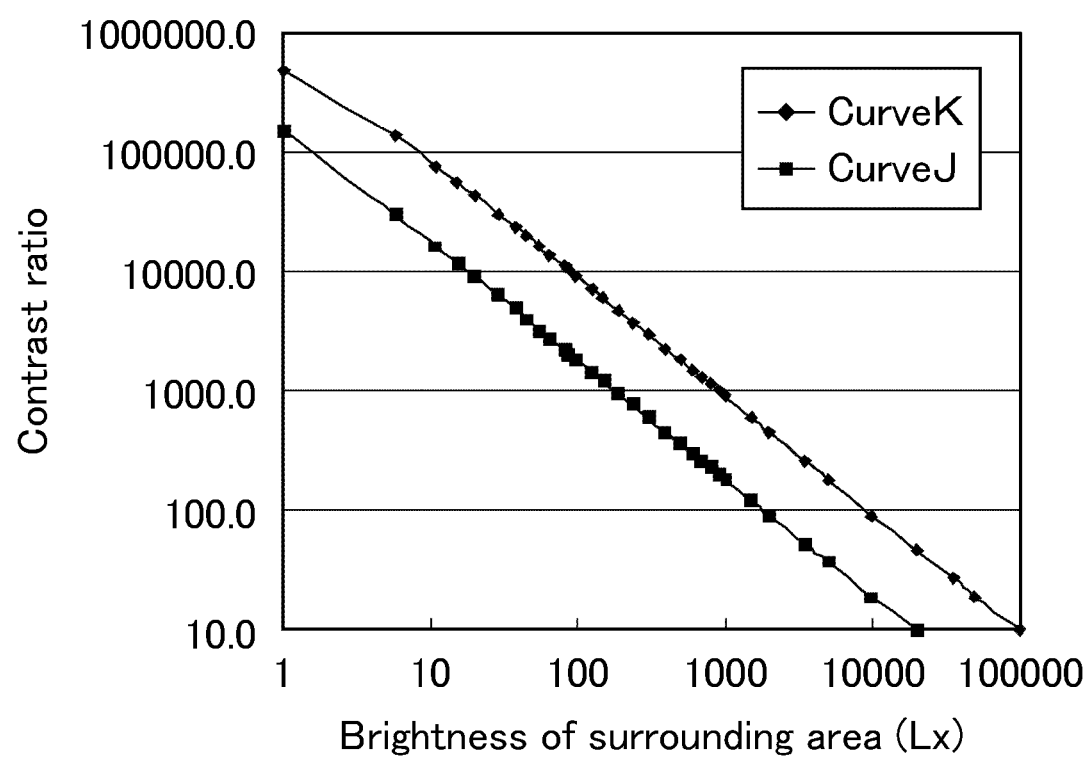
FIG. 38 is a graph illustrating the relationship between the brightness of surrounding area (Lx) and contrast ratio in the liquid crystal display device J and liquid crystal display device K.

FIG. 38 is a graph illustrating the relationship between the contrast ratio and brightness of surrounding area (Lx) obtained when the internal reflectance and surface reflectance were set to respectively different values in the liquid crystal display device of Embodiment 8. The curve J (■) shown in FIG. 38 is a graph illustrating the relationship between the contrast ratio and the brightness (Lx) around the liquid crystal display device (liquid crystal display device J) with an internal reflectance of 2.0% and a surface reflectance of 1.5%. The curve K (♦) shown in FIG. 38 is a graph illustrating the relationship between the contrast ratio and the brightness (Lx) around the liquid crystal display device (liquid crystal display device K) with an internal reflectance of 0.5% and a surface reflectance of 0.2%.

The liquid crystal display device J and the liquid crystal display device K are each provided with a means for modulating the backlight light, and the dark-place contrast ratio thereof is 1,000,000, The surface, on the outer space side, of the color filter substrate provided in the liquid crystal display device J is coated with a LR film (low-reflection coating), whereas the surface, on the outer-space side, of the color filter substrate provided in the liquid crystal display device K is constituted by a moth eye film. With the liquid crystal display device J and liquid crystal display device K, a contrast ratio equal to or higher than 100 can be ensured even in an environment with a brightness of surrounding area of 1000 Lx. Furthermore, with the liquid crystal display device K, a contrast ratio equal to or higher than 100 can be ensured even in an environment with a brightness of 10,000 Lx corresponding to outdoor conditions on a cloudy day or in a shady area. Therefore, the liquid crystal display device K can be advantageously used even with respect to an ad medium of indoor show type that displays an ad outward. A dark-place contrast of 1,000,000 means a state in which the backlight is OFF. In this state, since there is not leaking light in black display, the contrast ratio is substantially impossible to measure.

The liquid crystal display device J and the liquid crystal, display device K are ON and OFF controlled for each divided area, and the ON and OFF control is not performed in pixel units. Therefore, the contrast performance of the liquid crystal display panel should be improved in each of the divided, areas. For example, when a dark scene of an image is represented in a dark environment, it is necessary not only to increase the dark-place contrast ratio, but also improve the contrast performance of the liquid crystal display device in order to represent light and dark features of the image faithfully and consciously. Therefore, the liquid crystal display device K with reduced internal reflectance is superior to the liquid crystal display device J as a liquid crystal display device for performing such area division.

Members of a liquid, crystal display device that can be advantageously used for inhibiting the internal-reflection in the liquid crystal display device will be described below in greater detail.

Embodiment 9

The liquid crystal display device of Embodiment 9 is provided with an array substrate that has been modified to prevent the reflection on wirings or electrodes.

The reflection caused by the structure of array substrate occurs, for example, on the surface of conductive layers such as gate wirings, source wirings, capacitor-storage (CS) wirings, and also gate electrodes, source electrodes, and drain electrodes provided in TFTs. The reflectance can be decreased by modifying materials for these wirings and electrodes of TFTs.

To ensure good conductivity and reliability, metals such as aluminum (Al), silver (Ag), copper (Cu), nickel (Ni), tantalum (Ta), molybdenum (Mo), and titanium (Ti) and alloys of these metals have been mainly used for these wirings and electrodes of TFTs. Meanwhile, black wirings and electrodes can be obtained by modifying these materials, for example, by converting copper (Cu) into copper oxide (CuO), silver (Ag) into silver oxide ($Ag_2O$), tantalum (Ta) into tantalum oxides (TaO, $Ta_2O_3$) or tantalum nitride (TaN), molybdenum (Mo) into molybdenum nitride (MoN), and titanium (Ni) into titanium, nitride (TiN). Therefore, light reflected inside liquid crystal display devices can be easily absorbed and reflectance based on the liquid crystal display panel provided with the liquid crystal display devices can be inhibited. When metal oxides are thus used, it is still possible to obtain conductivity and reliability-same as those obtained when metals are used.

Such metal oxides can be easily fabricated by ad mixing the desirable introduced gas and forming films by sputtering when forming films of metal materials that will serve as conductive layers by a sputtering method. For example, where copper (Cu) is used, a conductive layer including copper (Cu) as a constituent material is formed to a desired thickness, then oxygen is introduced into the gas, and the film is directly formed by sputtering, while inducing a reaction between copper (Cu) and oxygen, it is possible to obtain black copper oxide (CuO) which is the target substance, without the necessarily of changing the target and with a minimal use of new equipment.

A procedure that uses the sputtering method into which oxygen has thus been introduced can be similarly implemented with respect to silver (Ag). Since silver oxide ($Ag_2O$) is of black color, the reflectance can be reduced. With consideration for etching ability, it is preferred that silver (Ag) be alloyed with one or more other materials such as palladium (Pd), copper (Cu), and indium (In), and that the silver alloy be oxidized in the present embodiment.

When aluminum (Al) is used as a material for the conductive layer, it is preferred that a conductive layer of a different material be additionally provided on the aluminum film surface in order to eliminate hillocks (fine projections) formed on the film surface which are inherent to aluminum (Al). In such a case, where a conductive layer of titanium (Ti), tantalum (Ta), molybdenum (Mo), or magnesium (Mg) is provided on the aluminum film surface, the reflectance can be reduced by 30 to 40% with respect to that attained when aluminum alone is used as a material for the conductive layer.

When the conductive layer is from titanium (Ti), it is preferred that a black titanium nitride (TiN) be formed by using a sputtering method with introduction of nitrogen. When the conductive layer is from tantalum (Ta), it is preferred that black tantalum oxides (TaO, $Ta_2O_3$) be formed by using a sputtering method with introduction of oxygen. Since these titanium nitride (TiN) and tantalum oxides (TaO, $Ta_2O_3$) excel in electric conductivity, it is not necessary to remove the modified layer when electric contact between electrodes is ensured. Therefore, the number of process steps is reduced.

A conductive layer with low reflectance can be advantageously obtained by forming a film of silicon (Si) or an aluminum-silicon (Al—Si) alloy under a mixed gas atmosphere of oxygen and nitrogen.

When individual metals are thus converted into metal oxides or metal nitrides, it is preferred that combinations thereof be used. For example, it is preferred that copper be converted into copper oxide on some wirings and silver be converted into silver oxide on other wirings.

Such a liquid crystal display device of Embodiment 9 can be advantageously used in the case where a low-reflection layer such as a moth eye film is formed on the outermost surface and in the case of a linearly polarized light mode in which linearly polarized light passes through a liquid crystal layer. Where the low-reflection layer is formed on the outermost surface, the effect of internal reflection becomes easily noticeable. Therefore measures aimed at the reduction of such internal reflection are effective. In the case of linearly polarized light mode, the elements with internal reflection are increased in size, and the configuration is therefore effective. Furthermore, a contrast higher than that in the case of a circularly polarized light mode can be obtained.

Embodiment 10

The liquid crystal display device of Embodiment 10 is provided with an array substrate modified to prevent the reflection in the region superimposed on the conductive layer such as wirings and electrodes. Thus, a light-blocking film is provided on the region superimposed on the conductive layer in the liquid crystal display device of Embodiment 10, and since this light-blocking film is positioned on the observation surface side with respect to the conductive layer, the reflection occurring on the conductive layer surface can be reduced.

With the liquid crystal display device of Embodiment 10, individual metals such as aluminum (Al), silver (Ag), copper (Cu), nickel (Ni), tantalum (Ta), molybdenum (Mo), and titanium (Ti) and alloys of these metals can be used as is for the conductive layers such as gate wirings, source wirings, capacitor storage (CS) wirings, and also gate electrodes, source electrodes, and drain electrodes provided in TFTs.

A resist (photosensitive resin) that is used when conducting patterning of wirings, electrodes, and the like by using photolithography is preferably used as such a light-blocking film. In this case, the above mentioned resist can be used efficiently as a member for reducing the reflectance by admixing a black pigment to the resist used for patterning, processing the wirings by etching, and then leaving the resist as is, that is, without stripping. Carbon particles and titanium nitride particles are preferred as the above mentioned black pigment, because of high production efficiency and low reflection ability.

Since electric contact actually should be ensured in contact portions of the wirings and impurities should, be prevented from penetrating into the transistors such as TFT and the vicinity thereof (transistor portions), there are also regions in which such a method of leaving the resist cannot be used. In such a case, half-exposure is performed when mask exposure is carried out with respect to the resist on the contact portions of wirings and on the transistor portions, the thickness of the resist of the contact portions of wirings and on the transistor portions is reduced by development, and ashing or dry etching with fluorine gas or the like is performed after etching the wirings. As a result, a suitable configuration can be obtained by so removing the resist present on the contact portions of wirings and on the transistor portions.

Further, the above mentioned photosensitive resin including a black pigment can be also coated on the completed array substrate having a stacked structure including the conducive layer, instead of being used only as a resist in the above mentioned patterning, and the coated film may be left only on the wirings and electrode layer of the array substrate by exposure from the side opposite that where coating has been performed (front surface side of the film). In such a case, the wiring pattern of the completed array substrate uses as a patterning mask the photosensitive resin including the black pigment. Therefore, such a process is useful because a light-blocking film can be formed on the array substrate, without using new masks.

Such a liquid crystal display device of Embodiment 10 can be advantageously used in the case where a low-reflection layer such as a moth eye film is formed on the outermost surface and in the case of a linearly polarized light mode in which linearly polarized light passes through a liquid crystal layer. Where the low-reflection layer is formed on the outermost surface, the effect of internal reflection becomes easily noticeable. Therefore measures aimed at the reduction of such internal reflection are effective. In the case of linearly polarized light mode, the elements with internal reflection are increased in size, and the configuration is therefore effective. Furthermore, a contrast higher than that in the case of a circularly polarized light mode can be obtained.

Embodiment 11

The liquid crystal display device of Embodiment 11 is provided with an array substrate modified to prevent the reflection in the region superimposed on the conductive layer such as wirings and electrodes. Thus, a photosensitive resist is formed on the region superimposed on the conductive layer in the liquid crystal display device of Embodiment 11, and this photosensitive resist is positioned on the observation surface side with respect to the conductive layer.

In the manufacturing process of a typical liquid crystal display device, an acrylic resist is coated to a thickness of about 2 to 4 μm on top of transistors such as TFTs and wirings with the object of increasing the aperture ratio and improving reliability, a smooth surface is configured, and then contact portions are formed by photolithography and pixel electrodes are thereafter formed. This process will be explained below with reference to FIG. 26. An insulating layer 67 has a two-layer structure in which the lower insulating layer, that is, the insulating layer on the side that is in contact with a TFT 63, is an inorganic insulating layer, and the upper insulating layer, that is, the insulating layer on the side that is in contact with a pixel electrode 65, is an acrylic resist. With such a configuration, sufficient separation can be provided from the TFT 63 or wiring by the acrylic resist thickness. Further, since the acrylic resist absorbs peaks and valleys of the TFT structure and wiring structure and produces a flat surface, it becomes possible to fabricate pixel electrode as high as the top of the source wiring due to the reduction in coupling capacitance and decrease in size of peaks and valleys. Therefore, the pixel surface area can be further enlarged and therefore the aperture ratio is increased.

This series of steps includes a step of forming a contact portion by using an acrylic resist, then again exposing the entire surface of the acrylic resist, and decolorizing the photosensitizing agent of the resist. However, where the above mentioned exposure is performed in this case from the side of wiring on the rear surface, rather than from the front surface of the resist, the acrylic resist on the wiring is not decolorized since the resist is shadowed by the wirings. Where a transition is then made directly to the baking step, the color of the acrylic resist on the wirings that has been decolorized becomes even deeper. In the above mentioned step, the light-blocking film can be formed on the wirings, without coating a new material. Therefore, with the above mentioned method, the reflectance can be reduced without increasing the number of steps. In this case, it is not necessary that the transmittance be decreased, substantially to zero. For example, even when the transmittance of the acrylic resist is decreased to 70%, the light that falls from the outside and is reflected by the wiring surface passes twice through the light-blocking film located on the wirings. Therefore, the reflectance is reduced substantially to 50%.

Such a liquid crystal display device of Embodiment 11 can be advantageously used in the case where a low-reflection layer such as a moth eye film is formed on the outermost surface and in the case of a linearly polarized light mode in which linearly polarized light passes through a liquid crystal layer. Where the low-reflection layer is formed on the outermost surface, the effect of internal reflection becomes easily noticeable. Therefore measures aimed at the reduction of such internal reflection are effective. In the case of linearly polarized light mode, the elements with internal reflection are increased in size, and the configuration is therefore effective. Furthermore, a contrast higher than that in the case of a circularly polarized light mode can be obtained.

Example 1

In Example 1, the internal reflectance was measured in liquid crystal display devices having the pixel structure of the above mentioned embodiments.

Actually, the polarized light on one side is absorbed by the polarizer on the front surface, but in this case the measurements were initially conducted in a state without the polarizer. For this reason, the fraction absorbed by the polarizer is thereafter discarded.

This is because a polarizer is usually disposed on the front surface of an actual liquid crystal display device, and the light that has fallen from the outside on the liquid crystal display device and has been reflected by the internal structure is transmitted through the polarizer in a parallel Nicol state (parallel Nicol polarizer). Since the polarizer transmittance is about 40%, the reduction caused by the polarizer should be taken into account when the transmittance is measured in a state without the polarizer. Thus, where the reflectance in the configuration having the polarizer is measured by using the randomly polarized light as a reference (calibration without attaching the polarizer), the quantity of light arriving to the reflecting body differs depending on whether the polarizer is present on the front surface of the liquid crystal display device. Thus, the quantity of light in the case where the polarizer is present is different from that in the case in which the polarizer is not present. The transmittance in the case where the polarizer is present is by a factor of about 0.4 greater than the transmittance in the case where the polarizer is not present. Therefore, the internal reflectance is initially observed in a state without the polarizer and then the value relating to the case in which the polarizer is present is calculated.

First, SCI measurements and SCE measurements were conducted using CMI-2002 through the color filter substrate of the liquid, crystal display device having the structure of Embodiment 7 shown in FIG. 30. The measurement value of SCI was 2.88% and the measurement value of SCE was 0.48%. When the "(measurement value of SCI)–(measurement value of SCE)" difference was calculated, a reflectance of 2.40% was obtained. The measurements with CMI-2002 were conducted by using $D_{65}$ as a light source and performing about 98% white color calibration as a relative reflectance with respect to the reflectance at 550 nm of a white calibration plate.

The reflectance of each in ember constituting the display device was then determined from the display screen by using a spectromicroscope, the surface area ratio of each member related to one pixel was determined, and the reflectance in one pixel was calculated.

As a result, the reflectance calculated by multiplying the unit reflectance of the gate wiring 71 shown in FIG. 30 by the surface area ratio was 0.1%. Similarly, a reflectance of 0.21% was obtained for the Cs wiring 73, a reflectance of 0.43% was obtained for the drain electrode (lead-out wiring) 74, a reflectance of 0.64% was obtained for the source wiring 72, and a reflectance of 0.39% was obtained for the contact portion 66. The reflectance of wiring metal portions that was the sum total of these values was 1.77%. The total reflectance in the common electrode (ITO) and pixel electrode (ITO) 65 was 0.48%. The reflectance at the resin portion (not shown in the figure) that was formed on the display electrode 65 and stabilized the alignment state of the liquid crystal was 0.1%. The reflectance at the pixel portions that was a sum total of these values was 0.58%. The reflectance of the black matrix 12 of the color filter substrate was 0.07%.

The sum total of values obtained, for the wirings, pixels, and black matrix was the internal reflectance of the display device. The value thereof was 2.42%. This value was obtained by adding up the value obtained by conducting measurements with the spectromicroscope for each configuration and it almost matched the reflectance (2.40%) of the normal reflection component in the above-described CMI-2002.

Three colors, namely, red, blue, and green are present in the color filter substrate. The measurements were conducted with respect to each color and then the results were added up according to the luminosity.

Examination relating to reduction of internal reflection was then performed. First, the attention was focused on drawings, sources, and contact portions that were wiring metal portions and used Al as a material for the outermost portions, and the reflectance was reduced by using Ti, rather than Al, for the outermost surface, that is, by stacking Ti on Al. As a result, the reflectance of wiring portions was reduced by about 30%. The outermost surface of the gates and Cs portions was constituted by Ti from the very beginning. The reflectance of 1.77% could be reduced to 0.80% by using an acrylic resist for arrangement on the lower surface of pixels, such that color was not eliminated only on the wirings, in accordance with Embodiment 11.

The reflectance was further reduced from 0.07% to 0.02% by incorporating the specific features of the multilayer substrate of Embodiment 1 into the black matrix. As a result, the internal reflectance of the liquid crystal display device was reduced from 2.42% to 1.4%. The actual transmittance was 0.54%, which is the value obtained by multiplying this value of reflectance by the transmittance of 38% of the polarizer.

Concerning the insulating layer (insulating layer 67 in FIG. 26) that was positioned below the pixel electrodes and had a two-layer structure in Embodiment 11, after an inorganic insulating layer was formed and before the acrylic resist was formed, a black resist was coated on the inorganic insulating layer and a black resist pattern was formed on the wirings by exposure from the TFT side in which the wirings served as a mask. After the exposure, the acrylic resist was formed on the black resist pattern and inorganic insulating layer. Finally, full-surface exposure was performed with respect to the surface of the acrylic resist to remove the color.

The reflectance measured on the wirings in such a configuration was 0.30%. Therefore, the reflectance on the wiring metal was reduced from 1.77% to 0.30%. As a result, the internal reflection of 2.42% could be reduced to 0.95%. The actual transmittance was 0.36% which was the value obtained by multiplying the aforementioned reflection value by a transmittance of 38%. Where the diffusion reflection is included, the internal reflection can be estimated to be reduces to a value of equal to or less than 0.5%.

By arranging a moth eye film on the outermost surface of the liquid crystal, display device having such an internal structure and then suppressing the reflection of the outermost surface to 0.2%, it was possible to realize an easily viewable screen on which images could, be seen with lower reflection in an environment with 100 Lx than in a display device in which the aforementioned measures against the reflection have not been implemented.

The reduction of internal reflection in a display device of the present invention is described above in detail by using the multilayer substrates and liquid crystal display devices of several embodiments, but these embodiments can be combined with each other as mentioned hereinabove. Such combinations make it possible to reduce the internal reflection to less than 1% and even to less than 0.5%. The liquid crystal display device fabricated, in the above-described, manner can be used as a liquid crystal display device having a high contrast ratio even in bright places.

The present application claims priority to Patent Application No. 2009-148942 filed in Japan on Jun. 23, 2009 under the Paris Convention and provisions of national law in a designated State, the entire contents of which are hereby incorporated by reference.

EXPLANATION OF REFERENCE NUMERALS

10: outer space (air)
11: glass substrate (transparent substrate)
12: BM (black matrix)
13: moth eye film
13a: protrusion-depression portion
13b: support portion
13c: adhesive portion
14: intermediate resin layer 15: moth eye film (low-reflection layer)
16: polarizer
17: common electrode
21: glass filter substrate (multilayer substrate)
22: liquid crystal layer
23: array substrate (opposed substrate)
25: intermediate layer
31: carbon black particles
32: binder resin
33: transparent particles
41: color filter layer
41R: color filter layer (red)
41G: color filter layer (green)
41B: color filter layer (blue)
51: transparent thin inorganic film
52: BM (black matrix)
61: glass substrate (transparent substrate)
62: wiring (conductive layer)
63: TFT
63a: gate electrode
63b: source electrode
63c: drain electrode
63d: semiconductor layer
64: gate insulating film
65: pixel electrode
66: contact portion
67: insulating film
68: polarizer
71: gate wiring
72: source wiring
73: capacitor storage (CS) wiring
74: drain lead-out wiring
81: light source
82: measurement sample
83: integrating sphere
84: light receiving portion
85: light trap portion
91: glass substrate
92: BM
93: resin layer
101: light incident from substrate side on the observation surface side
102: component reflected by surface on the outer side of the substrate on the observation surface side
103: component transmitted through the substrate on the observation surface side
104: component reflected toward the observation surface side (internally reflected component)
111: surface base material
112: internal base material
121: substrate on the observation surface side
122: substrate on the rear surface side
123: liquid crystal layer

The invention claimed is:

1. A liquid crystal display device comprising a liquid crystal display panel including a color filter substrate, a liquid crystal layer, and an array substrate, wherein, the color filter substrate and the array substrate each include a linearly polarizing plate, and
an internal reflectance of the liquid crystal display device is less than 1.0%, wherein,
the internal reflectance of the liquid crystal display device is measured by,
preparing a sample including a glass substrate, and linearly polarizing plates with refractive indexes of substantially 1.5, the linearly polarizing plates being attached to both surfaces of the glass substrate, being identical to those included in the liquid crystal display panel, and satisfying cross Nicol condition;
measuring a reflectance of the sample by using a spectrocolorimeter, the reflectance of the sample being a value combining a normal reflectance and a diffusion reflectance;
measuring a reflectance of the liquid crystal display panel in a display region by using the spectrocolorimeter, the reflectance of the liquid crystal display panel being a value combining a normal reflectance and a diffusion reflectance; and
subtracting the reflectance of the sample from the reflectance of the liquid crystal display panel.

2. The liquid crystal display device according to claim 1, further comprising:
a display screen having a low-reflection layer on an outermost surface.

3. The liquid crystal display device according to claim 2, wherein the low-reflection layer has on a surface a plurality of protrusions with a width between adjacent apex points of equal to or less than a visible light wavelength.

4. The liquid crystal display device according to claim 1, wherein,
the color filter substrate includes a sixth layer, a seventh layer, and an intermediate layer disposed between the sixth layer and the seventh layer; and
a refractive index of the intermediate layer changes continuously so as to connect a refractive index of the sixth layer and a refractive index of the seventh layer.

5. The liquid crystal display device according to claim 4, wherein
the intermediate layer includes particles having a refractive index of the seventh layer; and
a concentration of the particles in the intermediate layer increases continuously in a direction from the sixth layer.

6. The liquid crystal display device according to claim 5, wherein
the intermediate layer includes a medium enclosing the particles; and
a refractive index of the medium is the refractive index of the sixth layer.

7. The liquid crystal display device according to claim 5, wherein the particles are black or transparent.

8. The liquid crystal display device according to claim 4, wherein a layer having on a surface thereof a plurality of protrusions with a width between adjacent apex points of equal to or less than a visible light wavelength is disposed on the sixth layer on an opposite side thereof to the seventh layer.

9. The liquid crystal display device according to claim 1, wherein,
light that passes through the linearly polarizing plates and passes through the liquid crystal layer is linearly polarized light.

10. The liquid crystal display device according to claim 1, wherein the array substrate comprises at least one conductive layer having a front surface constituted by any one material selected from the group consisting of copper oxide, silver oxide, titanium nitride, and tantalum oxide.

11. The liquid crystal display device according to claim 1 wherein the array substrate comprises at least one stacked structure of a conductive layer having aluminum as a constituent material and a conductive layer having any one material selected from the group consisting of titanium, tantalum, molybdenum, and magnesium as a constituent material that is positioned further toward an observation surface side than the conductive layer having aluminum as a constituent material.

12. The liquid crystal display device according to claim 1, wherein the array substrate comprises a conductive layer constituted by any one material selected from the group consisting of oxidized or nitrided silicon and aluminum-silicon alloys.

13. The liquid crystal display device according to claim 1, wherein,
the array substrate comprises at least one conductive layer constituted by any one material selected from the group consisting of aluminum, copper, silver, and nickel, and comprises a light-blocking film on a region superimposed on the conductive layer; and
the light-blocking film is positioned further toward the observation surface side than the conductive layer.

14. The liquid crystal display device according to claim 13, wherein the light-blocking film is a photosensitive resin including a black pigment.

15. A multilayer substrate including a substrate, a black matrix, and an intermediate layer disposed between the substrate and the black matrix, wherein, a refractive index of the intermediate layer changes continuously so as to connect a refractive index of the substrate and a refractive index of the black matrix;
the intermediate layer includes transparent particles and a binder resin enclosing the transparent particles;
a concentration of the transparent particles inside the intermediate layer increases continuously with a distance from the substrate;
a refractive index of the binder resin is substantially equal to the refractive index of the substrate; and
a refractive index of transparent particles is higher than the refractive index of the substrate and the refractive index of the binder resin and substantially equal to the refractive index of the black matrix.

16. The multilayer substrate according to claim 15, wherein a layer having on a surface thereof a plurality of protrusions with a width between adjacent apex points of equal to or less than a visible light wavelength is disposed on the substrate on an opposite side thereof to the black matrix.

* * * * *